US012009193B2

(12) United States Patent
Wamsley et al.

(10) Patent No.: US 12,009,193 B2
(45) Date of Patent: Jun. 11, 2024

(54) BENCH-TOP TIME OF FLIGHT MASS SPECTROMETER

(71) Applicant: Micromass UK Limited, Wilmslow (GB)

(72) Inventors: Ruth Wamsley, Ruthddlan/Rhyl (GB); William Johnson, Wilmslow (GB); Peter Spreadbury, Liverpool (GB); Paul Doorbar, Sale (GB); Michael Wilson, Wrexham (GB)

(73) Assignee: Micromass UK Limited, Wilmslow (GB)

( * ) Notice: Subject to any disclaimer, the term of this patent is extended or adjusted under 35 U.S.C. 154(b) by 577 days.

(21) Appl. No.: 17/059,809

(22) PCT Filed: May 31, 2019

(86) PCT No.: PCT/GB2019/051497
§ 371 (c)(1),
(2) Date: Nov. 30, 2020

(87) PCT Pub. No.: WO2019/229456
PCT Pub. Date: Dec. 5, 2019

(65) Prior Publication Data

US 2023/0054331 A1 Feb. 23, 2023

(30) Foreign Application Priority Data

May 31, 2018 (GB) ..................................... 1808932

(51) Int. Cl.
*H01J 49/00* (2006.01)
*H01J 49/06* (2006.01)
(Continued)

(52) U.S. Cl.
CPC ........ *H01J 49/0022* (2013.01); *H01J 49/062* (2013.01); *H01J 49/24* (2013.01); *H01J 49/40* (2013.01)

(58) Field of Classification Search
CPC ...... H01J 49/0022; H01J 49/062; H01J 49/24; H01J 49/40; H01J 49/0027; H01J 49/0009; H01J 49/02; H01J 49/022
(Continued)

(56) References Cited

U.S. PATENT DOCUMENTS

| | | |
|---|---|---|
| 2,901,622 A | 8/1959 | Baldwin |
| 3,323,008 A | 5/1967 | Holloway et al. |

(Continued)

FOREIGN PATENT DOCUMENTS

| | | |
|---|---|---|
| CN | 1447031 A | 10/2003 |
| CN | 101855700 A | 10/2010 |

(Continued)

OTHER PUBLICATIONS

Combined Search and Examination Report under Sections 17 and 18(3) for Application No. GB1808932.6, dated Nov. 21, 2018, 4 pages.

(Continued)

*Primary Examiner* — Kiet T Nguyen
(74) *Attorney, Agent, or Firm* — Goodwin Procter LLP

(57) ABSTRACT

A start-up routine for a mass spectrometer is performed automatically upon switching ON the mass spectrometer. The mass spectrometer comprises a plurality of functional modules connected thereto, each module operable to perform a predetermined function of the mass spectrometer in use. The start-up routine comprises detecting which functional modules are present in the set of a plurality of functional modules connected to the mass spectrometer, and performing one or more steps of the start-up routine based
(Continued)

upon the results of the detection. The mass spectrometer automatically determines whether configuration information is stored locally in respect of each one of the detected functional modules, and, for the or each one of the detected functional modules for which such information is found to be stored locally, automatically uses the information in configuring the mass spectrometer, and, for any detected functional module(s) for which such information is not found to be stored locally, automatically obtains configuration information for the detected functional module(s) from a remote server, and uses the information in configuring the mass spectrometer.

5 Claims, 35 Drawing Sheets

(51) Int. Cl.
*H01J 49/24* (2006.01)
*H01J 49/40* (2006.01)

(58) Field of Classification Search
USPC .................................................. 250/281, 282
See application file for complete search history.

(56) References Cited

U.S. PATENT DOCUMENTS 4,314,156 A 2/1982 Kuppermann et al.
4,458,149 A 7/1984 Muga
5,025,391 A 6/1991 Filby et al.
5,593,123 A 1/1997 Crawford
5,756,994 A 5/1998 Bajic
5,776,216 A 7/1998 Yang
5,825,025 A 10/1998 Kerley
5,933,335 A 8/1999 Hitchcock et al.
6,013,913 A 1/2000 Hanson
6,049,077 A 4/2000 Franzen
6,248,998 B1 6/2001 Okumoto et al.
6,305,975 B1 10/2001 Steiner
6,316,768 B1 11/2001 Rockwood et al.
6,502,999 B1 1/2003 Cohen et al.
6,527,458 B2 3/2003 Kim
6,566,653 B1 5/2003 Gerber et al.
6,570,152 B1 5/2003 Hoyes
6,643,075 B2 11/2003 Wang et al.
6,663,294 B2 12/2003 Crane, Jr. et al.
6,712,528 B2 3/2004 Galeotti et al.
6,772,649 B2 8/2004 Zimmermann et al.
6,792,171 B2 9/2004 Hargis et al.
6,824,314 B2 11/2004 Bendelli et al.
6,835,928 B2 12/2004 Bateman
6,847,036 B1 1/2005 Darling et al.
6,862,378 B2 3/2005 Karnacewicz et al.
6,869,231 B2 3/2005 Chiu et al.
6,877,912 B2 4/2005 Cho et al.
6,888,129 B2 5/2005 Bowdler et al.
6,888,860 B2 5/2005 Shaw
6,903,332 B2 6/2005 Weiss et al.
6,956,205 B2 10/2005 Park
6,977,369 B2 12/2005 Yamaguchi et al.
7,019,285 B2 3/2006 Dresch et al.
7,129,163 B2 10/2006 Sherrer et al.
7,149,389 B2 12/2006 Yoon et al.
7,211,794 B2 5/2007 Malek et al.
7,247,847 B2 7/2007 Webb et al.
7,309,861 B2 12/2007 Brown et al.
7,322,754 B2 1/2008 Wolf et al.
7,359,642 B2 4/2008 Richardson et al.
7,372,021 B2 5/2008 Cotter et al.
7,375,318 B2 5/2008 Kikuma et al.
7,550,722 B2 6/2009 Scheidemann et al.
7,597,488 B2 10/2009 Fisher
7,622,711 B2 11/2009 Wildgoose et al.
7,645,986 B2 1/2010 Kikuma et al.
7,786,435 B2 8/2010 Whitehouse et al.
7,812,309 B2 10/2010 Guevremont et al.
7,820,980 B2 10/2010 Balogh
7,825,374 B2 11/2010 Cotter et al.
7,829,841 B2 11/2010 Bateman et al.
7,888,630 B2 2/2011 Wong
7,893,401 B2 2/2011 Ding
7,919,747 B2 4/2011 Green et al.
7,960,694 B2 6/2011 Hoyes
8,138,119 B2 3/2012 Fischer et al.
8,153,960 B2 4/2012 Giles et al.
8,183,524 B2 5/2012 Kenny et al.
8,227,749 B2 7/2012 Alonso
8,253,096 B2 8/2012 Numata
8,357,892 B2 1/2013 Suyama et al.
8,426,802 B2 4/2013 Giles et al.
8,507,849 B2 8/2013 Brown
8,513,597 B2 8/2013 Panayi
8,536,523 B2 9/2013 Li et al.
8,552,367 B2 10/2013 Danel et al.
8,637,810 B2 1/2014 Mukaibatake et al.
8,653,452 B2 2/2014 Albeanu et al.
8,704,172 B2 4/2014 Baykut
8,716,660 B2 5/2014 Green et al.
8,742,339 B2 6/2014 Hoyes
8,822,915 B2 9/2014 Mukaibatake et al.
8,927,928 B2 1/2015 Decker et al.
8,975,578 B2 3/2015 Green et al.
9,012,840 B2 4/2015 Bateman et al.
9,048,075 B1 6/2015 Kodera
9,058,968 B2 6/2015 Danel et al.
9,105,456 B2 8/2015 Jiang et al.
9,184,039 B2 11/2015 Pringle et al.
9,196,469 B2 11/2015 Makarov
9,281,171 B2 3/2016 Bateman et al.
9,287,100 B2 3/2016 Szalay et al.
9,318,309 B2 4/2016 Brown et al.
9,355,832 B2 5/2016 Chiappetta et al.
9,466,472 B2 10/2016 Bateman et al.
9,536,721 B2 1/2017 Berdnikov et al.
9,536,727 B2 1/2017 Satoh
9,552,975 B2 1/2017 Brown et al.
9,564,307 B2 2/2017 Makarov
9,601,323 B2 3/2017 Nishiguchi et al.
9,607,820 B2 3/2017 Bateman et al.
9,754,773 B1 9/2017 Gonzalez et al.
9,768,008 B2 9/2017 Verenchikov
9,812,308 B2 11/2017 Berdnikov et al.
9,859,106 B2 1/2018 Chiappetta et al.
9,865,444 B2 1/2018 Okumura
9,870,904 B2 1/2018 Covey et al.
9,870,906 B1 1/2018 Quarmby et al.
9,880,129 B2 1/2018 Bateman
9,939,407 B2 4/2018 Giles et al.
9,978,572 B2 5/2018 Giles et al.
9,984,861 B2 5/2018 Giles et al.
9,984,863 B2 5/2018 Verenchikov
10,014,167 B2 7/2018 Zhang et al.
10,020,181 B2 7/2018 Okumura
2001/0017351 A1 8/2001 Terakura
2001/0030284 A1 10/2001 Dresch et al.
2002/0100870 A1 8/2002 Whitehouse et al.
2002/0131724 A1 9/2002 Bailey et al.
2003/0003595 A1 1/2003 Amirav
2003/0027354 A1 2/2003 Geli
2003/0050679 A1 3/2003 Park
2003/0193019 A1 10/2003 Nagano et al.
2004/0089803 A1 5/2004 Foley
2005/0213353 A1 9/2005 Lys
2005/0279929 A1* 12/2005 Youngquist ........... H01J 49/164
250/288
2006/0076483 A1 4/2006 Scheidemann et al.
2006/0219891 A1 10/2006 Balogh
2006/0237663 A1 10/2006 Balogh
2007/0125954 A1 6/2007 Frosien
2007/0164209 A1 7/2007 Balogh
2007/0200060 A1 8/2007 Russ et al.
2007/0284520 A1 12/2007 Yamamoto

(56) References Cited

U.S. PATENT DOCUMENTS

| | | | | |
|---|---|---|---|---|
| 2008/0073510 | A1* | 3/2008 | Finlay | H01J 49/02 250/288 |
| 2008/0087841 | A1 | 4/2008 | Verbeck et al. | |
| 2008/0149825 | A1 | 6/2008 | Kozlovski et al. | |
| 2008/0272289 | A1 | 11/2008 | Vestal | |
| 2009/0101814 | A1 | 4/2009 | Amirav | |
| 2009/0179148 | A1 | 7/2009 | Yasuda et al. | |
| 2010/0108879 | A1 | 5/2010 | Bateman et al. | |
| 2010/0176292 | A1 | 7/2010 | Yamauchi et al. | |
| 2010/0243887 | A1 | 9/2010 | Suyama et al. | |
| 2011/0127416 | A1 | 6/2011 | Campuzano et al. | |
| 2011/0174969 | A1 | 7/2011 | Seyfarth | |
| 2011/0220786 | A1 | 9/2011 | Satoh | |
| 2012/0068064 | A1 | 3/2012 | Numata | |
| 2012/0085901 | A1 | 4/2012 | Gilbert et al. | |
| 2012/0205534 | A1 | 8/2012 | Hunter et al. | |
| 2013/0015342 | A1 | 1/2013 | Steiner et al. | |
| 2013/0183355 | A1 | 7/2013 | Jain et al. | |
| 2014/0097338 | A1 | 4/2014 | Eiler | |
| 2014/0183355 | A1 | 7/2014 | Bartfay-Szabo et al. | |
| 2014/0195446 | A1* | 7/2014 | Yurach | G06Q 30/018 705/317 |
| 2014/0346345 | A1 | 11/2014 | Makarov | |
| 2014/0367563 | A1 | 12/2014 | Zhong et al. | |
| 2015/0014524 | A1 | 1/2015 | Chiappetta et al. | |
| 2015/0076338 | A1 | 3/2015 | Young et al. | |
| 2015/0107824 | A1 | 4/2015 | Signorelli et al. | |
| 2015/0123354 | A1 | 5/2015 | Laser et al. | |
| 2015/0228467 | A1 | 8/2015 | Grinfeld et al. | |
| 2015/0263642 | A1 | 9/2015 | Lin et al. | |
| 2015/0270115 | A1 | 9/2015 | Furuhashi | |
| 2015/0323500 | A1 | 11/2015 | Davis et al. | |
| 2016/0148796 | A1 | 5/2016 | Makarov | |
| 2016/0155620 | A1 | 6/2016 | Makarov | |
| 2016/0172179 | A1 | 6/2016 | Deerberg et al. | |
| 2016/0203967 | A1 | 7/2016 | Atkinson et al. | |
| 2016/0247668 | A1 | 8/2016 | Szalay et al. | |
| 2016/0284526 | A1 | 9/2016 | Kenny et al. | |
| 2016/0293395 | A1 | 10/2016 | O'Brien et al. | |
| 2016/0322960 | A1 | 11/2016 | Taylor et al. | |
| 2016/0336158 | A1 | 11/2016 | Kovarik | |
| 2017/0011897 | A1 | 1/2017 | Yamaguchi | |
| 2017/0074283 | A1 | 3/2017 | Manabe | |
| 2017/0082585 | A1 | 3/2017 | DeWitte et al. | |
| 2017/0092477 | A1 | 3/2017 | Giles et al. | |
| 2017/0115383 | A1 | 4/2017 | Fukuo et al. | |
| 2017/0168031 | A1 | 6/2017 | Verenchikov | |
| 2017/0169633 | A1 | 6/2017 | Leung et al. | |
| 2017/0190566 | A1 | 7/2017 | Cramm et al. | |
| 2017/0236699 | A1 | 8/2017 | Ueda et al. | |
| 2017/0287692 | A1 | 10/2017 | Bateman et al. | |
| 2017/0309465 | A1 | 10/2017 | Jarrell | |
| 2017/0372881 | A1 | 12/2017 | Hoyes | |
| 2018/0053640 | A1 | 2/2018 | Kurulugama et al. | |
| 2018/0102241 | A1 | 4/2018 | Gordon et al. | |
| 2020/0312647 | A1 | 10/2020 | Imazu et al. | |

FOREIGN PATENT DOCUMENTS

| | | | |
|---|---|---|---|
| CN | 102064078 | A | 5/2011 |
| CN | 102446692 | A | 5/2012 |
| CN | 102800555 | A | 11/2012 |
| CN | 102971827 | A | 3/2013 |
| CN | 103400742 | A | 11/2013 |
| CN | 103684817 | A | 3/2014 |
| CN | 104517798 | A | 4/2015 |
| CN | 105030148 | A | 11/2015 |
| CN | 105474351 | A | 4/2016 |
| CN | 105679637 | A | 6/2016 |
| CN | 205705229 | U | 11/2016 |
| CN | 106663586 | A | 5/2017 |
| CN | 106992109 | A | 7/2017 |
| CN | 107112195 | A | 8/2017 |
| CN | 107635477 | A | 1/2018 |
| CN | 206955673 | U | 2/2018 |
| DE | 2817665 | A1 | 10/1979 |
| DE | 102018105603 | A1 | 5/2018 |
| EP | 0233784 | A2 | 8/1987 |
| EP | 0317060 | A2 | 5/1989 |
| EP | 0792091 | A1 | 8/1997 |
| EP | 0919726 | A1 | 6/1999 |
| EP | 1137044 | A2 | 9/2001 |
| EP | 1393059 | A1 | 3/2004 |
| EP | 1530229 | A1 | 5/2005 |
| EP | 1597749 | A2 | 11/2005 |
| EP | 1820203 | A2 | 8/2007 |
| EP | 1830386 | A2 | 9/2007 |
| EP | 1843043 | A2 | 10/2007 |
| EP | 1933365 | A1 | 6/2008 |
| EP | 1933366 | A1 | 6/2008 |
| EP | 1964153 | A2 | 9/2008 |
| EP | 1166328 | B1 | 11/2008 |
| EP | 1397822 | B1 | 3/2010 |
| EP | 1884980 | B1 | 6/2011 |
| EP | 1817789 | B1 | 11/2011 |
| EP | 2431997 | A2 | 3/2012 |
| EP | 2450941 | A1 | 5/2012 |
| EP | 1825496 | B1 | 6/2012 |
| EP | 2533042 | A1 | 12/2012 |
| EP | 2567397 | A2 | 3/2013 |
| EP | 2587521 | A1 | 5/2013 |
| EP | 2092549 | B1 | 8/2013 |
| EP | 2644899 | A1 | 10/2013 |
| EP | 2660850 | A1 | 11/2013 |
| EP | 2734018 | A1 | 5/2014 |
| EP | 2633299 | B1 | 9/2014 |
| EP | 2774172 | A2 | 9/2014 |
| EP | 2797105 | A1 | 10/2014 |
| EP | 2798657 | A2 | 11/2014 |
| EP | 2806553 | A2 | 11/2014 |
| EP | 1810314 | B1 | 4/2015 |
| EP | 2866247 | A1 | 4/2015 |
| EP | 1738398 | B1 | 6/2015 |
| EP | 2038913 | B1 | 7/2015 |
| EP | 2913914 | A1 | 9/2015 |
| EP | 3005403 | A2 | 4/2016 |
| EP | 3073509 | A1 | 9/2016 |
| EP | 3084422 | A1 | 10/2016 |
| EP | 3211781 | A1 | 8/2017 |
| EP | 2033208 | B1 | 11/2017 |
| EP | 3244439 | A1 | 11/2017 |
| EP | 1789989 | B1 | 12/2017 |
| EP | 2485243 | B1 | 3/2018 |
| EP | 3404695 | A1 | 11/2018 |
| EP | 1880406 | B1 | 7/2019 |
| GB | 1593998 | A | 7/1981 |
| GB | 2219432 | A | 12/1989 |
| GB | 2327804 | A | 2/1999 |
| GB | 2329066 | A | 3/1999 |
| GB | 2435712 | A | 9/2007 |
| GB | 2440970 | A | 2/2008 |
| GB | 2443952 | A | 5/2008 |
| GB | 2455171 | A | 6/2009 |
| GB | 2473839 | A | 3/2011 |
| GB | 2486584 | A | 6/2012 |
| GB | 2489975 | A | 10/2012 |
| GB | 2493072 | A | 1/2013 |
| GB | 2506710 | A | 4/2014 |
| GB | 2515284 | A | 12/2014 |
| GB | 2519853 | A | 5/2015 |
| GB | 2520787 | A | 6/2015 |
| GB | 2525960 | A | 11/2015 |
| GB | 2530367 | A | 3/2016 |
| GB | 2533168 | A | 6/2016 |
| GB | 2541808 | A | 3/2017 |
| GB | 2552965 | A | 2/2018 |
| JP | S60180322 | A | 9/1985 |
| JP | S63146963 | U | 9/1988 |
| JP | H01121747 | A | 5/1989 |
| JP | H03233850 | A | 10/1991 |
| JP | H10233187 | A | 9/1998 |
| JP | H1125903 | A | 1/1999 |
| JP | H11230087 | A | 8/1999 |

(56) References Cited

FOREIGN PATENT DOCUMENTS

| | | | |
|---|---|---|---|
| JP | 2001050944 | A | 2/2001 |
| JP | 2004226313 | A | 8/2004 |
| JP | 2005285543 | A | 10/2005 |
| JP | 2012043672 | A | 3/2012 |
| JP | 2014022075 | A | 2/2014 |
| JP | 2015121406 | A | 7/2015 |
| WO | 9921212 | A1 | 4/1999 |
| WO | 0185312 | A1 | 11/2001 |
| WO | 02101382 | A1 | 12/2002 |
| WO | 2004077488 | A2 | 9/2004 |
| WO | 2006061625 | A1 | 6/2006 |
| WO | 2006129083 | A2 | 12/2006 |
| WO | 2007071991 | A2 | 6/2007 |
| WO | 2007131146 | A2 | 11/2007 |
| WO | 2008071923 | A2 | 6/2008 |
| WO | 2009037483 | A2 | 3/2009 |
| WO | 2010064321 | A1 | 6/2010 |
| WO | 2011106640 | A2 | 9/2011 |
| WO | 2011138669 | A2 | 11/2011 |
| WO | 2012058632 | A1 | 5/2012 |
| WO | 2012125318 | A2 | 9/2012 |
| WO | 2012125381 | A1 | 9/2012 |
| WO | 2013039772 | A1 | 3/2013 |
| WO | 2013064842 | A2 | 5/2013 |
| WO | 2013066881 | A2 | 5/2013 |
| WO | 2013098642 | A2 | 7/2013 |
| WO | 2014074822 | A1 | 5/2014 |
| WO | 2014191747 | A1 | 12/2014 |
| WO | 2014191750 | A1 | 12/2014 |
| WO | 2014194023 | A2 | 12/2014 |
| WO | 2014194172 | A2 | 12/2014 |
| WO | 2015009478 | A1 | 1/2015 |
| WO | 2015040379 | A1 | 3/2015 |
| WO | 2015040386 | A1 | 3/2015 |
| WO | 2015092501 | A1 | 6/2015 |
| WO | 2015189550 | A1 | 12/2015 |
| WO | 2017060991 | A1 | 4/2017 |
| WO | 2017122276 | A1 | 7/2017 |
| WO | 2018138814 | A1 | 8/2018 |
| WO | 2019224948 | A1 | 11/2019 |

OTHER PUBLICATIONS

Combined Search and Examination Report under Sections 17 and 18(3) for Application No. GB1808890.6, dated Nov. 28, 2018, 7 pages.

Combined Search and Examination Report under Sections 17 and 18(3) for Application No. GB1808912.8, dated Nov. 30, 2018, 10 pages.

Combined Search and Examination Report under Sections 17 and 18(3) for Application No. GB1808942.5, dated Dec. 3, 2018, 7 pages.

Chernushevich, I. V., et al., "An introduction to quadrupole-time-of-flight mass spectrometry", Journal of Mass Spectrometry, 36(8):849-65 (2001) Abstract only.

Chernushevich, I.V., et al., "Charge state separation for protein applications using a quadrupole time-of-flight mass spectrometer", Rapid Communications in Mass Spectrometry 17(13):1416-1424 (2003). Abstract only.

Makarov, A. et al., "Performance evaluation of a hybrid linear ion trap/orbitrap mass spectrometer," Analytical Chemistry, 78(7):2113-20 (2006). Abstract only.

Combined Search and Examination Report under Sections 117 and 18(3) for Application No. GB1808948.2 dated Nov. 21, 2018, 7 pages.

Combined Search and Examination Report under Sections 17 and 18(3) for Application No. GB1808893.0 dated Nov. 27, 2018, 8 pages.

Combined Search and Examination Report under Sections 17 and 18(3) for Application No. GB1808936.7 dated Nov. 20, 2018, 10 pages.

Combined Search and Examination Report under Sections 17 and 18(3) for Application No. GB1808892.2, dated Dec. 3, 2018, 6 pages.

Combined Search and Examination Report under Sections 17 and 18(3) for Applicaton No. GB1808894.8 dated Dec. 3, 2018, 7 pages.

Combined Search and Examination Report under Sections 17 and 18(3) for Application No. GB1808949.0 dated Oct. 31, 2018, 8 pages.

Combined Search and Examination Report under Sections 17 and 18(3) for Application No. GB1907722.1 dated Jun. 28, 2019, 8 pages.

Combined Search and Examination Report under Sections 17 and 18(3) for Application No. GB1808889.8 dated Nov. 30, 2018, 7 pages.

International Search Report and Written Opinion for International application No. PCT/GB2019/051504, dated Jul. 23, 2019, 11 pages.

Combined Search and Examination Report under Sections 17 and 18(3) for Application No. GB1818003.4, dated May 2, 2019, 6 pages.

Invitation to pay additional fees and, where applicable, protest fee for PCT/GB2019/051508, dated Aug. 28, 2019.

Author unknown, "Operating Manual and Programming Reference, Models RGA100, RGA200, and RGA300 Residual Gas Analyzer," Stanford Research Systems Revision 1.8 (May 2009).

Jungmann, J. H., et al., "An in-vacuum, pixelated detection system for mass spectrometric analysis and imaging of macromolecules," International Journal of Mass Spectrometry, 341-342:34-44 (2013).

Invitation to pay additional fees and, where applicable, protest fee for International application No. PCT/GB2019/051507, dated Aug. 20, 2019, 16 pages.

Yang, C., and Hanley, L., "ChiMS: Open-source instrument control software platform on LabVIEW for imaging/depth profiling mass spectrometers," Review of Scientific Instruments, 86:065106-1 through 065016-7 (2015).

Invitation to pay additional fees and, where applicable, protest fee for International application No. PCT/GB2019/051506, dated Jul. 22, 2019, 13 pages.

Invitation to pay addition al fees and, where applicable, protest fee for PCT/GB2019/051503, dated Jul. 25, 2019, 17 pages.

International Search Report and Written Opinion for International application No. PCT/GB2019/051500, dated Aug. 5, 2019, 9 pages.

Kozlov, B., et al., "Time-of-flight mass spectrometer for investigations of laser ablation," ASMS Conference paper, Dallas, TX (May 1999). [Retrieved from the Internet URL: https//www.researchgate.net/publication/330202298_Time-of-flight_mass_spectrometer_for_investigations_of_laser_ablation]. Abstract.

Shion, H., et al., "Towards Overcoming the Challenges of Implementing Accurate Mass MS for Routine Biotherapeutic Analysis" 2018 ASMS Prototype oa-TOF Abstract HYS Final.

Shion, S., et al., "Towards Overcoming the Challenges of Implementing Accurate Mass MS for Routine Biotherapeutic Analysis" 2018 ASMS Prototype oa-TOF WP699 HYS Final Poster.

Shion, H., et al., "A Fit-for-purpose Accurate Mass MS for Routine Biotherapeutic Analysis", 2018 CASSS Mass Spec HYS Final Poster.

Shion, H., et al., "A Fit-for-purpose Accurate Mass MS for Routine Biotherapeutic Analysis", 2018 CASSS Mass Spec BioTof HYS Final, Abstract.

Shion, H., et al., "Progress Towards Implementing Simple Time-of-flight Accurate Mass MS for Routine Biotherapeutic Analysis", XXII (IMSC) International Mass Spectrometry Conference Florence, Italy (2018) Abstract.

Shion, H., et al., "Progress Towards Implementing Simple Time-of-flight Accurate Mass MS for Routine Biotherapeutic Analysis", XXII International Mass Spectrometry Conference Florence, Italy (2018) poster.

Shion, H., et al., "Meeting the Challenges of Implementing Accurate-Mass Mass Spectrometry for Biotherapeutic Development in Regulated/non-Regulated Environments", 2019 ASMS BioAccord Oral Session PowerPoint.

(56) References Cited

OTHER PUBLICATIONS

Shion, H., et al., "Meeting the Challenges of Implementing Accurate-Mass Mass Spectrometry for Biotherapeutic Development in Regulated/non-Regulated Environments", 2019 ASMS BioAccord Abstract.
Shion, H., et al., "Meeting the Challenges of Implementing Accurate-Mass Mass Spectrometry for Biotherapeutic Development in Regulated/non-Regulated Environments" 2019 ATEurope BioAccord, Abstract.
Shion, H., et al., "Meeting the Challenges of Implementing Accurate-Mass Mass Spectrometry for Biotherapeutic Development in Regulated/non-Regulated Environments" 2019 ATEurope BioAccord, Poster.
Shion, H., et al., "Meeting the Challenges of Implementing Accurate-Mass Mass Spectrometry for biotherapeutic Development in Regulated/non-Regulated Environments", 2019 BioPharma Analytical Summit BioAccord, abstract.
Shion, H., et al., "Meeting the Challenges of Implementing Accurate-Mass Mass Spectrometry for Biotherapeutic Development in Regulated/non-Regulated Environments", 2019 Bio Pharma Summit BioAccord, Poster.
Shion, H., "Enabling Routine and Reproducible Biotherapeutic Analysis when Data Integrity Matters", 2019 15th Annual PEGs Boston Waters BioAccord, PowerPoint 29 pages.
Shion, H., "Enabling Routine and Reproducible Biotherapeutic Analysis when Data Integrity Matters", 2019 15th Annual PEGs Boston Waters BioAccord, Abstract.
Shion, H., et al., "Meeting the Challenges of Implementing Accurate-Mass Mass Spectrometry for Biotherapeutic Development in Regulated/non-Regulated Environments", 2019 Pitt Con Bio Accord, Poster.
Shion, H., et al., "Meeting the Challenges of Implementing Accurate-Mass Mass Spectrometry for Biotherapeutic Development in Regulated/non-Regulated Environments", 2019 Pitt Con Bio Accord, Abstract.
Combined Search and Exam Report from IPO for GB Application No. 1907739.5, dated Nov. 27, 2019, 8 pages.
International Search Report and Written Opinion for International application No. PCT/GB2019/051510, dated Aug. 29, 2019, 13 pages.
Combined Search and Exam Report from IPO for GB Application No. 1907735.3, dated Nov. 25, 2019, 7 pages.
Combined S and E Report under Sections 17 and 18(3) for Application No. GB1907734.6, dated Oct. 31, 2019, 7 pages.
International Search Report and Written Opinion for International Application No. PCT/GB2019/051498, dated Nov. 6, 2019, 21 pages.
Combined Search and Examination Report under Sections 17 and 18(3) for Application No. GB1907719.7, dated Nov. 15, 2019, 11 pages.
Author unknown, "Waters Xevo G2-S QTof Operators Overview and Maintenance Guide", Feb. 11, 2013 (Feb. 11, 2013), XP55606374, Retrieved from the Internet: URL:https://www.waters.com/webassets/cms/support/docs/xevo_g2-s_qtof_715003596rb.pdf [retrieved on Jul. 17, 2019].
International Search Report and Written Opinion for International application No. PCT/GB2019/051501, dated Sep. 25, 2019, 17 pages.
Examination Report under Section 18(3) for Application No. GB2020743.7, dated Jan. 28, 2022, 6 pages.
Combined Search and Examination Report under Sections 17 and 18(3), for Application No. GB1907724.7, dated Sep. 25, 2019, 7 pages.
Invitation to Pay Additional Fees and, Where Applicable, Protest Fee for International application No. PCT/GB2019/051494, dated Sep. 19, 2019.
Combined Search and Examination Report under Sections 17 and 18(3), dated Sep. 27, 2019, for Application No. GB1907736.1, 6 pages.
Invitation to Pay Additional Fees and, Where Applicable, Protest Fees, for International application No. PCT/GB2019/051499, dated Sep. 4, 2019.
Invitation to Pay Additional Fees and, Where Applicable, Protest Fee, for International Application No. PCT/GB2019/051496, dated Aug. 29, 2019.
Anonymous, "Time-of-flight mass spectrometry", Wikipedia, Apr. 28, 2018 (Apr. 28, 2018), XP055614063, Retrieved from the Internet:URL:https://en.wikipedia.org/w/index.php title=Time-of-flight_mass_spectrometry oldid=838663844 [retrieved on Aug. 20, 2019].
Invitation to Pay Additional Fees and, Where Applicable, Protest Fees for International application No. PCT/GB2019/051497, dated Sep. 2, 2019.
Combined Search and Examination Report under Sections 17 and 18(3) for Application No. GB1907745.2, dated Aug. 13, 2019, 7 pages.
Invitation to Pay Additional Fees and, Where Applicable, Protest Fee, for International application No. PCT/GB2019/051501, dated Jul. 29, 2019, 14 pages.
International Search Report and Written Opinion for International application No. PCT/GB2019/051497, dated Nov. 5, 2019, 19 pages.
International Search Report and Written Opinion for International application No. PCT/GB2019/051503, dated Sep. 25, 2019, 17 pages.
International Search Report and Written Opinion for International application No. PCT/GB2019/051496, dated Oct. 23, 2019, 29 pages.
International Search Report and Written Opinion for International application No. PCT/GB2019/051506, dated Sep. 25, 2019, 14 pages.
International Search Report and Written Opinion for International application No. PCT/GB2019/051494, dated Nov. 18, 2019, 20 pages.
International Search Report and Written Opinion for International application No. PCT/GB2019/051507, dated Oct. 15, 2019, 17 pages.
International Search Report and Written Opinion for International application No. PCT/GB2019/051508, dated Oct. 23, 2019, 16 pages.
International Search Report and Written Opinion for International application No. PCT/GB2019/051499, dated Nov. 5, 2019, 19 pages.
Examination Report under Section 18(3) for Application No. GB1907719.7, dated Jul. 28, 2021, 9 pages.
Parkes, S. SpaceWire User Guide, STAR-Dundee [online] 2012 [retrieved on Aug. 13, 2021]. Retrieved from Internet URL: https://www.star-dundee.com/wp-content/star_uploads/general/SpaceWire-Users-Guide.pdf, 117 pages.
Sciex, "3200 Series of Instruments System User Guide" [online], published Apr. 2018, available from: https://sciex.com/content/dam/SCIEX/pdf/customer-docs/user-guide/3200-system-user-guide-en.pdf, 241 pages.
Combined Search and Examination Report under Sections 17 and 18(3), for Application No. GB2100898.2, dated Jun. 21, 2021, 7 pages.
Combined Search and Examination Report under Sections 17 and 18(3), for Application No. GB2001530.1, dated Aug. 5, 2020, 7 pages.
Thermo Fisher Scientific, Inc, Feb. 2015, Orbitrap Fusion Hardware Manual [online]. Retrieved from Internet URL: http://www.unitylabservices.eu/content/dam/tfs/ATG/CMD/cmddocuments/oper/oper/ms/lc-ms/sys/Man-80000-97016-Orbitrap-Fusion-Hardware-Man8000097016-A-EN.pdf, 122 pages.
Shion, H., et al., "Meeting the Challenges of Implementing Accurate-Mass Mass Spectrometry for Biotherapeutic Development in Regulated/non-Regulated Environments", 2019 BioPharma Analytical Summit BioAccord Abstract. ASMS MS-in-QC, PowerPoint 24 pages.
International Preliminary Report on Patentability for International application No. PCT/GB2019/051510, dated Dec. 1, 2020, 7 pages.
Examination Report under Section 18(3) for Application No. GB1907739.5, dated Nov. 3, 2020, 5 pages.
Niehuis, E., et al., "Design and performance of a reflectron based time-of-flight secondary ion mass spectrometer with electrodynamic primary ion mass separation", Journal of Vacuum Science and Technology A, 5(4):1243-1246, Jul. 31, 1987.

(56) References Cited

OTHER PUBLICATIONS

Asamura, K., et al. "Low-energy particle experiments-ion mass analyzer (LEPi) onboard the ERG (Arase) satellite", Earth, Planets and Space, 70(70):2-15, (2018).
Parkes, S., " The Operation and Uses of the SpaceWire Time-Code", International SpaceWire Seminar (ISWS 2003), Nov. 4-5, 2003, ESTEC Noordwijk, The Netherlands.

* cited by examiner

Fig. 16F

| Control Name | Relative voltage | | | Absolute volatge range (V) | Polarity* |
|---|---|---|---|---|---|
| | Range from (V) | Range (V) | w.r.t. | | |
| Capillary | 0 | 1500 | Ground | 1500 | Same |
| Source offset | 0 | 30 | Step 1 gradient | 400 | Same |
| Step 1 gradient | 0 | 30 | Step 1 offset | 370 | Same |
| Step 1 offset | 0 | 40 | Step 2 offset (cone) | 340 | Same |
| Step 2 gradient | 0 | 40 | Step 2 offset (cone) | 340 | Same |
| Step 2 offset (cone) | 0 | 200 | Aperture 1 | 300 | Same |
| Aperture 1 | 0 | 10 | Ion guide gradient | 100 | Same |
| Ion guide gradient | 0 | 5 | Ion guide offset A | 90 | Same |
| Ion guide offset A | 0 | 5 | Ion guide offset B (entrance) | 85 | Same |
| Ion guide offset B (entrance) | 0 | 80 | Ground | 80 | Same |
| Aperture 2 | 0 | 10 | Ion guide offset (entrance) | 80 | Opposite |
| Aperture 2 trap | 0 | 10 | Ion guide offset (entrance) | 90 | Same |
| Acceleration 1 | 0 | 100 | Ion guide offset (entrance) | 80 | Opposite |
| Acceleration 2 | 0 | 100 | Ion guide offset (entrance) | 80 | Opposite |
| Aperture 3 | 0 | 0 | Ground | 0 | n/a |
| Transport 1 | 0 | 100 | Ion guide offset (entrance) | 80 | Opposite |
| Transport 2 | 0 | 100 | Ion guide offset (entrance) | 85 | Opposite |
| Steering | -5 | 5 | Transport 2 | 85 | Opposite |
| Tube lens | 0 | 0 | Ground | 0 | n/a |
| Entrance plate | 0 | 0 | Ground | 0 | n/a |
| Pusher | 0 | 1100 | Ground | 1000 | Same |
| Pusher offset | -5 | 5 | Ground | 10 | Same |
| Third grid | 0 | 0 | Ground | 0 | n/a |
| Second grid | 0 | 0 | Ground | 0 | n/a |
| Flight tube | 0 | 4500 | Ground | 4500 | Opposite |
| Reflectron grid | 0 | 0 | Ground | 0 | n/a |
| Reflectron | 0 | 1725 | Ground | 1725 | Same |
| Detector | 0 | 4000 | Flight tube | 8500 | Positive |

BENCH-TOP TIME OF FLIGHT MASS SPECTROMETER

CROSS-REFERENCE TO RELATED APPLICATION

This application is a U.S. national phase filing claiming the benefit of and priority to International Patent Application No. PCT/GB2019/051497, filed on May 31, 2019, which claims priority from and the benefit of United Kingdom patent application No. 1808932.6 filed on 31 May 2018 May 31, 2018. The entire contents of these applications are incorporated herein by reference.

FIELD OF THE INVENTION

The present invention relates generally to mass spectrometry and in particular to a small footprint or bench-top Time of Flight ("TOF") mass spectrometer which has particular application in the biopharmaceutical industry.

BACKGROUND

Conventional mass spectrometers which may be used, for example, in the biopharmaceutical industry tend to be relatively complex and have a relatively large footprint.

Scientists in the biopharmaceutical industry need to collect high resolution accurate mass data for their samples in order to provide more comprehensive information than can be obtained using LCUV analysis. Conventionally, this is typically achieved either by running relatively complex mass spectrometry equipment or by outsourcing the analysis to a specialist service.

It is desired to provide a reduced footprint Time of Flight ("TOF") mass spectrometer which may have particular application in the biopharmaceutical industry.

SUMMARY

In accordance with certain aspects at least, the present disclosure seeks to provide a mass spectrometer which is easy to use, particularly by non-expert users. Significant problems may be encountered by the inexperienced user in determining whether the mass spectrometer is in a correct operational state. To this end, in accordance with certain aspects and embodiments of the disclosure, the mass spectrometer is arranged to automatically perform a start-up routine upon switching ON of the mass spectrometer. The start-up routine may involve performing certain checks relating to the operational state of the mass spectrometer and/or getting the spectrometer into a state in which it is ready to use.

Mass spectrometers which are arranged to automatically perform a start-up routine, in which the instrument is pumped down, and communication with electronics brought up, are known.

GB-2519853 (Micromass) discloses a method of automatically performing a routine on a mass spectrometer in order to check whether the mass spectrometer is in a correct operational state.

However, the Applicant has realised that there is scope to provide an improved start-up routine for a mass spectrometer, in particular which may provide enhanced ease of use of the apparatus.

As used herein, in relation to the disclosure in any of its aspects or embodiments, the term automatic start-up routine refers to a start-up routine which proceeds automatically, without intervention by a user, after switching ON of the mass spectrometer by a user. The start-up routine is performed under the control of a control system of the mass spectrometer.

In accordance with certain aspects and embodiments of the disclosure, at least some of the functionality of the mass spectrometer is implemented by a set of a plurality of functional modules. The modules may be discrete. Each module is operable to perform a predetermined function of the mass spectrometer when connected thereto in use. Each module may be removably connected to the mass spectrometer for implementing selected function(s) of the mass spectrometer in use. In use, the user may select a set of modules to provide desired functionality of the mass spectrometer, and connect them to the mass spectrometer before switching the mass spectrometer ON to initiate the start-up procedure. In this way, the user may readily customise the functionality of the mass spectrometer to their requirements, and may easily modify the functionality provided by changing the set of modules connected thereto, providing greater ease of use and flexibility.

In accordance with an aspect of the disclosure there is provided a method of performing a start-up routine for a mass spectrometer, the start-up routine being performed automatically upon switching ON the mass spectrometer, wherein the mass spectrometer comprises a plurality of functional modules connected thereto, each module operable to perform a predetermined function of the mass spectrometer in use, and wherein the start-up routine comprises detecting which functional modules are present in the set of a plurality of functional modules connected to the mass spectrometer, and performing one or more steps of the start-up routine based upon the results of the detection.

In accordance with a further aspect of the disclosure there is provided a mass spectrometer comprising a control system which is arranged to automatically perform a start-up routine for the mass spectrometer upon switching ON the mass spectrometer, wherein the mass spectrometer comprises a plurality of functional modules connected thereto, each module operable to perform a predetermined function of the mass spectrometer in use, and wherein the start-up routine comprises detecting which functional modules are present in the set of a plurality of functional modules connected to the mass spectrometer, and performing one or more steps of the start-up routine based upon the results of the detection.

It will be appreciated that the present disclosure in this further aspect may incorporate any of the features described in relation to the method aspects of the disclosure, and vice versa unless the context demands otherwise. Thus, the control system may be arranged to perform a start-up routine in accordance with any of the embodiments described.

In accordance with the disclosure in these aspects and embodiments, a particularly flexible and easy to use spectrometer is provided, whose functions are provided by modules, and which is adapted to perform a start-up routine which takes account of the modules. The step of detecting the functional modules refers to the mass spectrometer i.e. a control system thereof, detecting those functional modules which are present and operable to perform a predetermined function of the mass spectrometer in use.

The functional modules may be used to provide any desired functions. A module may be arranged to control a particular component of the mass spectrometer to provide a given function. A functional module may comprise electrical, mechanical, electromechanical, or software components; or a combination thereof. The components may be configured so as to carry out, on demand, the predetermined function. For example, a functional module may comprise: one or more ion source components; one or more ion guide components; one or more transfer lens components; one or more mass analyser components, such as a pusher electrode, a reflectron, an ion detector, a pre-amplifier, an ion signal ADC, etc.; one or more fluidics components; one or more front display panel components; one or more gauges; one or more sensors; one or more pumps; one or more valves; and/or one or more actuators; etc. One or more such functional modules may be the functional blocks which together form some or all of the mass spectrometer according to various embodiments. Two or more functional modules may be physically discrete from one another, each being embodied in a separate unit and/or housing and/or having separate components. Two or more functional modules may also or instead be provided within a single physical unit and/or housing and/or may share one or more components. A functional module may also or instead be contained within a single physical unit and/or housing. A functional module may also or instead be distributed across plural physical units and/or housings. A functional module may also or instead be defined in software.

The method may comprise configuring the mass spectrometer based on the detected functional modules. The mass spectrometer is able to detect which modules have been connected thereto, and configure itself appropriately based on the detected modules. This provides improved ease of use. The mass spectrometer may be arranged to configure itself using configuration information obtained from any suitable source. The configuration information may be stored locally i.e. by the mass spectrometer or a local computer device used to control the mass spectrometer, and/or may be obtained from a remote server. In some embodiments the method may comprise the mass spectrometer automatically determining whether configuration information is stored locally in respect of each one of the detected functional modules, and, for the or each one of the detected functional modules for which such information is found to be stored locally, automatically using the information in configuring the mass spectrometer, and, for any one or ones of the detected functional modules for which such information is not found to be stored locally, automatically obtaining configuration information for the one or ones of the detected functional modules from a remote server, and using the configuration information in configuring the mass spectrometer. Configuration information in respect of a module, however acquired, may be used in configuring the mass spectrometer system as a whole, any subsystem(s) thereof, and/or in configuring the relevant specific module(s). As mentioned above, locally stored configuration information may be stored by the mass spectrometer itself and/or by a local computer device connected thereto, whether by a wired or wireless connection, which local computer device is arranged for controlling the mass spectrometer in use. It will be appreciated that while the mass spectrometer can comprise a user interface to enable the user to control the spectrometer, alternatively, or additionally, the mass spectrometer may be connected to a local computer device for use by the user in controlling the operation of the spectrometer.

Each of the functional modules may be individually addressable and connected in a network. Thus, in embodiments, the modules are able to communicate with one another over a distributed control system when connected to the mass spectrometer. Such an arrangement is described in US 2015/0076338 (Micromass). This may enable the modules to be connected to the mass spectrometer in any location i.e. such that the same functionality may be provided regardless of which one of a plurality of connectors the module is connected to in use. In embodiments the mass spectrometer comprises a scheduler operable to introduce discrete packets of instructions to the network at predetermined times to instruct at least one functional module to perform a predetermined operation.

In embodiments the functional modules may be connected to the mass spectrometer in any given location(s). In some embodiments the mass spectrometer comprises a system control module comprising a set of connectors to which modules may be connected. Optionally the set of connectors is arranged such that any module may be connected to any one of the connectors for providing the predetermined function of the mass spectrometer associated with the respective module in use. In other words, the user is not required to plug a given module for providing a particular function into a particular connector, but is free to plug any module into any connector. However, it will be appreciated that a module may not necessarily be a physical module unit which is physically connected and disconnected to the mass spectrometer. As stated above, a module may be any component(s) which provide a predetermined function when connected to the mass spectrometer in use. A module may comprise electrical, mechanical, electromechanical, or software components; or a combination thereof. The connection or disconnection of a module may be a physical and/or electrical connection or disconnection.

Each module may be associated with an identifier, and the step of detecting which module is present may comprise determining the identifier associated with each module present. An identifier may be indicative of the type, variant and/or use of the functional module, and may be unique.

Alternatively or additionally, other steps may be performed based on the result of detecting the modules present. These steps may be performed before or after configuring the mass spectrometer, if such a step is performed. The method may comprise determining whether the detected modules correspond to an allowed combination of modules, and, where the detected modules do correspond to an allowed combination, continuing with the start-up routine. For example, the mass spectrometer may proceed to the configuring stage described above. Where the detected modules do not correspond to an allowed combination of modules, the method may comprise the mass spectrometer determining a fault state of the spectrometer. For example, it may be required that, in any given set of modules connected to the mass spectrometer, modules are present for controlling each of a plurality of predetermined functions of the mass spectrometer in order for the spectrometer to be able to function. If any one of the required modules is absent, a fault state may be determined. As will be described in more detail below, the mass spectrometer may then repeat the step of detecting the modules present after a predetermined period, and escalate the fault if an allowed combination of modules is still not detected. If the allowed combination of modules is subsequently found to be present, the start-up routine may be continued. The method may comprise storing data indicative of possible modules which may be connected to the mass spectrometer, and permitted combinations thereof, and using the stored data in determining whether the detected modules correspond to an allowed combination of modules. The allowed set of modules may correspond to a set which is expected by the mass spectrometer e.g. based on the identity of one or more of the set. For example, where one particular module is present, one or more other modules may be expected to be present to result in an allowed combination of modules.

The step of detecting the functional modules present involves detecting those functional modules present which are operable as defined, to perform a predetermined function of the mass spectrometer in use. Thus, the detected functional modules are detected operational functional modules. The functional modules present and operational may be physically and/or electrically connected to the mass spectrometer. In embodiments in which it is determined whether the detected modules correspond to an allowed combination of modules, it will be appreciated that it is the detected operational modules which are taken into account. It is envisaged that functional modules may be physically and/or electrically connected to the spectrometer, but, due to a fault, unable to communicate with the control system, or, in embodiments, network. In embodiments in which each of the functional modules is individually addressable and connected in a network in use, the mass spectrometer detects which functional modules are present in the set of modules connected to the mass spectrometer and connected to the network so as to be operable to perform a predetermined function of the mass spectrometer in use. In embodiments it may be determined that one or more functional module is connected to the mass spectrometer but is not operable e.g. is not connected to the network. Such functional modules would be disregarded when determining whether the detected functional modules correspond to an allowed combination of modules.

Previously known automatic start-up routines for mass spectrometers, such as those disclosed in GB-2519853 (Micromass) have ended, in the absence of any fault being detected, with the mass spectrometer being in a full operating state.

In embodiments the mass spectrometer comprises a mass analyser and ion optics for guiding ions from an ion source to the mass analyser in use, and the start-up routine comprises, when a first set of one or more conditions is met, putting the mass spectrometer into a power save mode, wherein the power save mode is a mode in which voltage is supplied to one or more components of the mass analyser, and voltage is not supplied to one or more components of the ion optics between the ion source and the mass spectrometer.

It is believed that these embodiments are advantageous in their own right i.e. independent of whether the start-up routine involves detecting functional modules of the mass spectrometer, or indeed, whether the mass spectrometer even includes such modules.

In accordance with a further aspect of the disclosure there is provided a method of performing a start-up routine for a mass spectrometer, the start-up routine being performed automatically upon switching ON the mass spectrometer, wherein the mass spectrometer comprises a mass analyser and ion optics for guiding ions from an ion source to the mass analyser in use;

wherein the start-up routine comprises, when a first set of one or more conditions is met, putting the mass spectrometer into a power save mode, wherein the power save mode is a mode in which voltage is supplied to one or more components of the mass analyser, and voltage is not supplied to one or more components of the ion optics between the ion source and the mass spectrometer.

In accordance with a further aspect of the disclosure there is provided a mass spectrometer arranged to perform a start-up routine automatically upon switching ON the mass spectrometer, wherein the mass spectrometer comprises a mass analyser and ion optics for guiding ions from an ion source to the mass analyser in use;

wherein the start-up routine comprises, when a first set of one or more conditions is met, putting the mass spectrometer into a power save mode, wherein the power save mode is a mode in which voltage is supplied to one or more components of the mass analyser, and voltage is not supplied to one or more components of the ion optics between the source and the mass spectrometer.

It will be appreciated that the present disclosure in this further aspect may incorporate any of the features described in relation to the method aspects of the disclosure, and vice versa, unless the context demands otherwise.

It will be appreciated that the present disclosure in these further aspects may incorporate any of the features described in relation to the earlier aspects of the disclosure, and vice versa, to the extent they are not mutually inconsistent. Thus, the mass spectrometer may comprise functional modules as described earlier, and the start-up routine may include any of the steps described in relation to the modules.

In accordance with the disclosure in these further aspects and embodiments, therefore, rather than automatically switching the mass spectrometer to a fully operating mode when a first set of one or more conditions is met, the mass spectrometer is instead switched to a power save mode. The power save mode is a state in which voltage is supplied to only some of the components of the mass spectrometer, i.e. to component(s) of the mass analyser and not to one or more components of the ion optics between the source and the mass analyser. In embodiments at least, as described below, voltages of one or more components of the ion source, and a gas supply of the ion source, are also off in the power save mode.

Voltage is supplied to one or more, and optionally each of the components of the mass analyser in the power save mode. Voltage may be supplied to any subset of the components. It will be understood that a component of the mass analyser may be any component, such as a physical part and/or an electronic part e.g. controlling a part or parts of the mass analyser. For example, the component may be a functional module, or a part of a functional module. It will be appreciated that the voltages supplied to different components of the mass analyser may be the same or different. Voltage is not supplied to one or more, or optionally any, of the components of the ion optics in the power save mode. It will be appreciated that a voltage applied to any component may be of any form, such as any combination of one or more DC or AC voltages.

The voltage supply to the one or more components of the mass analyser may be switched on upon transition to the power save mode.

The mass analyser may be a Time of Flight ("TOF") mass analyser. In embodiments the Time of Flight mass analyser then comprises a pusher electrode and a detector, and, between the pusher electrode and detector, comprises a flight tube and ion optics for guiding ions from the electrode to the detector in use. In embodiments voltage is supplied to the pusher electrode, flight tube, detector and ion optics of the mass analyser when the mass spectrometer is in power save mode. The ion optics of the mass analyser may be a reflectron. However, it will be appreciated that the mass analyser need not be a Time of Flight mass analyser. The ion optics of the mass spectrometer are upstream of the pusher electrode of the mass analyser, in embodiments.

In embodiments, the mass spectrometer is automatically switched to the power save mode before a pressure of a vacuum chamber housing the mass analyser has reached an operating level. In embodiments the method comprises pumping the mass analyser vacuum chamber while the mass spectrometer is in power save mode. The method may comprise pumping the mass analyser vacuum chamber to reduce the pressure therein before switching the spectrometer to the power save mode, and continuing to pump the vacuum chamber after switching to the power save mode.

In embodiments, the start-up routine comprises a sequence of checks which must be performed to determine whether the mass spectrometer is in a correct operating state. The mass spectrometer may be switched to the power save mode when a first subset of the sequence of checks has been passed. The first set of one or more conditions which must be met in order for the mass spectrometer to be put into a power save mode, (and hence the first subset of the sequence of checks), may include a requirement that a pressure within a vacuum chamber housing the mass analyser falls below a first predetermined threshold. In exemplary embodiments the first predetermined threshold is $1\times10^{-5}$ mbar. It has been recognised that it is advantageous to switch to the power saving mode as soon as possible, to maximise time for the voltage supplied to the components of the mass analyser to settle. Thus, the transition to power saving mode advantageously occurs relatively early in a start-up routine.

In various embodiments, the method further comprises subsequently, if a set of one or more further conditions is met, automatically putting the mass spectrometer into an operating mode, in which voltage is supplied to one or more components of both the mass analyser and the ion optics between the source and the mass spectrometer. Voltage is optionally supplied to each of the components of the mass analyser and the ion optics. The supply of voltage to the ion optics may occur on transition to the operating mode.

The set of one or more further conditions required for the mass spectrometer to be put into the operating mode may be selected as desired. In embodiments, the mass spectrometer is automatically switched from the power save mode to the operating mode when the pressure within a vacuum chamber housing the mass analyser falls below a second predetermined threshold, wherein the second predetermined threshold is lower than the first predetermined threshold. The second predetermined threshold may be a threshold corresponding to an operating pressure for the mass analyser vacuum chamber. In exemplary embodiments the second predetermined threshold is $1\times10^{-6}$ mbar. The first threshold may then correspond to a pressure above an operating pressure for the mass analyser vacuum chamber. The operating pressure of the chamber refers to the pressure deemed appropriate for use in operation of the mass spectrometer. In these embodiments, the mass spectrometer may automatically enter the power save mode when the pressure within the mass analyser vacuum chamber has decreased to a certain level, and only enters the operating mode once the pressure has decreased further from that level to a level deemed appropriate for operation.

In the power save mode, in some embodiments voltage is not supplied to one or more components of the ion source. For example, in exemplary embodiments, voltage is supplied only to a source heater of the ion source. In various embodiments, in the operating mode, voltage is supplied to one or more (additional) components of the ion source. The voltage may be supplied to (additional) components on transition to the operating mode. In the operating mode voltage may be supplied to each component of the ion source. As with the mass analyser, a different voltage may be supplied to different ones of a plurality of components of the ion source. It will be appreciated that a voltage applied to a component of the ion source may be of any form, such as any combination of one or more DC or AC voltages. For example, where the ion source is an Electrospray Ionisation ("ESI") source, the components may include any one or ones of; a source heater, a capillary tube of the source, a heater for a desolvation gas of the source, a temperature sensor for sensing the temperature of the desolvation gas, and a desolvation heater arranged to heat a desolvation gas. As is known in the art, an ESI source comprises an Electrospray probe comprising an inner capillary tube through which an analyte liquid may be supplied. The inner capillary tube may be surrounded by a nebuliser capillary tube. The inner capillary tube and the nebuliser capillary tube may be surrounded by a desolvation heater which may be arranged to heat a desolvation gas. In embodiments, in the operating mode, voltage is supplied to a capillary tube of the source, and a desolvation heater is switched on.

In embodiments, when the mass spectrometer is in the power save mode, one or more gas supplies associated with the mass spectrometer are turned off. In embodiments, a desolvation gas supply of the ion source is turned off. When in the operating mode, one or more gas supplies of the mass spectrometer are turned on. In embodiments, the desolvation gas supply is turned on. The gas supply e.g. desolvation gas supply may be turned on on transition to the operating mode.

In the power save mode, voltage is not supplied to one or more, and optionally any, components of the ion optics between the ion source and the mass analyser. In the operating mode, voltage is additionally supplied to one or more, and optionally each of the components of the ion optics between the ion source and mass analyser. The voltage to the ion optics may be switched on upon transition to the operating mode. The ion optics between the ion source and the mass analyser may comprise one or more ion guides. A plurality of different ion guides may be present. For example, ion guides may be selected from any one or ones of; a conjoined ring ion guide, a segmented quadrupole rod set ion guide, and a set of one or more transfer lenses, and/or any one or more of the ion guides described above, or elsewhere herein. In some embodiments the mass spectrometer comprises a first ion guide, and a second ion guide downstream of the first ion guide. The first ion guide may comprise a conjoined ring ion guide, and the second ion guide may comprise a segmented quadrupole rod set ion guide. The mass spectrometer may further comprise a set of one or more transfer lenses located downstream of the second ion guide.

In any of the aspects or embodiments in which voltage is supplied to the ion optics and/or ion source, this may involve different voltages being applied to different components thereof, and the voltage(s) may differ from those supplied to other parts of the mass spectrometer i.e. different voltage(s) may be applied to the mass analyser, source and ion optics or components thereof. The voltage applied to a component may comprise any combination of one or more DC or AC voltages. This may be the case in particular for ion guides. Furthermore, as described in relation to the mass analyser, a component of the ion optics or ion source may be any component, such as a physical part and/or an electronic part e.g. controlling a part or parts of the ion optics or ion source as appropriate. The component may be a functional module, or a part of such a functional module.

While the mass spectrometer is in power save mode, in general, as described above, the voltage to the mass analyser and its components is on. It has been found that the stability of the power supplies for the mass analyser (and the components thereof), may affect the mass accuracy of the spectrometer. On conventional mass spectrometers, it is typically necessary to allow the power supplies to settle and stabilise for a time, e.g. 20 minutes before the spectrometer is ready for operation. By introducing a power save mode in which voltage is supplied to the mass analyser prior to the mass spectrometer entering a full operating mode, the power supply/voltage(s) to the components of the mass analyser have the opportunity to settle, potentially while pumping is still in progress to reduce the pressure in a vacuum chamber housing the mass analyser to an operating level. This means that by the time the required operating pressure has been attained, the voltage supplies to the component(s) of the mass analyser are likely to have stabilised, enabling the mass spectrometer to function with accuracy as soon as the operating pressure is reached, and, in embodiments, the spectrometer enters an operating mode. As described above, other voltages e.g. those supplied to the source, and a source desolvation gas supply etc. are not switched on in the power saving mode. In other words, the voltages to the mass analyser which require time to settle are switched on, but, to save power, other voltages which are not subject to such instability issues remain off, until the spectrometer enters an operational mode.

The Applicant has recognised that it is advantageous for the mass spectrometer to be maintained in the power save mode as described above, in any of the aspects or embodiments, as a default, when not required to be in an operating mode. Conventionally, once a user had finished performing a particular operation with a mass spectrometer, they would switch the mass spectrometer into a standby mode until it was required to operate again. This would involve voltage supplies to the mass analyser components being turned off. As described above, it takes some time for the voltage to the mass analyser to stabilise once switched on. If the supplies have been left off for a prolonged period of time, or are cold, it might take as much as 10 hours for the supplies to warm up and stabilise. Thus, the Applicant has realised that it is disadvantageous to return the spectrometer to a state in which such voltages are switched off after use, as this will lead to delays in the spectrometer being ready for use again, or at least being in a state in which there can be confidence in the mass accuracy of the spectrometer.

In accordance with the disclosure, in addition to a power save and operating mode, the mass spectrometer may have a standby mode in which voltage is not supplied to one or more components of the mass analyser and voltage is not supplied to one or more components of the ion optics. In embodiments, in standby mode, voltage is not supplied to any components of the mass analyser and/or to any components of the ion optics. In embodiments, the spectrometer is able to enter a standby mode in which the voltage to one or more components of the mass analyser and, where applicable, component(s) of the ion options, is switched off automatically in the event of a fault condition being detected, or by intervention of a service engineer.

The spectrometer may be arranged such that it returns to the power save mode by default after operation in the operating mode. The spectrometer may be arranged to return to the power save mode automatically e.g. after a predetermined period of inactivity, or, optionally, in response to a user input. Thus, this may be the state to which the spectrometer returns when the user switches it "off".

In accordance with a further aspect of the disclosure there is provided a mass spectrometer comprising a mass analyser and ion optics for guiding ions from an ion source to the mass analyser in use;

wherein the mass spectrometer is configured to be switched between three modes;

a power save mode in which voltage is supplied to one or more components of the mass analyser and not to one or more components of the ion optics between the source and the mass spectrometer, an operating mode in which voltage is supplied to one or more components of the mass analyser and to one or more components of the ion optics between the source and the mass spectrometer, and a standby mode in which voltage is not supplied to one or more components of the mass analyser or to one or more components of the ion optics between the source and the mass spectrometer.

It will be appreciated that the present disclosure in this further aspect may incorporate any of the features described in relation to the earlier aspects of the disclosure, and vice versa, to the extent they are not mutually inconsistent therewith. Likewise, the present disclosure in any of its earlier aspects or embodiments may include any of the features of this further aspect.

As described in relation to the earlier aspects and embodiments, voltage may be supplied to one or more components of, or optionally each component of the mass analyser, ion optics of the mass spectrometer or ion source of the mass spectrometer, as appropriate. Different components may be provided with the same or differing voltages. The voltage applied to a component may comprise any combination of one or more DC or AC voltages. A component of the mass spectrometer e.g. of the mass analyser, ion optics and/or ion source, may be any component, such as a physical part and/or an electronic part e.g. controlling a part or parts of the mass analyser, ion optics and/or ion source. The component may be a functional module, or a part of such a functional module. Likewise, different parts of the mass spectrometer, and the components thereof, e.g. mass analyser, ion optics and ion source, may be supplied with the same or different voltages. For the avoidance of doubt, these comments apply equally to the earlier aspects or embodiments involving a power save mode or operating mode. Any reference to supplying voltage to a part of the mass spectrometer e.g. mass analyser, ion optics, ion source etc. should be understood to refer to supplying a voltage to one or more, or optionally each component thereof, unless the context demands otherwise.

In embodiments the standby mode may be entered automatically in the event of a fault condition being detected. Thus, the standby mode may be entered when it is necessary to disable the spectrometer e.g. for safety reasons, such as when a fault develops that would require the attention of an engineer. The standby mode may be considered to be a "safe" mode. The standby mode is, in embodiments, entered when a serious fault is detected requiring the attention of an engineer. Such a standby mode may be entered in accordance with the disclosure in any of its aspects or embodiments when a fault is detected requiring the attention of an engineer, whether during or after completion of the start-up routine. In some embodiments, it is envisaged that the standby mode may only be entered in the event of a fault condition being detected. In embodiments the standby mode may also be entered by intervention of a service engineer. In some embodiments, the standby mode may be entered by the user e.g. in the event of a serious fault. For example, the user may be able to press and hold the power button to enter the standby mode, whereas a shorter touch of the power button would simply enter the power save mode. However, in other embodiments it is envisaged that the user may not be able cause the mass spectrometer to enter the standby mode. The standby mode may then only be entered automatically or upon intervention by a service engineer. This may help to ensure the spectrometer is more quickly ready for use, as described above.

In embodiments, when in the standby mode, voltage is supplied to the ion source heater. In embodiments, when in the standby mode, voltage is not supplied to any other components of the ion source.

The power save and operating modes may be entered under the conditions described above in relation to any of the earlier aspects or embodiments of the disclosure referring to a start-up routine, and may involve carrying out any of the steps described above e.g. in terms of which voltages are on or off, or whether a gas supply of the source is on or off etc. In embodiments, the voltages are switched on or off, or the gas supply turned on or off, on transition to the applicable mode.

In accordance with any of the aspects or embodiments of the disclosure, the mass spectrometer may comprise a mass analyser and ion optics for guiding ions from an ion source to the mass analyser in use. It will be appreciated that any of the constructional details now described are applicable to the disclosure in any of its aspects or embodiments, and any of these features may be used to further define any reference to a mass spectrometer herein, to the extent they are not mutually exclusive. For example, the mass spectrometer may include any of the configurations of pumps and vacuum chambers described. Likewise, the ion optics, mass analyser or source may be in accordance with any of the embodiments described herein, even where those are introduced by reference to a particular aspect.

The mass spectrometer may comprise one or more vacuum chambers, and the start-up routine may comprise turning on one or more vacuum pumps to reduce the pressure in one or more of the vacuum chambers. The mass spectrometer may comprise one or more further vacuum chambers, each housing at least a portion of the ion optics of the spectrometer. In some embodiments the mass spectrometer comprises a vacuum chamber housing at least a portion of the ion optics of the spectrometer (the ion optics between the ion source and mass analyser), and a backing pump operable to pump the vacuum chamber, and the method comprises operating the backing pump to reduce the pressure in the vacuum chamber housing the at least a portion of the ion optics. The method may comprise detecting when a backing pressure has decreased to a predetermined level, and then turning on a pump associated with one or more other vacuum chambers of the spectrometer downstream of the chamber housing the at least a portion of the ion optics for reducing the pressure therein. In some embodiments the pump associated with the one or more other vacuum chambers is operable to pump a vacuum chamber housing the mass analyser of the spectrometer, and optionally one or more further vacuum chambers housing a further portion of the ion optics. The pump may be a turbo pump. It is envisaged that the pump associated with the one or more further vacuum chambers could also be arranged to pump the first mentioned vacuum chamber housing at least a portion of the ion optics, which vacuum chamber is pumped by the backing pump, or such a vacuum chamber may be pumped only by the backing pump. The backing pump may or may not also be operable to pump any one or ones of the one or more further vacuum chambers housing a further portion of the ion optics. Of course, various pumping configurations may be used, and rather than using one pump to pump multiple chambers, a pump may be provided in respect of each chamber, or at least in relation to a subset thereof.

It will be appreciated that various configurations of vacuum chambers, pumps, and ion optics may be envisaged. By way of example, in one exemplary embodiment, the spectrometer may comprise a first vacuum chamber housing a first ion guide, which is pumped by the backing pump. Downstream of the first vacuum chamber, the spectrometer may comprise at least one further vacuum chamber housing a portion of the ion optics of the spectrometer. For example, the spectrometer may comprise a second vacuum chamber housing a second ion guide, and optionally, a third vacuum chamber downstream of the second vacuum chamber housing a third ion guide. The first ion guide may comprise a conjoined ring ion guide, and the second ion guide may comprise a segmented quadrupole rod set ion guide. In some embodiments the spectrometer may further comprise a vacuum chamber downstream of the first vacuum chamber (and also downstream of a second vacuum chamber where present), the further vacuum chamber comprising a set of one or more transfer lenses. The spectrometer further comprises a vacuum chamber housing the mass analyser downstream of the other vacuum chamber(s).

As described above, in certain aspects and embodiments, a module check and/or switching to a power save mode, are carried out as part of a start-up routine. For example, switching to the power save mode may occur when a first set of one or more conditions is met. The start-up routine comprises a sequence of steps e.g. checks which are performed to determine that the spectrometer may be placed in an operating condition (or otherwise a fault condition). Some embodiments of a start-up routine will now be described. It will be appreciated that these steps may be incorporated in any of the earlier described aspects or embodiments of the disclosure.

Where the mass spectrometer is arranged to perform an automatic start-up routine, the mass spectrometer may comprise a mass analyser and ion optics for guiding ions from an ion source to the mass analyser in use, a vacuum chamber housing at least a portion of the ion optics of the spectrometer, and a backing pump operable to pump the vacuum chamber, and a pump associated with one or more other vacuum chambers of the spectrometer downstream of the vacuum chamber housing the at least a portion of the ion optics for reducing the pressure within the one or more other vacuum chambers, wherein the pump is operable to pump a vacuum chamber housing the mass analyser of the spectrometer, and one or more further vacuum chamber housing a respective further portion of the ion optics. A control system of the mass spectrometer may be arranged to operate the backing pump to reduce the pressure in the vacuum chamber housing the at least a portion of the ion optics, and to detect when backing pressure has decreased to a predetermined level, and then turn on the pump associated with the one or more other vacuum chambers of the spectrometer. A method of performing a start-up routine may include corresponding steps.

In accordance with a further aspect of the disclosure, there is provided a method of performing a start-up routine for a mass spectrometer, the start-up routine being performed automatically on switching ON the mass spectrometer, wherein the mass spectrometer comprises a mass analyser and ion optics for guiding ions from an ion source to the mass analyser in use;

a vacuum chamber housing at least a portion of the ion optics of the spectrometer, and a backing pump operable to pump the vacuum chamber;

a pump associated with one or more other vacuum chambers of the spectrometer downstream of the vacuum chamber housing the at least a portion of the ion optics for reducing the pressure within the one or more other vacuum chambers, wherein the pump is operable to pump a vacuum chamber housing the mass analyser of the spectrometer, and one or more further vacuum chamber housing a respective further portion of the ion optics;

the method comprising operating the backing pump to reduce the pressure in the vacuum chamber housing the at least a portion of the ion optics;

detecting when a backing pressure has decreased to a predetermined level, and then turning on the pump associated with the one or more other vacuum chambers of the spectrometer;

the method further comprising putting the mass spectrometer into a power save mode when a first set of one or more conditions is met, wherein the power save mode is a mode in which voltage is supplied to one or more components of the mass analyser, and voltage is not supplied to one or more components of the ion optics between the source and the mass spectrometer;

wherein the first set of one or more conditions includes a requirement that a pressure within the vacuum chamber housing the mass analyser has fallen below a first predetermined threshold; and automatically switching the mass spectrometer from the power save mode to an operating mode when it is determined that a further set of one or more conditions is met, wherein the further set of one or more conditions includes a requirement that the pressure within the vacuum chamber housing the mass analyser has fallen below a second predetermined threshold, wherein the second predetermined threshold is lower than the first predetermined threshold, and wherein, in the operating mode, voltage is supplied to one or more components of the mass analyser and to one or more components of the ion optics between the source and the mass spectrometer.

In accordance with a further aspect of the disclosure there is provided a mass spectrometer comprising a control system which is arranged to automatically perform a start-up routine for the mass spectrometer upon switching ON the mass spectrometer, wherein the mass spectrometer comprises a mass analyser and ion optics for guiding ions from an ion source to the mass analyser in use;

a vacuum chamber housing at least a portion of the ion optics of the spectrometer, and a backing pump operable to pump the vacuum chamber;

a pump associated with one or more other vacuum chambers of the spectrometer downstream of the vacuum chamber housing the at least a portion of the ion optics for reducing the pressure therein, wherein the pump is operable to pump a vacuum chamber housing the mass analyser of the spectrometer, and one or more further vacuum chamber housing a respective further portion of the ion optics;

the method comprising operating the backing pump to reduce the pressure in the vacuum chamber housing the at least a portion of the ion optics;

detecting when a backing pressure has decreased to a predetermined level, and then turning on the pump associated with the one or more other vacuum chambers of the spectrometer;

the method further comprising putting the mass spectrometer into a power save mode when a first set of one or more conditions is met, wherein the power save mode is a mode in which voltage is supplied to one or more components of the mass analyser, and voltage is not supplied to one or more components of the ion optics between the source and the mass spectrometer;

wherein the first set of one or more conditions includes a requirement that a pressure within the vacuum chamber housing the mass analyser has fallen below a first predetermined threshold; and automatically switching the mass spectrometer from the power save mode to an operating mode when it is determined that a further set of one or more conditions is met, wherein the further set of one or more conditions includes a requirement that the pressure within the vacuum chamber housing the mass analyser has fallen below a second predetermined threshold, wherein the second predetermined threshold is lower than the first predetermined threshold, and wherein, in the operating mode, voltage is supplied to one or more components of the mass analyser and to one or more components of the ion optics between the source and the mass spectrometer.

The present disclosure in these further aspects or embodiments may include any or all of the features described in relation to the earlier aspects and embodiments of the disclosure, to the extent they are not mutually exclusive. Thus, any one of the steps of the start-up routine may include any of the additional steps or details described in relation to the earlier aspects and embodiments of the disclosure. Any method aspect may include any of the features described in relation to the apparatus, and vice versa, unless the context demands otherwise.

The following description may facilitate understanding of additional steps which may form part of a start-up routine in any of the aspects or embodiments of the disclosure, and the sequence of steps which may form part of a start-up routine, and how they may be combined with various steps described in relation to the earlier aspects of the disclosure.

In accordance with any of the aspects or embodiments of the disclosure in which a backing pump and pump for pumping at least the vacuum chamber housing the mass analyser are turned on, after the pumps have been turned on, the method may comprise switching on the voltages to the or each functional module present, in those aspects and embodiments including such modules, and optionally performing a module check in accordance with any of the embodiments previously described.

In any of the aspects and embodiments of the disclosure, the pump for pumping at least the vacuum chamber housing the mass analyser may be a turbo pump. In some embodiments the method may then comprise turning on a pressure gauge of the mass analyser when the turbo pump speed exceeds a predetermined threshold e.g. relative to a maximum speed of the pump e.g. 80%. Alternatively or additionally, the steps defined above in relation to functional modules of the spectrometer where present e.g. detecting the modules present and performing one or more steps based thereon, may be performed when the speed of the turbo pump exceeds a predetermined threshold. The threshold may be 80% of the maximum speed of the pump.

Regardless of whether or not the mass spectrometer comprises functional modules, the method may comprise automatically switching the spectrometer to the power save mode when a first set of one or more conditions is met, the set of one or more conditions including a requirement that the pressure in the vacuum chamber housing the mass analyser has fallen below a predetermined threshold. Thus the switching to the power save mode during the start-up routine may be performed after the above steps have been carried out. The threshold may correspond to the first threshold described above in relation to those aspects of the disclosure involving a power save mode.

Subsequent to switching the spectrometer to the power save mode, the method may comprise performing one or more checks before switching the spectrometer to an operating mode. The method may comprise automatically switching the mass spectrometer from the power save mode to the operating mode when it is determined that a further set of one or more conditions is met, wherein the further set of one or more conditions includes a requirement that the pressure within the vacuum chamber housing the mass analyser has fallen below a second predetermined threshold, wherein the second predetermined threshold is lower than the first predetermined threshold. The second threshold may correspond to the second threshold described above in relation to those aspects of the disclosure involving a power save mode.

The further set of one or more conditions may include a requirement that the voltage supplied to the mass analyser (or to any one or ones, or each of its components e.g. detector, reflectron, etc) has stabilised within a predetermined time period before proceeding to the operating mode. Thus the method may comprise checking that the voltage has stabilised in this manner.

Alternatively or additionally, the further set of one or more conditions may include a requirement that there is no fault detected within the mass analyser (or a component thereof e.g. a Time of Flight analyser) within a predetermined period after the voltage supply to the mass analyser is switched on based on automatically monitoring of the current associated with one or more components of the mass analyser. The method may comprise automatically monitoring the current associated with one or more components of the mass analyser for a predetermined period after the voltage supply to the mass analyser is switched on to determine whether there is a fault within the mass analyser.

It is believed that this step is advantageous in its own right, independent of whether a mass analyser is switched between power save and operating modes. Previously it was necessary for a user to perform any such current monitoring using software.

In accordance with a further aspect of the disclosure there is provided a mass spectrometer comprising a control system which is arranged to automatically perform a start-up routine for the mass spectrometer upon switching ON the mass spectrometer, wherein the mass spectrometer comprises a mass analyser and ion optics for guiding ions from an ion source to the mass analyser in use, the method comprising supplying voltage to one or more components of the mass analyser, and automatically monitoring the current associated with one or more components of the mass analyser for a predetermined period after a voltage supply to the mass analyser is switched on to determine whether there is a fault within the mass analyser.

In accordance with a further aspect of the disclosure there is provided a method of performing a start-up routine for a mass spectrometer, the start-up routine being performed automatically upon switching ON the mass spectrometer, wherein the mass spectrometer comprises a mass analyser and ion optics for guiding ions from an ion source to the mass analyser in use, the method comprising supplying a voltage to one or more components of the mass analyser, and automatically monitoring the current associated with one or more components of the mass analyser for a predetermined period after a voltage supply to the mass analyser is switched on to determine whether there is a fault within the mass analyser.

It will be appreciated that the present disclosure in these further aspects may incorporate any of the features described in relation to the earlier aspects of the disclosure, and vice versa, to the extent they are not mutually inconsistent therewith. Any method aspect may include any of the features described in relation to the apparatus, and vice versa unless the context demands otherwise. A component may be e.g. any part, or parts, whether physical, electrical, or a combination thereof. A component may control a part or parts of the mass analyser. A component may be a functional module or part thereof. The method may comprise supplying a voltage to any one or ones, or optionally each component of the mass analyser. The component(s) in respect of which current is monitored may be one or more or each of the component(s) to which voltage is supplied. For example, in exemplary embodiments, current supplied to a flight tube, detector and reflectron of a mass analyser may be monitored. The stability of the power supplies to these components may have a significant impact on mass accuracy of the spectrometer.

The method may involve placing the mass spectrometer in an operating mode if no fault is detected within the mass analyser, and optionally, one or more further conditions are met.

In those aspects and embodiments of the disclosure in which the mass spectrometer is put into an operating mode in which voltage is supplied to one or more components of both the mass analyser and the ion optics between the source and mass spectrometer, the method may comprise performing one or more checks once the operating mode has been entered. Where voltage is supplied to one or more components of the ion source in the operating mode, the checks may include checking that a voltage supplied to one or more components of the ion source has reached a required value within a predetermined time period. Alternatively or additionally, other checks may be carried out in relation to the ion source in the operating mode. For example, a check may be performed as to whether the temperature of the desolvation gas settles within a predetermined period, or that the desolvation gas supply is turned on.

It will be appreciated that the start-up routine may include other checks and steps which have not been described, which additional checks and/or steps may be inserted at any suitable point in the routine. For example, a check may be carried out in relation to the stability of any voltage, or to check operation of any relevant part of the mass spectrometer. Where the spectrometer is switched to a power save mode or an operating mode once an applicable set of one or more conditions has been met, the set of conditions may or may not include additional conditions to those mentioned above. For example, where the spectrometer is switched to power save mode when a first set of one or more conditions is met, including a condition in relation to the pressure of the mass analyser vacuum chamber, the spectrometer may or may not be switched to the power save mode when that particular condition is found to be met, as entry to the power save mode may depend upon other conditions being fulfilled e.g. in relation to voltage stability etc. The order of the checks i.e. whether the pressure of the mass analyser chamber is determined before or after, or simultaneously with any other checks e.g. voltage stability, may be selected as desired.

Once the start-up process is complete, and, in embodiments, the mass spectrometer is in an operating mode, the mass spectrometer may be considered to be in a ready state, being ready to acquire sample data. No user intervention is required to set up the spectrometer. The user may now simply submit a sample batch.

It will be appreciated that, in the context of a start-up routine, various checks are performed, to ensure that the mass spectrometer is in a correct operational state. There is a possibility that any of these checks may result in a determination that the spectrometer is in a fault state. For example, it may be found that the pressure in a vacuum chamber housing the mass analyser has not decreased to a required level for operation, or that a voltage applied to a component thereof has not settled within an expected time period. Similarly, during operation, subsequent to the start-up routine, it may be determined that the mass spectrometer is in a fault state.

As mentioned above, in certain aspects at least, the present disclosure seeks to provide a mass spectrometer which may be more easily used, particularly by non-expert users. In accordance with a further aspect of the disclosure there is provided a mass spectrometer comprising a control system arranged to assess an operational state of the mass spectrometer, wherein, when a fault is detected by the control system, the control system is arranged to assign the fault to one of a plurality of categories, wherein the categories include a first category of faults which may be attempted to be rectified automatically by the mass spectrometer, a second category of faults which may be attempted to be rectified by the user, and a third category of faults which may only be attempted to be rectified by a service engineer, the control system performing one or more steps based upon the assigned category of the fault.

In accordance with a further aspect of the disclosure there is provided a method of operating a mass spectrometer, wherein the method comprises a control system of the mass spectrometer assessing an operational state of the mass spectrometer, and, when a fault is detected, assigning the fault to one of a plurality of categories, wherein the categories include a first category of faults which may be attempted to be rectified automatically by the mass spectrometer, a second category of faults which may be attempted to be rectified by the user, and a third category of faults which may only be attempted to be rectified by a service engineer, the control system performing one or more steps based upon the assigned category of the fault.

It will be appreciated that the present disclosure in these further aspects may incorporate any of the features described in relation to the earlier aspects of the disclosure, and vice versa, to the extent they are not mutually inconsistent therewith. Any method aspect may include any of the features described in relation to the apparatus, and vice versa unless the context demands otherwise.

It will be appreciated that the mass spectrometer in these, and the additional further aspects of the disclosure below relating to faults, may be of the construction of any of the earlier aspects and embodiments of the disclosure, and may incorporate any of the features described in relation thereto.

Of course, more than three categories of fault may be used. However, for simplicity, in embodiments, only three fault categories are used, and any detected fault is assigned to one of the three categories described herein.

When a fault is assigned to the first category of faults, the control system may be arranged to proceed to initiate an attempt to automatically rectify the fault. In this case, an indication of the existence of a fault need not necessarily be output to a user. The mass spectrometer may effectively self-diagnose and self-rectify a fault without intervention by a user. The user may not even be aware that a fault occurred.

When a fault is assigned to the second category of faults, the control system may be arranged to cause information relating to the fault to be displayed to the user, the information comprising data indicative of the fault and data indicative of one or more steps to be taken by the user to attempt to rectify the fault.

When a fault is assigned to the third category of faults, the control system may be arranged to cause information relating to the fault to be displayed to the user, the information comprising data indicative of the fault, and an indication that the user should call a service engineer. The information may comprise instructions for the user as to how to contact a service engineer. For example, the information may comprise contact details for an engineer. It is envisaged that the information may enable the user to directly contact an engineer. For example, a link to a contact form for contacting an engineer may be provided, or a button may be displayed which may be pressed to log a call with an engineer.

The displayed data indicative of a fault, for the second or third categories of fault, may be of any type, and may include text, one or more graphical icons, images etc. and combinations thereof. The appearance of an existing icon may be changed to indicate a fault e.g. the colour of a status indicating icon, such as an icon relating to a particular part of the spectrometer, may be changed, e.g. from green to amber or red. In embodiments, the displayed data indicative of a fault is associated with a colour indicative of the category of the fault. For example, faults in the second category may be associated with an amber colour, and faults in the third category may be associated with a red colour. For example, an alert may be displayed to the user on a background of the relevant colour, and/or a traffic light symbol may be displayed etc.

It is believed that a mass spectrometer configured to provide an indication of a fault to a user, and data indicative of how the user may attempt to resolve the fault, is advantageous in its own right. From a further aspect of the disclosure there is provided a mass spectrometer comprising a control system arranged to assess an operational state of the mass spectrometer, wherein the control system is arranged, when a fault is detected, to determine whether the fault is in a category of faults which may be attempted to be rectified by a user, and when the fault is in such a category, the control system is arranged to cause information relating to the fault to be displayed to the user, the information comprising data indicative of the fault and data indicative of one or more steps to be taken by the user to attempt to rectify the fault.

From a further aspect of the disclosure there is provided a method of operating a mass spectrometer comprising assessing an operational state of the mass spectrometer, and, when a fault is detected, determining whether the fault is in a category of faults which may be attempted to be rectified by a user, and when the fault is in such a category, causing information relating to the fault to be displayed to the user, the information comprising data indicative of the fault and data indicative of one or more steps to be taken by the user to attempt to rectify the fault.

It will be appreciated that the present disclosure in these further aspects may incorporate any of the features described in relation to the earlier aspects of the disclosure, and vice versa, to the extent they are not mutually inconsistent therewith. Any method aspect may include any of the features described in relation to the apparatus, and vice versa unless the context demands otherwise.

In accordance with any of these further aspects or embodiments relating to detection of faults, the construction of the mass spectrometer may be of the type described in relation to any of the earlier aspects and embodiments. Thus, the mass spectrometer comprises an ion source and mass analyser, and ion optics therebetween. Any arrangement of pumps and/or vacuum chambers, and components within the general parts may be used, such as described above.

In those aspects and embodiments of the disclosure in which data indicative of one or more steps to be taken by a user to attempt to rectify a fault is displayed to a user, the data may be in any suitable form. For example, the data may comprise a set of instructions to be followed by the user. The data may be indicative of one or more parts of the mass spectrometer, and one or more steps to be performed by the user in relation to those part(s) of the mass spectrometer. The data may include, for example, text, one or more icons, one or more images, one or more videos, and any combinations thereof. In embodiments the data comprises one or more image and/or an instructional video indicative of the steps to be taken. For example, an image may indicate the part of the spectrometer having a fault, and the step to be taken e.g. an arrow indicating that a part needs to be removed. The data indicative of each step may be of any of these forms. Where multiple steps are to be performed by the user, a sequence of instructions may be provided indicative of the steps to be taken. Each instruction may be of any of the forms described e.g. text, icon(s), image(s) and/or video(s).

In any of the aspects or embodiments of the disclosure in which the user is invited to rectify a fault, the control system may be arranged to perform one or more tests to determine whether the fault has been rectified once the user has attempted to rectify the fault. While the control system may be arranged to automatically detect when the user has attempted to rectify a fault e.g. by detecting that the required steps have been performed, in embodiments the control system is arranged to perform the one or more tests once an indication is received from the user that they have attempted to rectify the fault. In embodiments the control system is arranged to display one or more graphical elements to a user which may be used by the user to provide an indication that they have attempted to rectify the fault. In some embodiments a button is displayed to the user which may be pressed by the user to indicate that they have attempted to rectify the fault e.g. a "resolve" button.

When it is determined that the fault has been rectified following action by the user, the control system may be arranged to change a status of the part or parts of the mass spectrometer affected by the fault from a "fault" state to a "ready for operation" state. If, following action by the user, the fault is found not to have been rectified, information may be displayed to the user inviting the user to attempt to rectify the fault again, and indicating one or more steps to be taken by the user to attempt to rectify the fault again. The information may be of any of the forms described in relation to the first attempt by the user to rectify the fault. Once again, once an indication has been received that the user has attempted to rectify the fault, the mass spectrometer may be arranged to perform one or more tests to check whether the fault has been rectified. This cycle may be repeated a predetermined number of times until no further attempts are allowed by the user to rectify the fault. Any suitable number of attempts may be allowed e.g. from 1-3. The number of attempts may depend upon the part(s) of the mass spectrometer affected by the fault, and e.g. the impact on safety. At this stage the fault may be escalated to a category which may only be attempted to be rectified by a service engineer (i.e. the third category in the particular aspects and embodiments described above). As described in relation to the third category, the control system may then cause information relating to the fault to be displayed to the user, the information comprising data indicative of the fault, and an indication that the user should call a service engineer.

In some embodiments the control system may be arranged, when it is determined that a fault has not been rectified after a permitted number of attempts by a user, reassigning the fault to a category of faults which may only be attempted to be rectified by a service engineer. In those aspects and embodiments having first, second and third categories of fault, the fault may be reassigned to the third category of faults. Any of the steps described in relation to the third category of faults may then be performed i.e. displaying information to a user indicative of the fault, and an indication that the user should call a service engineer.

Where data is displayed to a user, e.g. in the case of the second or third category of faults for those aspects and embodiments using such categories, the data may be displayed to the user in any manner. The data may be displayed to the user on a display of the mass spectrometer and/or on a computer device connected to the mass spectrometer (whether by a wired or wireless connection). For example, in the case of the second category of faults, or those further aspects generally referring to a category of fault which may be attempted to be rectified by a user, the control system may cause the data indicative of one or more steps to be taken by the user to attempt to rectify the fault to be displayed to the user on a computer device connected to the mass spectrometer. This may enable more detailed information to be presented to the user, and provide greater scope for interaction with the user. This also facilitates different formats of data to be provided to the user e.g. video etc. However, additionally, or alternatively, information relating to the fault may be displayed on a display of the mass spectrometer i.e. which forms part of the mass spectrometer unit. Data indicative of the existence of a fault may be displayed on both a computer device connected to the mass spectrometer and on a display of the mass spectrometer itself. For example, such an indication may be provided on the display of the mass spectrometer using one or more icon.

It is believed that displaying information relating to an operational state of a mass spectrometer using a display that forms part of the mass spectrometer unit is advantageous in its own right, providing greater ease of use.

In accordance with a further aspect of the disclosure there is provided a mass spectrometer comprising a control system and a display, wherein the control system is arranged to assess an operational state of the mass spectrometer, wherein the control system is arranged to cause information relating to an operational status of the mass spectrometer, or a part thereof, to be displayed to a user on the display of the mass spectrometer. The information may be displayed on a display panel of the mass spectrometer.

It will be appreciated that the present disclosure in these further aspects may incorporate any of the features described in relation to the earlier aspects of the disclosure, and vice versa, to the extent they are not mutually inconsistent therewith. Any method aspect may include any of the features described in relation to the apparatus, and vice versa. The control system may be arranged to perform any of the steps described in relation to the method, and vice versa.

It will be appreciated that the display of the mass spectrometer in these aspects and embodiments of the disclosure forms part of the mass spectrometer unit i.e. it is not a display of a separate computer device connected to the mass spectrometer. The display forms part of an external surface of the mass spectrometer. The display may be mounted to or integral with a main housing of the mass spectrometer. The display may be a display panel.

In these aspects or embodiments, the information relating to an operational status of the mass spectrometer, or a part thereof, may comprise data indicative of a fault. The data indicative of a fault may comprise data indicative of the existence of the fault and the part(s) of the spectrometer affected by the fault. The indication may comprise one or more icons. The indication of the fault may be associated with a colour indicative of a category of the fault e.g. a second or third category as described above. The category of the fault may be based on its severity. For example, faults may be associated with amber or red colours, depending upon their severity. In embodiments, only limited information relating to a fault is displayed on the display of the mass spectrometer itself. More detailed information, such as data indicative of the steps a user may take to attempt to rectify a fault, may be displayed on a computing device connected to the mass spectrometer.

In these aspects and embodiments, it will be appreciated that information relating to a detected fault need not necessarily be displayed to a user in respect of every fault detected. For example, in embodiments in which the fault is assigned a category, whether or not information relating to the detected fault is displayed to a user on the display of the spectrometer may depend upon the category to which the fault is assigned.

Regardless of where information relating to a fault is displayed, in embodiments in which a fault is assigned to a category, such as one of the first, second and third categories defined in certain aspects and embodiments of the disclosure, the control system may assign a fault to one of the three categories in any suitable manner. The mass spectrometer may store data indicative of possible faults, and the category to which such faults should be assigned, for use by the control system in assigning a fault to one of the three categories. In certain circumstances, for example, where an automatic or user performed attempt to rectify a fault has failed, e.g. after a permitted number of attempts, a fault may be recategorised to the third category, such that the fault must be rectified by a service engineer. In general, the faults may be assigned to a category based on a severity of the fault. Thus, a fault which has not been successfully rectified after one or more attempt may be considered to be more severe than the same fault when first diagnosed.

In accordance with any of the aspects or embodiments of the disclosure involving the control system assessing the operational status of the mass spectrometer, and, where applicable, determining a fault, the assessing may be performed in any suitable manner. Assessing may simultaneously be carried out in relation to many different subsystems of the spectrometer. The control system may be arranged to assess the operation of the mass spectrometer using one or more sensors. Thus, a fault may be detected by one or more sensors of the mass spectrometer. It will be appreciated that assessing of the operational status may be carried out regardless of whether the mass spectrometer is in a power save mode or operating mode, where such modes are used, or where the spectrometer is in the process of initial start-up e.g. before reaching a power save mode. Assessing of the operational status is not limited to the mass spectrometer being in an operating mode. Assessing the operational state is also used during start-up of the apparatus from cold, or from a power save mode, or after maintenance.

It will be appreciated that any reference to the mass spectrometer being in a fault state or otherwise affected by a fault herein refers to any part or parts of the mass spectrometer being faulty. A part of the spectrometer may refer to any component or aspect thereof, and may refer e.g. to a particular sub-system e.g. electronic subsystem, rather than, or in addition to, a physical part. The part may be a functional module or a part thereof. A fault may affect any subsystem(s) of the mass spectrometer. The mass spectrometer is made up of numerous sub-systems, each of which might develop a fault. Likewise, each of a plurality of different aspects of a particular sub-system may be affected by a fault. For example, a fault may affect the mechanical or electronic aspects of a sub-system. In other cases, a fault may affect the operation of more than one sub-system, or may affect operation of the spectrometer more generally e.g. a fault relating to the control system. Similarly, the step of assessing the operational state of the mass spectrometer may comprise assessing the overall operational state of the mass spectrometer and/or any part(s) thereof. A plurality of sets of one or more sensors may be used to assess respective parts of the mass spectrometer.

The control system may be arranged to detect faults using data obtained from one or more sensors of the mass spectrometer in any suitable manner. The ability of the mass spectrometer to self-diagnose faults is important in providing ease of use. The mass spectrometer (i.e. a control system thereof) may be arranged to assess the operation of one or more parts of the spectrometer, and assign a status to the or each part. Assessing may be carried out periodically or continually, or may be triggered by certain events. Where assessing is performed periodically, this may be at predetermined or other intervals. For example, assessing may occur more frequently if a fault status is detected, or may be prompted by completion of a process to try to rectify the fault as described above. Alternatively or additionally, assessing may be triggered by reaching a certain stage in a start-up process, or by a parameter reaching a particular value etc. Assessing may occur at a predetermined service interval. Assessing may involve monitoring the operational state of the mass spectrometer or part(s) thereof. The method may comprise assessing the operation of the one or more parts, and assigning a status to the or each part at intervals. Assessing may involve performing one or more tests to assign a status to a part, and/or may involve assessing e.g. monitoring one or more sensor outputs. The status which may be assigned to the or each part may be selected from a list of statuses including one or more fault state, and one or more non-fault state. For example, a non-fault state may be a ready for operation state. Other non-fault states may include a getting ready for operation state. Fault states may include fault states of differing levels of severity. Depending upon the level of severity, a fault state may be assigned to one of the three categories described above. Where a fault status is determined, the control system may be arranged to disable the affected part(s) of the mass spectrometer. This may depend upon the severity of the fault.

In embodiments, information indicative of a determined status of the mass spectrometer and/or part thereof may be displayed to a user. This information may be displayed on a display of the mass spectrometer itself. The status may be a non-fault state or a fault state as described above. Thus, in embodiments, status information is provided to the user even when the mass spectrometer and/or part thereof is not in a fault state. In some embodiments, data is displayed to the user indicative of whether any part of the mass spectrometer has been found to be in a fault state, or whether the mass spectrometer or a part thereof is in a non-fault state. An indication may be given as to which one of a plurality of fault or non-fault states the spectrometer or its part(s) are in. For example, an icon may indicate that the spectrometer is in a ready or getting ready state.

In some embodiments a display panel of the mass spectrometer includes a first area comprising a plurality of icons indicative of the overall operational state of the mass spectrometer. For example, the icons may be indicative of the spectrometer being in an initialising state, ready state, running state, or a fault state, and if so, the category of the fault e.g. whether the user may attempt to rectify the fault or should call an engineer. The spectrometer may be considered to be in a fault state if there is a fault affecting any part(s) thereof. At least when the spectrometer is in a fault state, the display panel may include a second area comprising one or more, or a plurality of icons indicative of respective part(s) of the mass spectrometer which are affected by a detected fault. It is envisaged that a plurality of icons in the second area may always be present and displayed to the user. The appearance of an icon indicative of a part of the spectrometer may then be changed to indicate the existence of a fault affecting the part. Thus, the second part of the display panel may comprise a further set of one or more, or a plurality of icons indicative of one or more parts of the mass spectrometer which are not affected by a fault. Regardless of when the icons indicative of different parts of the spectrometer are displayed to the user, the appearance, e.g. colour of the icon may be used, and optionally changed, to indicate the severity of a fault. For example, an icon may be shown as amber or red. Alternatively the icon may flash, or otherwise change to attract the attention of the user. An icon may be present only when a part is affected by a fault, or may be present at all times, with the appearance of the icon being changed to indicate the existence of a fault e.g. a colour may be changed. For example, the colour may change from green to amber or red. In embodiments, the second area of the display comprises a plurality of icons indicative of the status of different parts of the mass spectrometer. The status may be a fault or a non-fault status. For example, where no fault affects a part, the icon representing the part may be coloured green. In the event of a fault, the icon may be coloured or otherwise altered as described above to indicate the severity of the fault. In any of the embodiments involving displaying a fault or non-fault status of a part of the mass spectrometer to a user, the parts may be e.g. a source, fluidics, electronics, gas, vacuum etc. The parts may be general or specific parts of the spectrometer. The first and second areas of the display may be side by side.

In accordance with any of the aspects and embodiments of the disclosure, the step of assessing the operational state of the mass spectrometer may comprise assessing any one of a plurality of parameters. The parameters may include, for example, backing pressure, turbo pump fan speed, functional module operational state, pressure of a vacuum chamber housing the mass analyser, turbo pump fan speed, voltage and/or current of one or more component of the mass analyser e.g. pusher electrode, detector, reflectron, flight tube voltage, and/or current of one or more component of the ion optics of the mass spectrometer, voltage and/or current of one or more component of the source, ion source desolvation gas temperature, desolvation gas pressure, ion source heater temperature etc. Alternatively or additionally, other aspects of the operation may be assessed e.g. whether an ion source door is closed, whether there is any defect in an ion source enclosure etc.

It will be appreciated that multiple faults may occur simultaneously e.g. in relation to different parts of the mass spectrometer. For example, a fault may occur in relation to the backing pump and functional modules of the spectrometer. In embodiments the method may further comprise, where multiple faults are detected, assigning at least some of the faults a priority level. This may be achieved e.g. using stored data indicative of priority levels to be assigned to different possible faults which may occur. Priority levels may be assigned to different possible faults in any suitable manner, and multiple possible faults may be assigned the same priority level. For example, where a number of possible faults may occur in respect of a part of the spectrometer, but could not occur simultaneously, e.g. a particular component being misaligned or missing, they may be assigned the same priority level. In embodiments a priority level is associated at least with those faults which are in a category which may be attempted to be rectified by a user (i.e. category 2 faults in embodiments having three categories of faults). In embodiments in which information relating to a fault comprising data indicative of the fault and data indicative of one or more steps to be taken by the user to attempt to rectify the fault is displayed to a user, the method may comprise, where multiple faults which may be attempted to be rectified by a user exist simultaneously, using priority levels associated with the faults to determine an order in which the faults are to be presented to a user.

The results of monitoring may be used in various manners to determine the existence and nature of a fault.

Some exemplary arrangements will now be described, by reference to faults which may occur in relation to the backing pump.

The mass spectrometer may include a backing pump. The mass spectrometer may comprise a mass analyser and ion optics for guiding ions from an ion source to the mass analyser in use. The mass spectrometer may comprise a vacuum chamber housing at least a portion of the ion optics of the spectrometer, and a backing pump operable to pump the vacuum chamber.

The method may comprise using a backing pressure measurement to determine the existence of a fault. The conditions under which a backing pressure measurement may be considered to indicate a fault will depend upon the state of operation of the mass spectrometer, e.g. whether part of a start-up routine, or at which point of the start-up routine, or when in an operating state. In a start-up routine, a fault may be determined when, upon initial start-up, the backing pressure measurement does not fall below a predetermined threshold, such as 32 mbar, within a predetermined time period. Subsequently, after a turbo-pump is initiated, different thresholds in respect of the backing pressure measurement, or changes therein, may be used to trigger a fault determination.

The mass spectrometer may comprise an atmospheric pressure interface. The atmospheric pressure interface is located downstream of the ion source. Ions pass through the atmospheric pressure interface into the vacuum chamber housing the at least a portion of the ion optics of the spectrometer. The atmospheric pressure interface may comprise a disc having an aperture through which ions can pass. The disc may be a disposable disc. The disc may form part of a gas cone assembly.

A number of faults may be automatically determined based on a backing pressure measurement. For example, the backing pressure measurement may be used to determine the existence of fault in relation to the atmospheric pressure interface, such as a blockage in the atmospheric pressure interface, or a problem in relation to a disc of the atmospheric pressure interface, e.g. no disc present, incorrect disc inserted and/or incorrect disc alignment.

In accordance with any of the aspects or embodiments of the disclosure involving measuring backing pressure, a backing pressure measurement may be measured using a backing pressure sensor, such as a sensor in the vacuum line associated with the backing pump e.g. as located in FIG. 7A below.

In accordance with a further aspect of the present disclosure, there is provided a method of determining a fault in relation to a mass spectrometer, wherein the mass spectrometer comprises a mass analyser and ion optics for guiding ions from an ion source to the mass analyser in use, and further comprises a vacuum chamber housing at least a portion of the ion optics of the spectrometer, a backing pump operable to pump the vacuum chamber, and an atmospheric pressure interface located downstream of the ion source, wherein ions pass through the atmospheric pressure interface into the vacuum chamber housing the at least a portion of the ion optics of the spectrometer, and wherein the method comprises using a backing pressure measurement to determine the existence of a fault in relation to the atmospheric pressure interface. Optionally the atmospheric pressure interface comprises a disc having an aperture through which ions can pass, and the method comprises using a backing pressure measurement to determine the existence of a blockage in the atmospheric pressure interface, and/or a problem in relation to the disc of the atmospheric pressure interface. The problem in relation to the disc may be the absence of the disc, incorrect disc inserted and/or incorrect disc alignment. As described above, the mass spectrometer i.e. a control system thereof, may be arranged to perform such a method automatically.

It will be appreciated that the present disclosure in these further aspects may incorporate any of the features described in relation to the earlier aspects of the disclosure, and vice versa, to the extent they are not mutually inconsistent therewith. Any method aspect may include any of the features described in relation to the apparatus, and vice versa.

A further example will be described in relation to embodiments in which the mass spectrometer comprises a plurality of functional modules connected thereto, each module operable to perform a predetermined function of the mass spectrometer in use, wherein each of the functional modules is individually addressable and connected in a network in use. The method may comprise, as part of a start-up routine, determining the existence of a fault when one or more functional modules connected to the mass spectrometer fails to communicate with the network within a predetermined time period. During subsequent operation, a fault may be determined when one or more module which was initially connected to the network is disconnected from the network.

According to various embodiments a relatively small footprint or compact Time of Flight ("TOF") mass spectrometer ("MS") or analytical instrument is provided which has a relatively high resolution. The mass spectrometer may have particular application in the biopharmaceutical industry and in the field of general analytical Electrospray Ionisation ("ESI") and subsequent mass analysis. The mass spectrometer according to various embodiments is a high performance instrument wherein manufacturing costs have been reduced without compromising performance.

The instrument according to various embodiments is particularly user friendly compared with the majority of other conventional instruments. The instrument may have single button which can be activated by a user in order to turn the instrument ON and at the same time initiate an instrument self-setup routine. The instrument may, in particular, have a health diagnostics system which is both helpful for users whilst providing improved diagnosis and fault resolution.

According to various embodiments the instrument may have a health diagnostics or health check which is arranged to bring the overall instrument, and in particular the mass spectrometer and mass analyser, into a state of readiness after a period of inactivity or power saving. The same health diagnostic system may also be utilised to bring the instrument into a state of readiness after maintenance or after the instrument switches from a maintenance mode of operation into an operational state. Furthermore, the health diagnostics system may also be used to monitor the instrument, mass spectrometer or mass analyser on a periodic basis in order to ensure that the instrument in operating within defined operational parameters and hence the integrity of mass spectral or other data obtained is not compromised.

The health check system may determine various actions which either should automatically be performed or which are presented to a user to decide whether or not to proceed with. For example, the health check system may determine that no corrective action or other measure is required i.e. that the instrument is operating as expected within defined operational limits. The health check system may also determine that an automatic operation should be performed in order, for example, to correct or adjust the instrument in response to a detected error warning, error status or anomaly. The health check system may also inform the user that the user should either take a certain course of action or to give approval for the control system to take a certain course of action. Various embodiments are also contemplated wherein the health check system make seek negative approval i.e. the health check system may inform a user that a certain course of action will be taken, optionally after a defined time delay, unless the user instructs otherwise or cancels the proposed action suggested by the control system.

Embodiments are also contemplated wherein the level of detail provided to a user may vary dependent upon the level of experience of the user. For example, the health check system may provide either very detailed instructions or simplified instructions to a relatively unskilled user.

The health check system may provide a different level of detail to a highly skilled user such as a service engineer. In particular, additional data and/or instructions may be provided to a service engineer which may not be provided to a regular user. It is also contemplated that instructions given to a regular user may include icons and/or moving graphical images. For example, a user may be guided by the health check system in order to correct a fault and once it is determined that a user has completed a step then the control system may change the icon and/or moving graphical images which are displayed to the user in order to continue to guide the user through the process.

The instrument according to various embodiments has been designed to be as small as possible whilst also being generally compatible with existing UPLC systems. The instrument is easy to operate and has been designed to have a high level of reliability. Furthermore, the instrument has been designed so as to simplify diagnostic and servicing thereby minimising instrument downtime and operational costs.

According to various embodiments the instrument has particular utility in the health services market and may be integrated with Desorption Electrospray Ionisation ("DESI") and Rapid Evaporative Ionisation Mass Spectrometry ("REIMS") ion sources in order to deliver commercially available In Vitro Diagnostic Medical Device ("IVD")/ Medical Device ("MD") solutions for targeted applications.

The mass spectrometer may, for example, be used for microbe identification purposes, histopathology, tissue imaging and surgical (theatre) applications.

The mass spectrometer has a significantly enhanced user experience compared with conventional mass spectrometers and has a high degree of robustness. The instrument is particularly easy to use (especially for non-expert users) and has a high level of accessibility.

The mass spectrometer has been designed to integrate easily with liquid chromatography ("LC") separation systems so that a LC-TOF MS instrument may be provided. The instrument is particularly suited for routine characterisation and monitoring applications in the biopharmaceutical industry. The instrument enables non-expert users to collect high resolution accurate mass data and to derive meaningful information from the data quickly and easily. This results in improved understanding of products and processes with the potential to shorten time to market and reduce costs.

The instrument may be used in biopharmaceutical last stage development and quality control ("QC") applications. The instrument also has particular application in small molecule pharmaceutical, food and environmental ("F&E") and chemical materials analyses.

The instrument has enhanced mass detection capabilities i.e. high mass resolution, accurate mass and an extended mass range. The instrument also has the ability to fragment parent ions into daughter or fragment ions so that MS/MS type experiments may be performed.

For the avoidance of doubt, any feature described in relation to one aspect of the disclosure may be incorporated in any other aspect of the disclosure, to the extent they are not mutually exclusive. Any method step described herein may be performed by a mass spectrometer, or a control system thereof, unless the context demands otherwise. Where the mass spectrometer is stated to be arranged to perform a step, this may be implemented by a control system thereof, unless the context demands otherwise. A reference to a control system of a mass spectrometer may refer to any sub-system or systems of the mass spectrometer which are arranged to carry out the described function(s). The control system is arranged to perform the steps described automatically, i.e. without intervention by the user, unless the context demands otherwise. A control system may be implemented using hardware, software, firmware, or combinations thereof.

BRIEF DESCRIPTION OF THE DRAWINGS

Various embodiments together with other arrangements given for illustrative purposes only will now be described, by way of example only, and with reference to the accompanying drawings in which:

FIG. 16F illustrates the relative voltages and absolute voltage ranges at which the various ion optical components such as the Electrospray capillary probe, differential pumping apertures, transfer lens electrodes, pusher electrodes, reflectron electrodes and the detector are maintained according to various embodiments.

DETAILED DESCRIPTION

Various aspects of a newly developed mass spectrometer are disclosed. The mass spectrometer comprises a modified and improved ion inlet assembly, a modified first ion guide, a modified quadrupole rod set ion guide, improved transfer optics, a novel cantilevered time of flight arrangement, a modified reflectron arrangement together with advanced electronics and an improved user interface.

The mass spectrometer has been designed to have a high level of performance, to be highly reliable, to offer a significantly improved user experience compared with the majority of conventional mass spectrometers, to have a very high level of EMC compliance and to have advanced safety features.

The instrument comprises a highly accurate mass analyser and overall the instrument is small and compact with a high degree of robustness. The instrument has been designed to reduce manufacturing cost without compromising performance at the same time making the instrument more reliable and easier to service. The instrument is particularly easy to use, easy to maintain and easy to service. The instrument constitutes a next-generation bench-top Time of Flight mass spectrometer.

Figure 1:
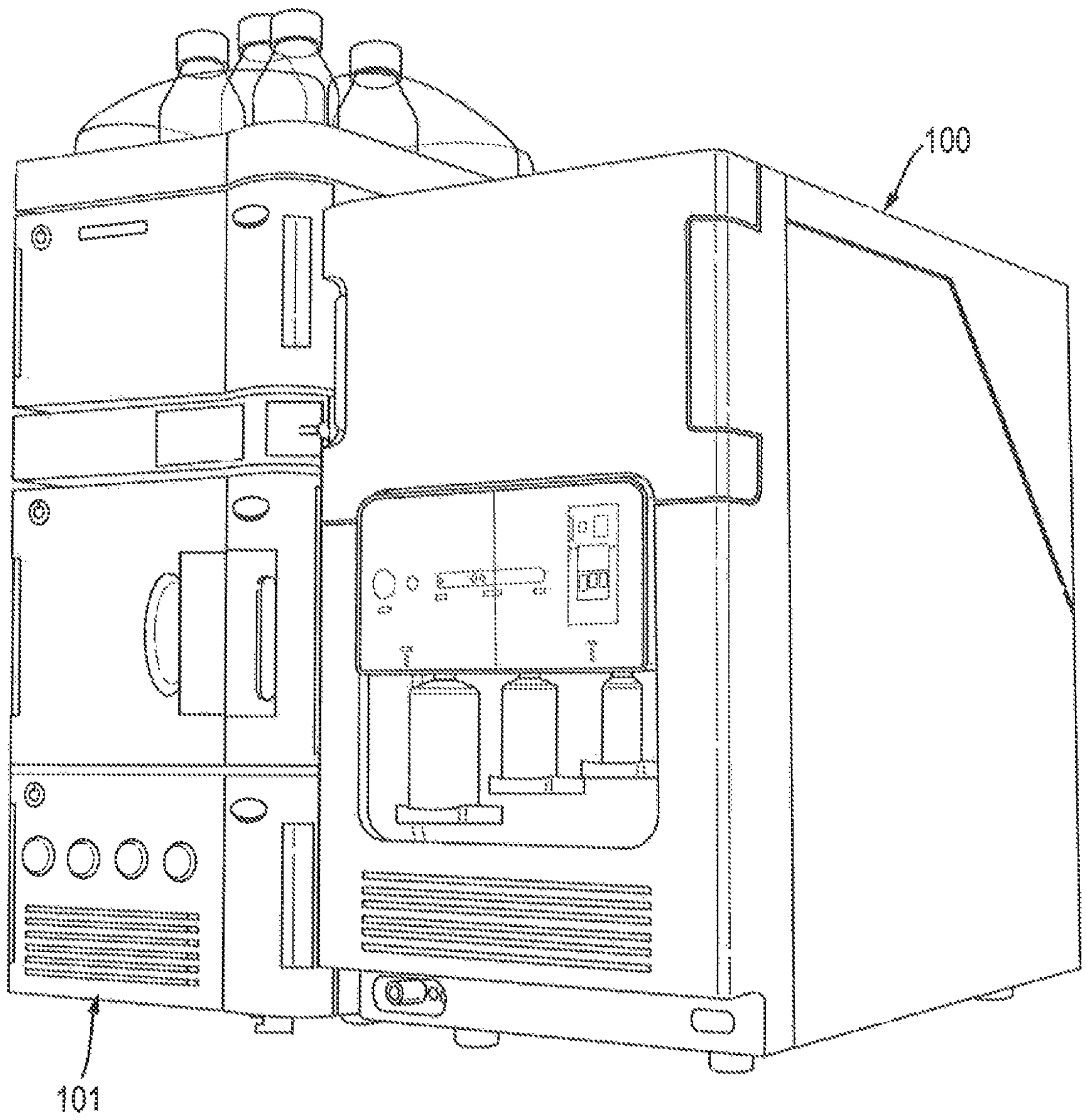
FIG. 1 shows a perspective view of a bench-top Time of Flight mass spectrometer according to various embodiments coupled to a conventional bench-top liquid chromatography ("LC") separation system.

FIG. 1 shows a bench-top mass spectrometer 100 according to various embodiments which is shown coupled to a conventional bench-top liquid chromatography separation device 101. The mass spectrometer 100 has been designed with ease of use in mind. In particular, a simplified user interface and front display is provided and instrument serviceability has been significantly improved and optimised relative to conventional instruments. The mass spectrometer 100 has an improved mechanical design with a reduced part count and benefits from a simplified manufacturing process thereby leading to a reduced cost design, improved reliability and simplified service procedures. The mass spectrometer has been designed to be highly electromagnetic compatible ("EMC") and exhibits very low electromagnetic interference ("EMI").

Figure 2A:
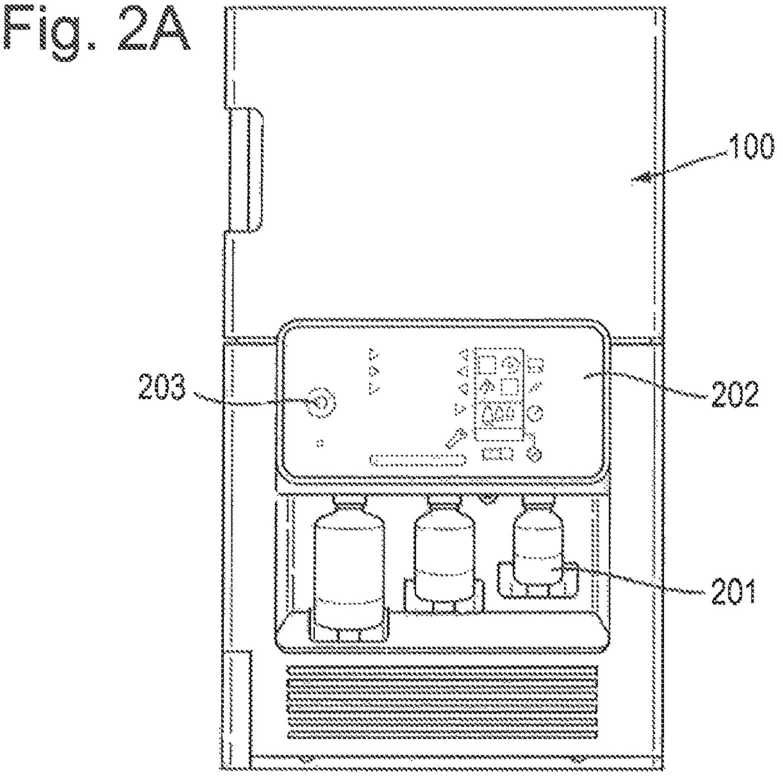
FIG. 2A shows a front view of a bench-top mass spectrometer according to various embodiments showing three solvent bottles loaded into the instrument and a front display panel.
Figure 2B:
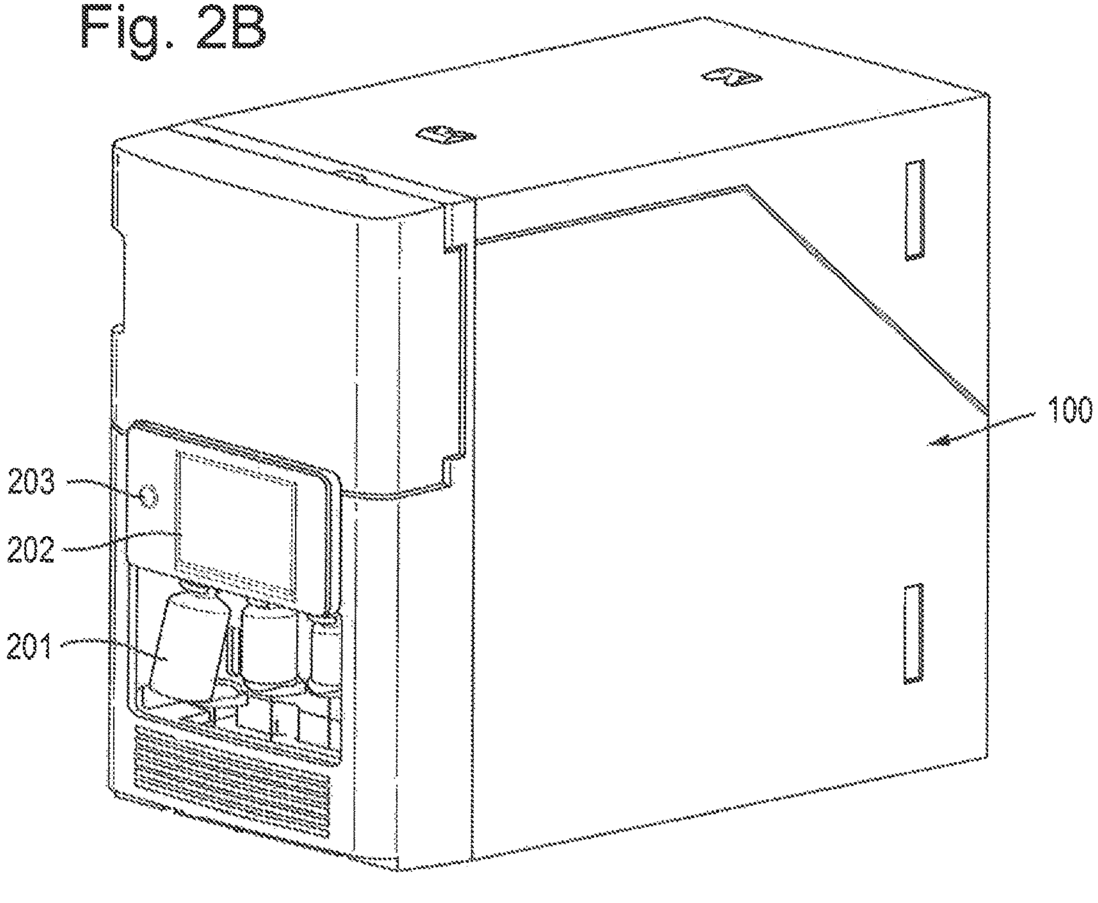
FIG. 2B shows a perspective view of a mass spectrometer according to various embodiments and FIG. 2C illustrates in more detail various icons which may be displayed on the front display panel in order to highlight the status of the instrument to a user and to indicate if a potential fault has been detected.

FIG. 2A shows a front view of the mass spectrometer 100 according to various embodiments and FIG. 2B shows a perspective view of the mass spectrometer according to various embodiments. Three solvent bottles 201 may be coupled, plugged in or otherwise connected or inserted into the mass spectrometer 100. The solvent bottles 201 may be back lit in order to highlight the fill status of the solvent bottles 201 to a user.

One problem with a known mass spectrometer having a plurality of solvent bottles is that a user may connect a solvent bottle in a wrong location or position. Furthermore, a user may mount a solvent bottle but conventional mounting mechanisms will not ensure that a label on the front of the solvent bottle will be positioned so that it can be viewed by a user i.e. conventional instruments may allow a solvent bottle to be connected where a front facing label ends up facing away from the user. Accordingly, one problem with conventional instruments is that a user may not be able to read a label on a solvent bottle due to the fact that the solvent bottle ends up being positioned with the label of the solvent bottle facing away from the user. According to various embodiments conventional screw mounts which are conventionally used to mount solvent bottles have been replaced with a resilient spring mounting mechanism which allows the solvent bottles 201 to be connected without rotation.

According to various embodiments the solvent bottles 201 may be illuminated by a LED light tile in order to indicate the fill level of the solvent bottles 201 to a user. It will be understood that a single LED illuminating a bottle will be insufficient since the fluid in a solvent bottle 201 can attenuate the light from the LED. Furthermore, there is no good single position for locating a single LED.

The mass spectrometer 100 may have a display panel 202 upon which various icons may be displayed when illuminated by the instrument control system.

A start button 203 may be positioned on or adjacent the front display panel 202. A user may press the start button 203 which will then initiate a power-up sequence or routine. The power-up sequence or routine may comprise powering-up all instrument modules and initiating instrument pump-down i.e. generating a low pressure in each of the vacuum chambers within the body of the mass spectrometer 100.

According to various embodiments the power-up sequence or routine may or may not include running a source pressure test and switching the instrument into an Operate mode of operation.

According to various embodiments a user may hold the start button 203 for a period of time, e.g. 5 seconds, in order to initiate a power-down sequence.

If the instrument is in a maintenance mode of operation then pressing the start button 203 on the front panel of the instrument may initiate a power-up sequence. Furthermore, when the instrument is in a maintenance mode of operation then holding the start button 203 on the front panel of the instrument for a period of time, e.g. 5 seconds, may initiate a power-down sequence.

Figure 2C:
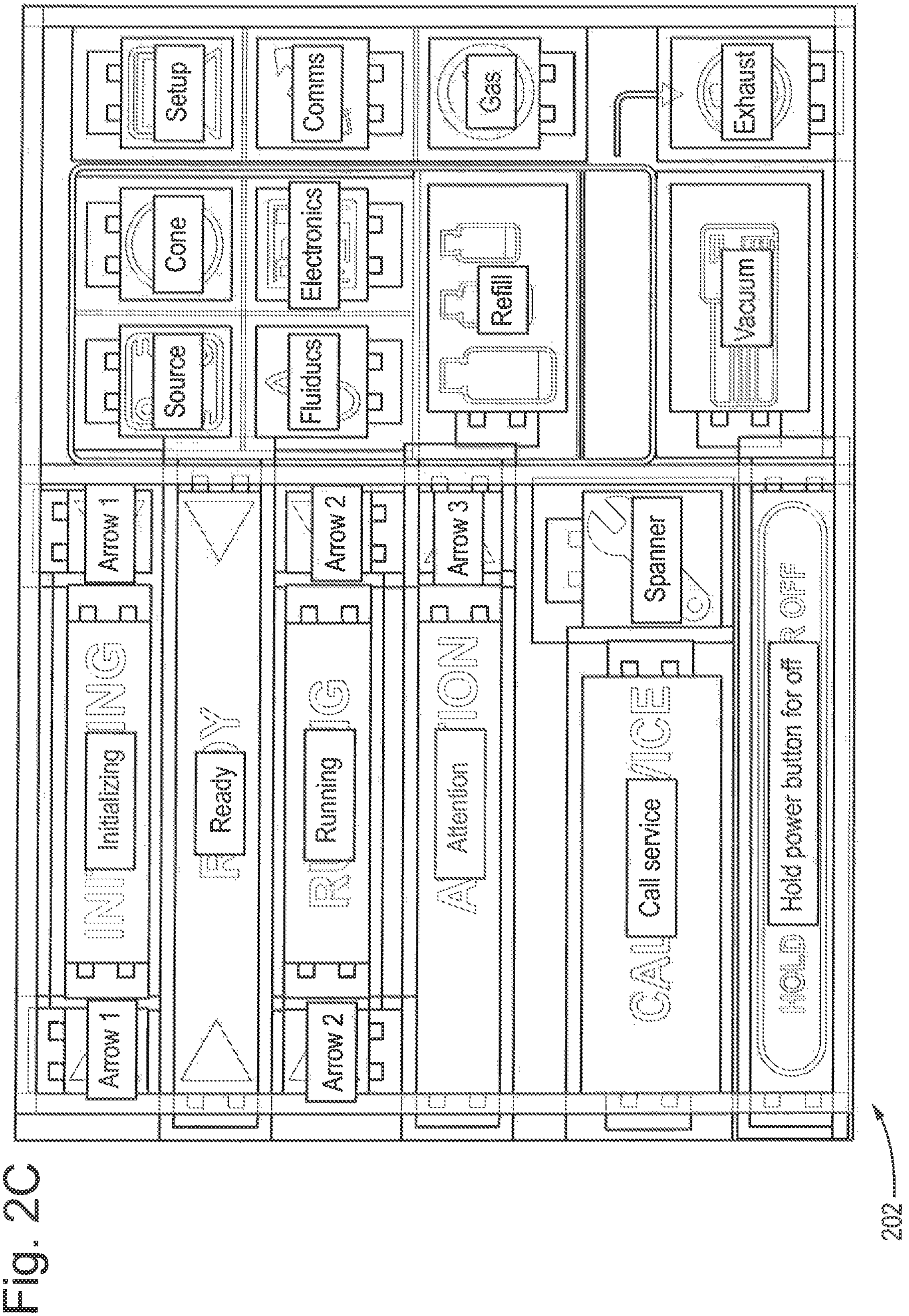

FIG. 2C illustrates in greater detail various icons which may be displayed on the display panel 202 and which may illuminated under the control of instrument hardware and/or software. According to various embodiments one side of the display panel 202 (e.g. the left-hand side) may have various icons which generally relate to the status of the instrument or mass spectrometer 100. For example, icons may be displayed in the colour green to indicate that the instrument is in an initialisation mode of operation, a ready mode of operation or a running mode of operation.

In the event of a detected error which may require user interaction or user input a yellow or amber warning message may be displayed. A yellow or amber warning message or icon may be displayed on the display panel 202 and may convey only relatively general information to a user e.g. indicating that there is a potential fault and a general indication of what component or aspect of the instrument may be at fault.

According to various embodiments it may be necessary for a user to refer to an associated computer display or monitor in order to get fuller details or gain a fuller appreciation of the nature of the fault and to receive details of potential corrective action which is recommended to perform in order to correct the fault or to place the instrument in a desired operational state.

A user may be invited to confirm that a corrective action should be performed and/or a user may be informed that a certain corrective action is being performed.

In the event of a detected error which cannot be readily corrected by a user and which instead requires the services of a skilled service engineer then a warning message may be displayed indicating that a service engineer needs to be called. A warning message indicating the need for a service engineer may be displayed in the colour red and a spanner or other icon may also be displayed or illuminated to indicate to a user that an engineer is required.

The display panel 202 may also display a message that the power button 203 should be pressed in order to turn the instrument OFF.

According to an embodiment one side of the display panel 202 (e.g. the right-hand side) may have various icons which indicate different components or modules of the instrument where an error or fault has been detected. For example, a yellow or amber icon may be displayed or illuminated in order to indicate an error or fault with the ion source, a fault in the inlet cone region, a fault with the fluidic systems, an electronics fault, a fault with one or more of the solvent or other bottles 201 (i.e. indicating that one or more solvent bottles 201 needing to be refilled or emptied), a vacuum pressure fault associated with one or more of the vacuum chambers, an instrument setup error, a communication error, a problem with a gas supply or a problem with an exhaust.

It will be understood that the display panel 202 may merely indicate the general status of the instrument and/or the general nature of a fault. In order to be able to resolve the fault or to understand the exact nature of an error or fault a user may need to refer to the display screen of an associated computer or other device. For example, as will be understood by those skilled in the art an associated computer or other device may be arranged to receive and process mass spectral and other data output from the instrument or mass spectrometer 100 and may display mass spectral data or images on a computer display screen for the benefit of a user.

According to various embodiments the status display may indicate whether the instrument is in one of the following states namely Running, Ready, Getting Ready, Ready Blocked or Error.

The status display may display health check indicators such as Service Required, Cone, Source, Set-up, Vacuum, Communications, Fluidics, Gas, Exhaust, Electronics, Lock-mass, Calibrant and Wash.

A "Hold power button for OFF" LED tile is shown in FIG. 2C and may remain illuminated when the power button 203 is pressed and may remain illuminated until the power button 203 is released or until a period of time (e.g. 5 seconds) has elapsed whichever is sooner. If the power button 203 is released before the set period of time (e.g. less than 5 seconds after it is pressed) then the "Hold power button for OFF" LED tile may fade out over a time period of e.g. 2 s.

The initialising LED tile may be illuminated when the instrument is started via the power button 203 and may remain ON until software assumes control of the status panel or until a power-up sequence or routine times out.

According to various embodiments an instrument health check may be performed and printer style error correction instructions may be provided to a user via a display screen of a computer monitor (which may be separate to the front display panel 202) in order to help guide a user through any steps that the user may need to perform.

The instrument may attempt to self-diagnose any error messages or warning status alert(s) and may attempt to rectify any problem(s) either with or without notifying the user.

Depending upon the severity of any problem the instrument control system may either attempt to correct the problem(s) itself, request the user to carry out some form of intervention in order to attempt to correct the issue or problem(s) or may inform the user that the instrument requires a service engineer.

In the event where corrective action may be taken by a user then the instrument may display instructions for the user to follow and may provide details of methods or steps that should be performed which may allow the user to fix or otherwise resolve the problem or error. A resolve button may be provided on a display screen which may be pressed by a user having followed the suggested resolution instructions. The instrument may then run a test again and/or may check if the issue has indeed been corrected. For example, if a user were to trigger an interlock then once the interlock is closed a pressure test routine may be initialised as detailed below.

Figure 3:
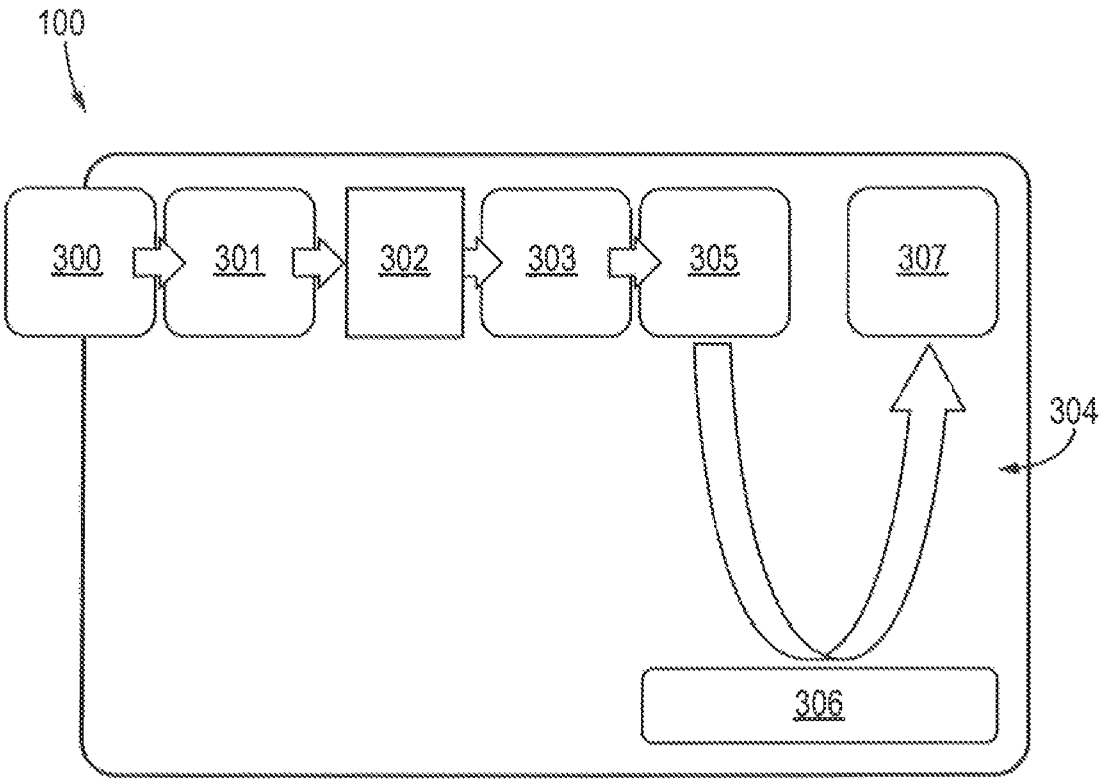
FIG. 3 shows a schematic representation of mass spectrometer according to various embodiments, wherein the instrument comprises an Electrospray Ionisation ("ESI") or other ion source, a conjoined ring ion guide, a segmented quadrupole rod set ion guide, one or more transfer lenses and a Time of Flight mass analyser comprising a pusher electrode, a reflectron and an ion detector.

FIG. 3 shows a high level schematic of the mass spectrometer 100 according to various embodiments wherein the instrument may comprise an ion source 300, such as an Electrospray Ionisation ("ESI") ion source. However, it should be understood that the use of an Electrospray Ionisation ion source 300 is not essential and that according to other embodiments a different type of ion source may be used. For example, according to various embodiments a Desorption Electrospray Ionisation ("DESI") ion source may be used. According to yet further embodiments a Rapid Evaporative Ionisation Mass Spectrometry ("REIMS") ion source may be used.

If an Electrospray ion source 300 is provided then the ion source 300 may comprise an Electrospray probe and associated power supply.

Figure 6A:
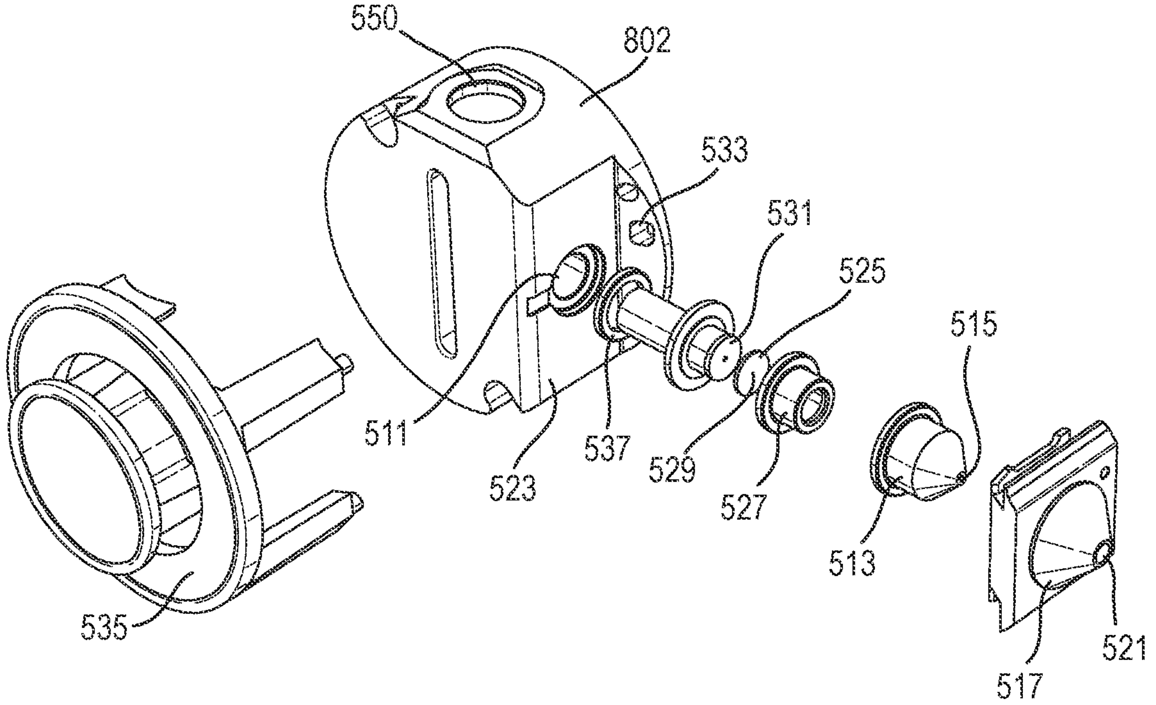
Fig. 6A Prior art
FIG. 6A shows an exploded view of the first known ion inlet assembly.
Figure 6B:
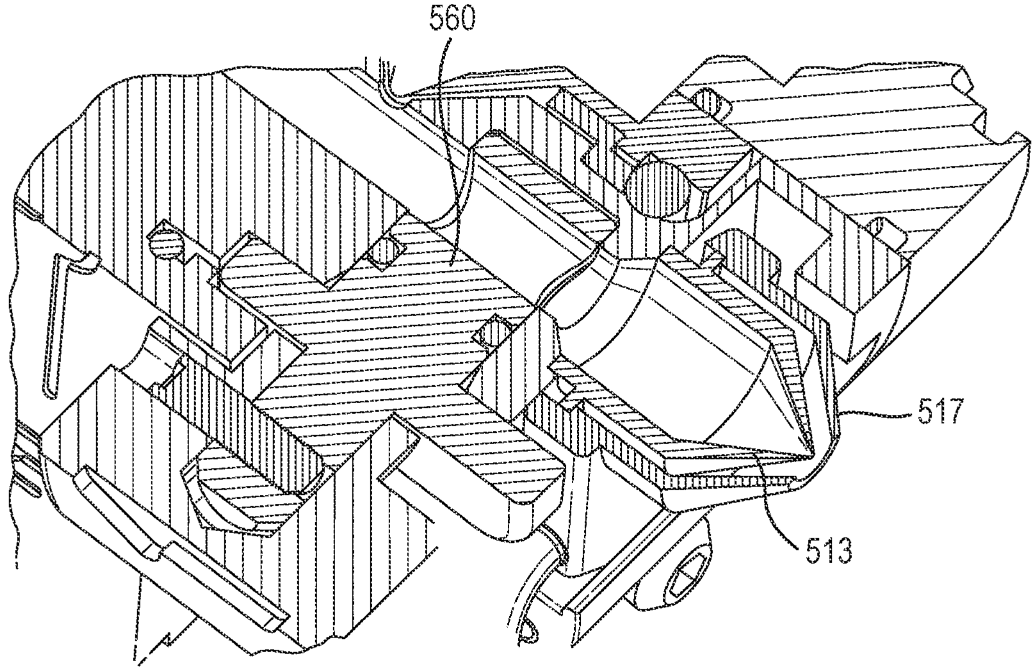
Fig. 6B Prior art
FIG. 6B shows a second different known ion inlet assembly having an isolation valve.
Figure 6C:
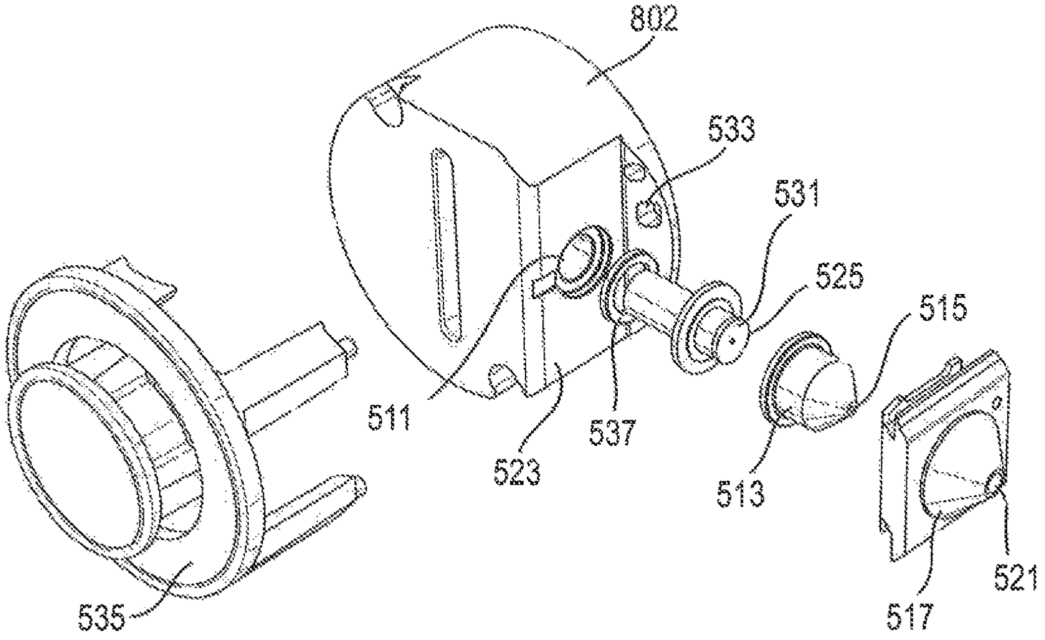
FIG. 6C shows an exploded view of an ion inlet assembly according to various embodiments.

The initial stage of the associated mass spectrometer 100 comprises an ion block 802 (as shown in FIG. 6C) and a source enclosure may be provided if an Electrospray Ionisation ion source 300 is provided.

If a Desorption Electrospray Ionisation ("DESI") ion source is provided then the ion source may comprise a DESI source, a DESI sprayer and an associated DESI power supply. The initial stage of the associated mass spectrometer may comprise an ion block 802 as shown in more detail in FIG. 6C. However, according to various embodiments if a DESI source is provided then the ion block 802 may not enclosed by a source enclosure.

It will be understood that a REIMS source involves the transfer of analyte, smoke, fumes, liquid, gas, surgical smoke, aerosol or vapour produced from a sample which may comprise a tissue sample. In some embodiments, the REIMS source may be arranged and adapted to aspirate the analyte, smoke, fumes, liquid, gas, surgical smoke, aerosol or vapour in a substantially pulsed manner. The REIMS source may be arranged and adapted to aspirate the analyte, smoke, fumes, liquid, gas, surgical smoke, aerosol or vapour substantially only when an electrosurgical cutting applied voltage or potential is supplied to one or more electrodes, one or more electrosurgical tips or one or more laser or other cutting devices.

The mass spectrometer 100 may be arranged so as to be capable of obtaining ion images of a sample. For example, according to various embodiments mass spectral and/or other physico-chemical data may be obtained as a function of position across a portion of a sample. Accordingly, a determination can be made as to how the nature of the sample may vary as a function of position along, across or within the sample.

The mass spectrometer 100 may comprise a first ion guide 301 such as a conjoined ring ion guide 301 having a plurality of ring and conjoined ring electrodes. The mass spectrometer 100 may further comprise a segmented quadrupole rod set ion guide 302, one or more transfer lenses 303 and a Time of Flight mass analyser 304. The quadrupole rod set ion guide 302 may be operated in an ion guiding mode of operation and/or in a mass filtering mode of operation. The Time of Flight mass analyser 304 may comprise a linear acceleration Time of Flight region or an orthogonal acceleration Time of Flight mass analyser.

If the Time of Flight mass analyser comprises an orthogonal acceleration Time of Flight mass analyser 304 then the mass analyser 304 may comprise a pusher electrode 305, a reflectron 306 and an ion detector 307. The ion detector 307 may be arranged to detect ions which have been reflected by the reflectron 306. It should be understood, however, that the provision of a reflectron 306 though desirable is not essential.

According to various embodiments the first ion guide 301 may be provided downstream of an atmospheric pressure interface. The atmospheric pressure interface may comprises an ion inlet assembly.

The first ion guide 301 may be located in a first vacuum chamber or first differential pumping region.

The first ion guide 301 may comprise a part ring, part conjoined ring ion guide assembly wherein ions may be transferred in a generally radial direction from a first ion path formed within a first plurality of ring or conjoined ring electrodes into a second ion path formed by a second plurality of ring or conjoined ring electrodes. The first and second plurality of ring electrodes may be conjoined along at least a portion of their length. Ions may be radially confined within the first and second plurality of ring electrodes.

The second ion path may be aligned with a differential pumping aperture which may lead into a second vacuum chamber or second differential pumping region.

The first ion guide 301 may be utilised to separate charged analyte ions from unwanted neutral particles. The unwanted neutral particles may be arranged to flow towards an exhaust port whereas analyte ions are directed on to a different flow path and are arranged to be optimally transmitted through a differential pumping aperture into an adjacent downstream vacuum chamber.

It is also contemplated that according to various embodiments ions may in a mode of operation be fragmented within the first ion guide 301. In particular, the mass spectrometer 100 may be operated in a mode of operation wherein the gas pressure in the vacuum chamber housing the first ion guide 301 is maintained such that when a voltage supply causes ions to be accelerated into or along the first ion guide 301 then the ions may be arranged to collide with background gas in the vacuum chamber and to fragment to form fragment, daughter or product ions. According to various embodiments a static DC voltage gradient may be maintained along at least a portion of the first ion guide 301 in order to urge ions along and through the first ion guide 301 and optionally to cause ions in a mode of operation to fragment.

However, it should be understood that it is not essential that the mass spectrometer 100 is arranged so as to be capable of performing ion fragmentation in the first ion guide 301 in a mode of operation.

The mass spectrometer 100 may comprise a second ion guide 302 downstream of the first ion guide 302 and the second ion guide 302 may be located in the second vacuum chamber or second differential pumping region.

The second ion guide 302 may comprise a segmented quadrupole rod set ion guide or mass filter 302. However, other embodiments are contemplated wherein the second ion guide 302 may comprise a quadrupole ion guide, a hexapole ion guide, an octopole ion guide, a multipole ion guide, a segmented multipole ion guide, an ion funnel ion guide, an ion tunnel ion guide (e.g. comprising a plurality of ring electrodes each having an aperture through which ions may pass or otherwise forming an ion guiding region) or a conjoined ring ion guide.

The mass spectrometer 100 may comprise one or more transfer lenses 303 located downstream of the second ion guide 302. One of more of the transfer lenses 303 may be located in a third vacuum chamber or third differential pumping region. Ions may be passed through a further differential pumping aperture into a fourth vacuum chamber or fourth differential pumping region. One or more transfer lenses 303 may also be located in the fourth vacuum chamber or fourth differential pumping region.

The mass spectrometer 100 may comprise a mass analyser 304 located downstream of the one or more transfer lenses 303 and may be located, for example, in the fourth or further vacuum chamber or fourth or further differential pumping region. The mass analyser 304 may comprise a Time of Flight ("TOF") mass analyser. The Time of Flight mass analyser 304 may comprise a linear or an orthogonal acceleration Time of Flight mass analyser.

According to various embodiments an orthogonal acceleration Time of Flight mass analyser 304 may be provided comprising one or more orthogonal acceleration pusher electrode(s) 305 (or alternatively and/or additionally one or more puller electrode(s)) and an ion detector 307 separated by a field free drift region. The Time of Flight mass analyser 304 may optionally comprise one or more reflectrons 306 intermediate the pusher electrode 305 and the ion detector 307.

Although highly desirable, it should be recognised that the mass analyser does not have to comprise a Time of Flight mass analyser 304. More generally, the mass analyser 304 may comprise either: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; or (xiv) a linear acceleration Time of Flight mass analyser.

Although not shown in FIG. 3, the mass spectrometer 100 may also comprise one or more optional further devices or stages. For example, according to various embodiments the mass spectrometer 100 may additionally comprise one or more ion mobility separation devices and/or one or more Field Asymmetric Ion Mobility Spectrometer ("FAIMS") devices and/or one or more devices for separating ions temporally and/or spatially according to one or more physico-chemical properties. For example, the mass spectrometer 100 according to various embodiments may comprise one or more separation stages for temporally or otherwise separating ions according to their mass, collision cross section, conformation, ion mobility, differential ion mobility or another physico-chemical parameter.

The mass spectrometer 100 may comprise one or more discrete ion traps or one or more ion trapping regions. However, as will be described in more detail below, an axial trapping voltage may be applied to one or more sections or one or more electrodes of either the first ion guide 301 and/or the second ion guide 302 in order to confine ions axially for a short period of time. For example, ions may be trapped or confined axially for a period of time and then released. The ions may be released in a synchronised manner with a downstream ion optical component. For example, in order to enhance the duty cycle of analyte ions of interest, an axial trapping voltage may be applied to the last electrode or stage of the second ion guide 302. The axial trapping voltage may then be removed and the application of a voltage pulse to the pusher electrode 305 of the Time of Flight mass analyser 304 may be synchronised with the pulsed release of ions so as to increase the duty cycle of analyte ions of interest which are then subsequently mass analysed by the mass analyser 304. This approach may be referred to as an Enhanced Duty Cycle ("EDC") mode of operation.

Furthermore, the mass spectrometer 100 may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The mass spectrometer 100 may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The fourth or further vacuum chamber or fourth or further differential pumping region may be maintained at a lower pressure than the third vacuum chamber or third differential pumping region. The third vacuum chamber or third differential pumping region may be maintained at a lower pressure than the second vacuum chamber or second differential pumping region and the second vacuum chamber or second differential pumping region may be maintained at a lower pressure than the first vacuum chamber or first differential pumping region. The first vacuum chamber or first differential pumping region may be maintained at lower pressure than ambient. Ambient pressure may be considered to be approx. 1013 mbar at sea level.

The mass spectrometer 100 may comprise an ion source configured to generate analyte ions. In various particular embodiments, the ion source may comprise an Atmospheric Pressure Ionisation ("API") ion source such as an Electrospray Ionisation ("ESI") ion source or an Atmospheric Pressure Chemical Ionisation ("APCI") ion source.

Figure 4:
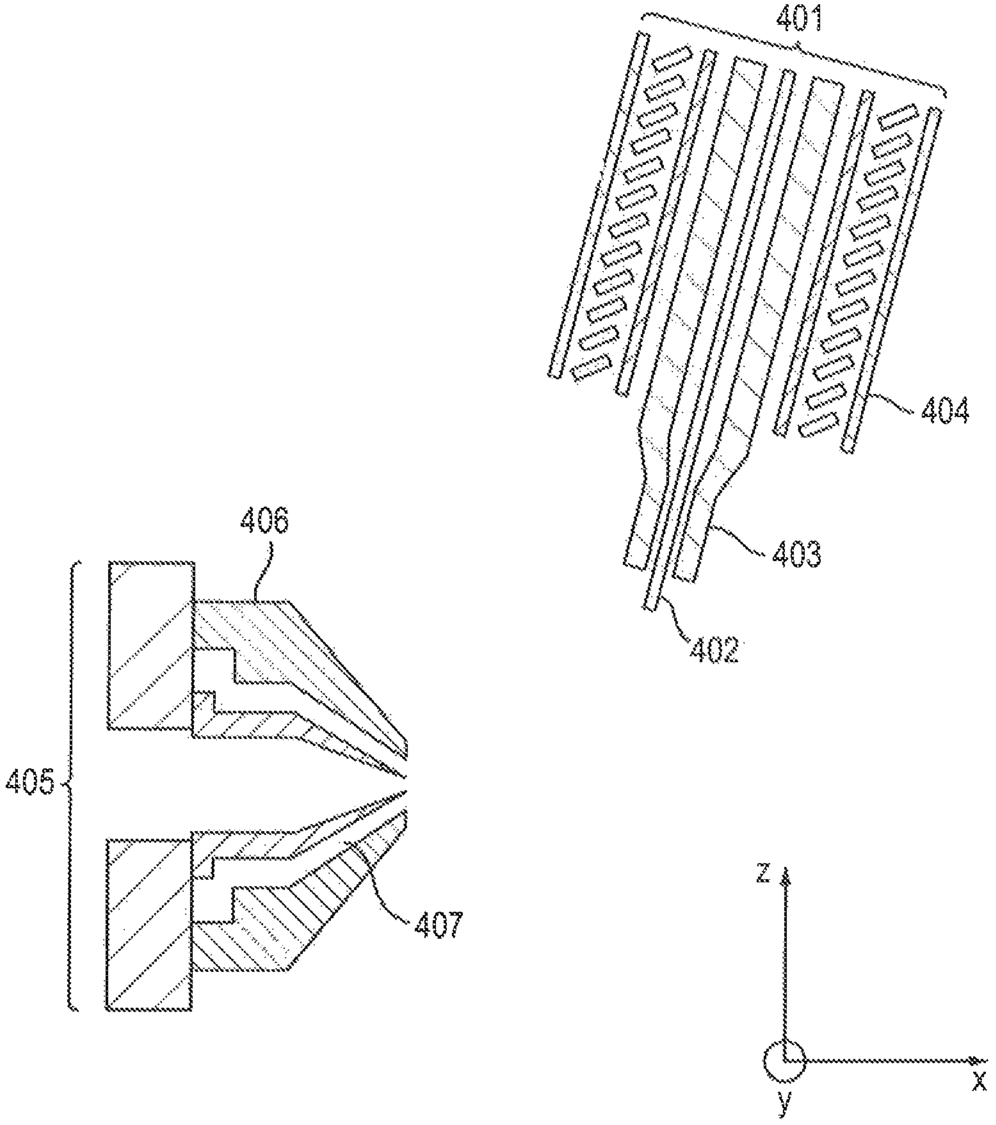
Fig. 4 Prior art
FIG. 4 shows a known Atmospheric Pressure Ionisation ("API") ion source which may be used with the mass spectrometer according to various embodiments.

FIG. 4 shows in general form a known Atmospheric Pressure Ionisation ("API") ion source such as an Electrospray Ionisation ("ESI") ion source or an Atmospheric Pressure Chemical Ionisation ("APCI") ion source. The ion source may comprise, for example, an Electrospray Ionisation probe 401 which may comprise an inner capillary tube 402 through which an analyte liquid may be supplied. The analyte liquid may comprise mobile phase from a LC column or an infusion pump. The analyte liquid enters via the inner capillary tube 402 or probe and is pneumatically converted to an electrostatically charged aerosol spray. Solvent is evaporated from the spray by means of heated desolvation gas. Desolvation gas may be provided through an annulus which surrounds both the inner capillary tube 402 and an intermediate surrounding nebuliser tube 403 through which a nebuliser gas emerges. The desolvation gas may be heated by an annular electrical desolvation heater 404. The resulting analyte and solvent ions are then directed towards a sample or sampling cone aperture mounted into an ion block 405 forming an initial stage of the mass spectrometer 100.

The inner capillary tube 402 is preferably surrounded by a nebuliser tube 403. The emitting end of the inner capillary tube 402 may protrude beyond the nebuliser tube 403. The inner capillary tube 402 and the nebuliser tube 403 may be surrounded by a desolvation heater arrangement 404 as shown in FIG. 4 wherein the desolvation heater 404 may be arranged to heat a desolvation gas. The desolvation heater 404 may be arranged to heat a desolvation gas from ambient temperature up to a temperature of around 600° C. According to various embodiments the desolvation heater 404 is always OFF when the API gas is OFF.

The desolvation gas and the nebuliser gas may comprise nitrogen, air or another gas or mixture of gases. The same gas (e.g. nitrogen, air or another gas or mixture of gases) may be used as both a desolvation gas, nebuliser gas and cone gas. The function of the cone gas will be described in more detail below.

The inner probe capillary 402 may be readily replaced by an unskilled user without needing to use any tools. The Electrospray probe 402 may support LC flow rates in the range of 0.3 to 1.0 mL/min.

According to various embodiments an optical detector may be used in series with the mass spectrometer 100. It will be understood that an optical detector may have a maximum pressure capability of approx. 1000 psi. Accordingly, the Electrospray Ionisation probe 401 may be arranged so as not to cause a back pressure of greater than around 500 psi, allowing for back pressure caused by other system components. The instrument may be arranged so that a flow of 50:50 methanol/water at 1.0 mL/min does not create a backpressure greater than 500 psi.

According to various embodiments a nebuliser flow rate of between 106 to 159 L/hour may be utilised.

The ESI probe 401 may be powered by a power supply which may have an operating range of 0.3 to 1.5 kV.

It should, however, be understood that various other different types of ion source may instead be coupled to the mass spectrometer 100. For example, according to various embodiments, the ion source may more generally comprise either: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; or (xxx) a Low Temperature Plasma ("LTP") ion source.

A chromatography or other separation device may be provided upstream of the ion source 300 and may be coupled so as to provide an effluent to the ion source 300. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device. The mass spectrometer 100 may comprise an atmospheric pressure interface or ion inlet assembly downstream of the ion source 300. According to various embodiments the atmospheric pressure interface may comprise a sample or sampling cone 406,407 which is located downstream of the ion source 401. Analyte ions generated by the ion source 401 may pass via the sample or sampling cone 406,407 into or onwards towards a first vacuum chamber or first differential pumping region of the mass spectrometer 100. However, according to other embodiments the atmospheric pressure interface may comprise a capillary interface.

As shown in FIG. 4, ions generated by the ion source 401 may be directed towards an atmospheric pressure interface which may comprise an outer gas cone 406 and an inner sample cone 407. A cone gas may be supplied to an annular region between the inner sample cone 407 and the outer gas cone 406. The cone gas may emerge from the annulus in a direction which is generally opposed to the direction of ion travel into the mass spectrometer 100. The cone gas may act as a declustering gas which effectively pushes away large contaminants thereby preventing large contaminants from impacting upon the outer cone 406 and/or inner cone 407 and also preventing the large contaminants from entering into the initial vacuum stage of the mass spectrometer 100.

Figure 5:
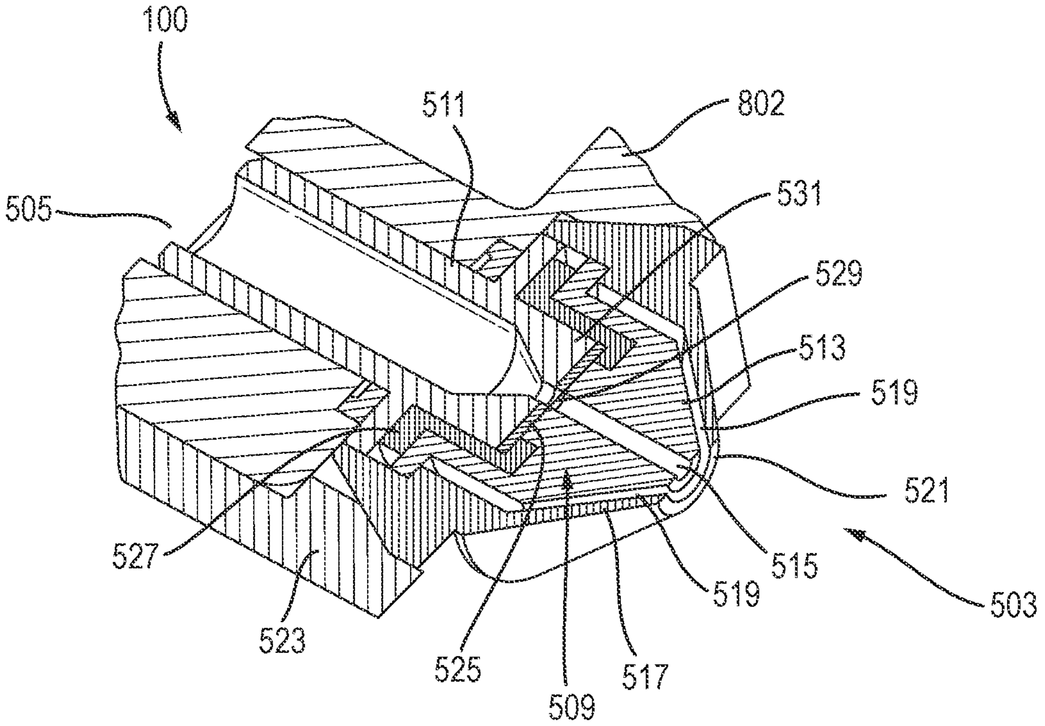
Fig. 5 Prior art
FIG. 5 shows a first known ion inlet assembly which shares features with an ion inlet assembly according to various embodiments.

FIG. 5 shows in more detail a first known ion inlet assembly which is similar to an ion inlet assembly according to various embodiments. The known ion inlet assembly as shown and described below with reference to FIGS. 5 and 6A is presented in order to highlight various aspects of an ion inlet assembly according to various embodiments and also so that differences between an ion inlet assembly according to various embodiments as shown and discussed below with reference to FIG. 6C can be fully appreciated.

With reference to FIG. 5, it will be understood that the ion source (not shown) generates analyte ions which are directed towards a vacuum chamber 505 of the mass spectrometer 100.

A gas cone assembly is provided comprising an inner gas cone or sampling cone 513 having an aperture 515 and an outer gas cone 517 having an aperture 521. A disposable disc 525 is arranged beneath or downstream of the inner gas cone or sampling 513 and is held in position by a mounting element 527. The disc 525 covers an aperture 511 of the vacuum chamber 505. The disc 525 is removably held in position by the inner gas cone 513 resting upon the mounting element 527.

As will be discussed in more detail below with reference to FIG. 6C, according to various embodiments the mounting element 527 is not provided in the preferred ion inlet assembly.

The disc 525 has an aperture or sampling orifice 529 through which ions can pass.

A carrier 531 is arranged underneath or below the disc 525. The carrier 531 is arranged to cover the aperture 511 of the vacuum chamber 505. Upon removal of the disc 525, the carrier 531 may remain in place due to suction pressure.

FIG. 6A shows an exploded view of the first known ion inlet assembly. The outer gas cone 517 has a cone aperture 521 and is slidably mounted within a clamp 535. The clamp 535 allows a user to remove the outer gas cone 517 without physically having to touch the outer gas cone 517 which will get hot during use.

An inner gas cone or sampling cone 513 is shown mounted behind or below the outer gas cone 517.

The known arrangement utilises a carrier 531 which has a 1 mm diameter aperture. The ion block 802 is also shown having a calibration port 550. However, the calibration port 550 is not provided in an ion inlet assembly according to various embodiments.

FIG. 6B shows an second different known ion inlet assembly as used on a different instrument which has an isolation valve 560 which is required to hold vacuum pressure when the outer cone gas nozzle 517 and the inner nozzle 513 are removed for servicing. The inner cone 513 has a gas limiting orifice into the subsequent stages of the mass spectrometer. The inner gas cone 513 comprises a high cost, highly precisioned part which requires routine removal and cleaning. The inner gas cone 513 is not a disposable or consumable item. Prior to removing the inner sampling cone 513 the isolation valve 560 must be rotated into a closed position in order to isolate the downstream vacuum stages of the mass spectrometer from atmospheric pressure. The isolation valve 560 is therefore required in order to hold vacuum pressure whilst the inner gas sampling cone 513 is removed for cleaning.

FIG. 6C shows an exploded view of an ion inlet assembly according to various embodiments. The ion inlet assembly according to various embodiments is generally similar to the first known ion inlet assembly as shown and described above with reference to FIGS. 5 and 6A except for a few differences. One difference is that a calibration port 550 is not provided in the ion block 802 and a mounting member or mounting element 527 is not provided.

Accordingly, the ion block 802 and ion inlet assembly have been simplified. Furthermore, importantly the disc 525 may comprise a 0.25 or 0.30 mm diameter aperture disc 525 which is substantially smaller diameter than conventional arrangements.

According to various embodiments both the disc 525 and the vacuum holding member or carrier 531 may have a substantially smaller diameter aperture than conventional arrangements such as the first known arrangement as shown and described above with reference to FIGS. 5 and 6A.

For example, the first known instrument utilises a vacuum holding member or carrier 531 which has a 1 mm diameter aperture. In contrast, according to various embodiments the vacuum holding member or carrier 531 according to various embodiments may have a much smaller diameter aperture e.g. a 0.3 mm or 0.40 mm diameter aperture.

Figure 6D:
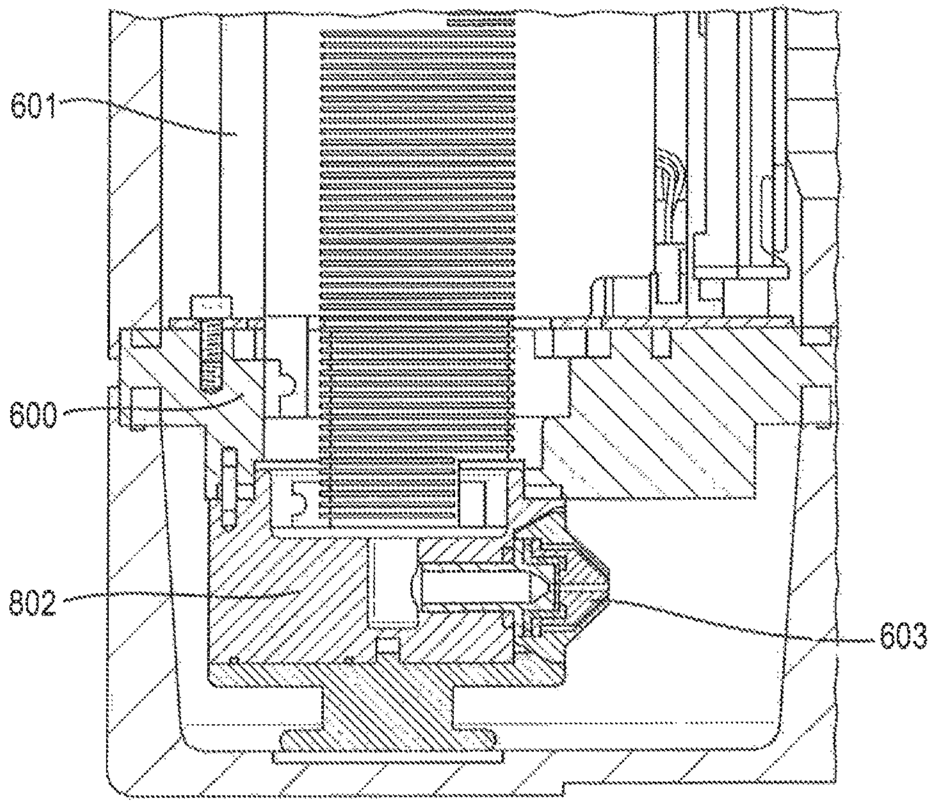
FIG. 6D shows the arrangement of an ion block attached to a pumping block upstream of a vacuum chamber housing a first ion guide according to various embodiments.

FIG. 6D shows in more detail how the ion block assembly 802 according to various embodiments may be enclosed in an atmospheric pressure source or housing. The ion block assembly 802 may be mounted to a pumping block or thermal interface 600. Ions pass through the ion block assembly 802 and then through the pumping block or thermal interface 600 into a first vacuum chamber 601 of the mass spectrometer 100. The first vacuum chamber 601 preferably houses the first ion guide 301 which as shown in FIG. 6D and which may comprise a conjoined ring ion guide 301. FIG. 6D also indicates how ion entry 603 into the mass spectrometer 100 also represents a potential leak path. A correct pressure balance is required between the diameters of the various gas flow restriction apertures in the ion inlet assembly with the configuration of the vacuum pumping system.

Figure 6E:
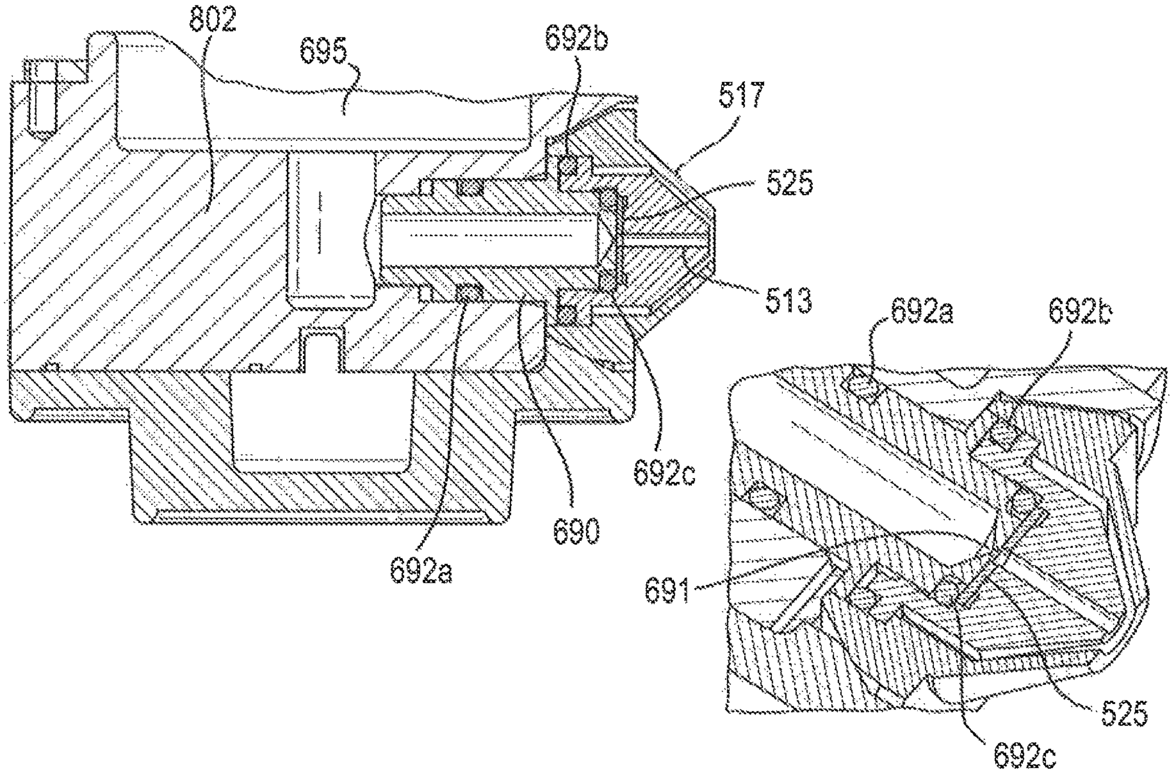
FIG. 6E shows in more detail a fixed valve assembly which is retained within an ion block according to various embodiments.

FIG. 6E shows the ion inlet assembly according to various embodiments and illustrates how ions pass through an outer gas cone 517 and an inner gas cone or sampling cone 513 before passing through an apertured disc 525. No mounting member or mounting element is provided unlike the first known ion inlet assembly as described above.

The ions then pass through an aperture in a fixed valve 690. The fixed valve 690 is held in place by suction pressure and is not removable by a user in normal operation. Three O-ring vacuum seals 692*a*,692*b*,692*c* are shown. The fixed valve 690 may be formed from stainless steel. A vacuum region 695 of the mass spectrometer 100 is generally indicated.

Figure 6F:
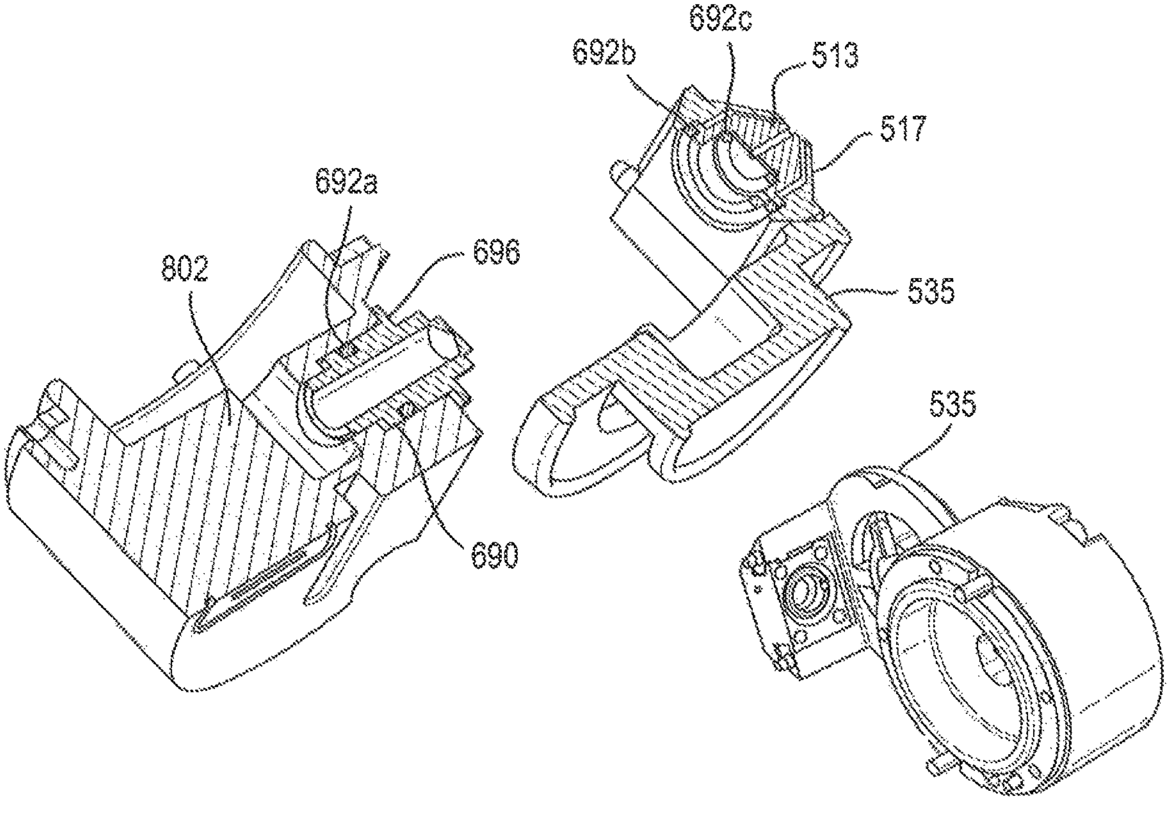
FIG. 6F shows the removal by a user of a cone assembly attached to a clamp to expose a fixed valve having a gas flow restriction aperture which is sufficient to maintain the low pressure within a downstream vacuum chamber when the cone is removed and FIG. 6G illustrates how the fixed valve may be retained in position by suction pressure according to various embodiments.

FIG. 6F shows the outer cone 517, inner sampling cone 513 and apertured disc 525 having been removed by a user by withdrawing or removing a clamp 535 to which at least the outer cone 517 is slidably inserted. According to various embodiments the inner sampling cone 513 may also be attached or secured to the outer cone 517 so that both are removed at the same time.

Instead of utilising a conventional rotatable isolation valve, a fixed non-rotatable valve 690 is provided or otherwise retained in the ion block 802. An O-ring seal 692*a* is shown which ensures that a vacuum seal is provided between the exterior body of the fixed valve 690 and the ion block 802. An ion block voltage contact 696 is also shown. O-rings seals 692*b*,692*c* for the inner and outer cones 513,517 are also shown.

Figure 6G:
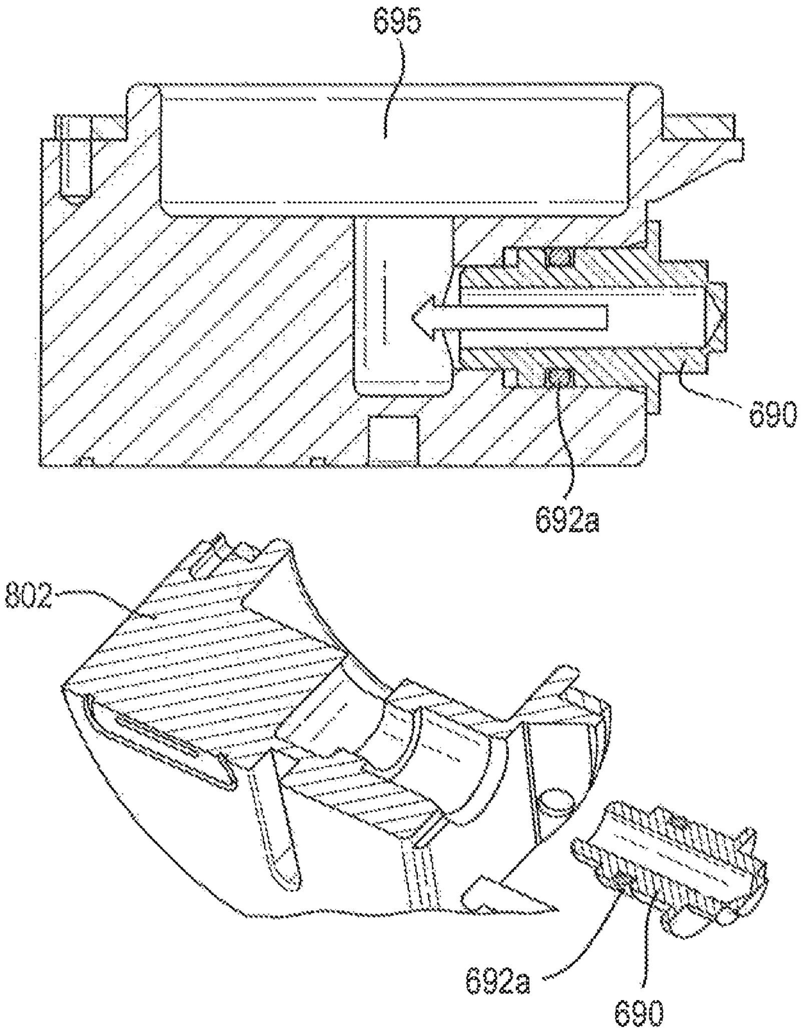

FIG. 6G illustrates how according to various embodiments a fixed valve 690 may be retained within an ion block 802 and may form a gas tight sealing therewith by virtue of an O-ring seal 692*a*. A user is unable to remove the fixed valve 690 from the ion block 802 when the instrument is operated due to the vacuum pressure within the vacuum chamber 695 of the instrument. The direction of suction force which holds the fixed valve 690 in a fixed position against the ion block 802 during normal operation is shown.

The size of the entrance aperture into the fixed valve 690 is designed for optimum operation conditions and component reliability. Various embodiments are contemplated wherein the shape of the entrance aperture may be cylindrical. However, other embodiments are contemplated wherein there may be more than one entrance aperture and/or wherein the one or more entrance apertures to the fixed valve 690 may have a non-circular aperture. Embodiments are also contemplated wherein the one or more entrance apertures may be angled at a non-zero angle to the longitudinal axis of the fixed valve 690.

It will be understood that total removal of the fixed valve 690 from the ion block 802 will rapidly result in total loss of vacuum pressure within the mass spectrometer 100.

According to various embodiments the ion inlet assembly may be temporarily sealed in order to allow a vacuum housing within the mass spectrometer 100 to be filled with dry nitrogen for shipping. It will be appreciated that filling a vacuum chamber with dry nitrogen allows faster initial pump-down during user initial instrument installation.

It will be appreciated that since according to various embodiments the internal aperture in the vacuum holding member or carrier 531 is substantially smaller in diameter than conventional arrangements, then the vacuum within the first and subsequent vacuum chambers of the instrument can be maintained for substantially longer periods of time than is possible conventionally when the disc 525 is removed and/or replaced.

Accordingly, the mass spectrometer 100 according to various embodiments does not require an isolation valve in contrast with other known mass spectrometers in order to maintain the vacuum within the instrument when a component such as the outer gas cone 517, the inner gas cone 513 or the disc 525 are removed.

A mass spectrometer 100 according to various embodiments therefore enables a reduced cost instrument to be provided which is also simpler for a user to operate since no isolation valve is needed. Furthermore, a user does not need to be understand or learn how to operate such an isolation valve.

The ion block assembly 802 may comprise a heater in order to keep the ion block 802 above ambient temperature in order to prevent droplets of analyte, solvent, neutral particles or condensation from forming within the ion block 802.

According to an embodiment when a user wishes to replace and/or remove either the outer cone 517 and/or the inner sampling cone 513 and/or the disc 525 then both the source or ion block heater and the desolvation heater 404 may be turned OFF. The temperature of the ion block 802 may be monitored by a thermocouple which may be provided within the ion block heater or which may be otherwise provided in or adjacent to the ion block 802.

When the temperature of the ion block is determined to have dropped below a certain temperature such as e.g. 55° C. then the user may be informed that the clamp 535, outer gas cone 517, inner gas sampling cone 513 and disc 525 are sufficiently cooled down such that a user can touch them without serious risk of injury.

According to various embodiment a user can simply remove and/or replace the outer gas cone 517 and/or inner gas sampling cone 513 and/or disc 525 in less than two minutes without needing to vent the instrument. In particular, the low pressure within the instrument is maintained for a sufficient period of time by the aperture in the fixed valve 690.

According to various embodiments the instrument may be arranged so that the maximum leak rate into the source or ion block 802 during sample cone maintenance is approx. 7 mbar L/s. For example, assuming a backing pump speed of 9 $m^3$/hour (2.5 L/s) and a maximum acceptable pressure of 3 mbar, then the maximum leak rate during sampling cone maintenance may be approx. 2.5 L/s×3 mbar=7.5 mbar L/s.

The ion block 802 may comprise an ion block heater having a K-type thermistor. As will be described in more detail below, according to various embodiments the source (ion block) heater may be disabled to allow forced cooling of the source or ion block 802. For example, desolvation heater 404 and/or ion block heater may be switched OFF whilst API gas is supplied to the ion block 802 in order to cool it down. According to various embodiments either a desolvation gas flow and/or a nebuliser gas flow from the probe 401 may be directed towards the cone region 517,513 of the ion block 802. Additionally and/or alternatively, the cone gas supply may be used to cool the ion block 802 and the inner and outer cones 513,517. In particular, by turning the desolvation heater 404 OFF but maintaining a supply of nebuliser and/or desolvation gas from the probe 401 so as to fill the enclosure housing the ion block with ambient temperature nitrogen or other gas will have a rapid cooling effect upon the metal and plastic components forming the ion inlet assembly which may be touched by a user during servicing. Ambient temperature (e.g. in the range 18-25° C.) cone gas may also be supplied in order to assist with cooling the ion inlet assembly in a rapid manner. Conventional instruments do not have the functionality to induce rapid cooling of the ion block 802 and gas cones 521,513.

Liquid and gaseous exhaust from the source enclosure may be fed into a trap bottle. The drain tubing may be routed so as to avoid electronic components and wiring. The instrument may be arranged so that liquid in the source enclosure always drains out even when the instrument is switched OFF. For example, it will be understood that an LC flow into the source enclosure could be present at any time.

An exhaust check valve may be provided so that when the API gas is turned OFF the exhaust check valve prevents a vacuum from forming in the source enclosure and trap bottle. The exhaust trap bottle may have a capacity 5L.

The fluidics system may comprise a piston pump which allows the automated introduction of a set-up solution into the ion source. The piston pump may have a flow rate range of 0.4 to 50 mL/min. A divert/select valve may be provided which allows rapid automated changeover between LC flow and the flow of one or two internal set-up solutions into the source.

According to various embodiments three solvent bottles 201 may be provided. Solvent A bottle may have a capacity within the range 250-300 mL, solvent B bottle may have a capacity within the range 50-60 mL and solvent C bottle may have a capacity within the range 100-125 mL. The solvent bottles 201 may be readily observable by a user who may easily refill the solvent bottles.

According to an embodiment solvent A may comprise a lock-mass, solvent B may comprise a calibrant and solvent C may comprise a wash. Solvent C (wash) may be connected to a rinse port.

A driver PCB may be provided in order to control the piston pump and the divert/select valve. On power-up the piston pump may be homed and various purge parameters may be set.

Fluidics may be controlled by software and may be enabled as a function of the instrument state and the API gas valve state in a manner as detailed below:

| Instrument state | API gas valve | Software control of fluidics |
|---|---|---|
| Operate | Open | Enabled |
| Operate | Closed | Disabled |
| Over-pressure | Open | Enabled |
| Over-pressure | Closed | Disabled |
| Power Save | Open | Disabled |
| Power Save | Closed | Disabled |

When software control of the fluidics is disabled then the valve is set to a divert position and the pump is stopped.

Figure 7A:
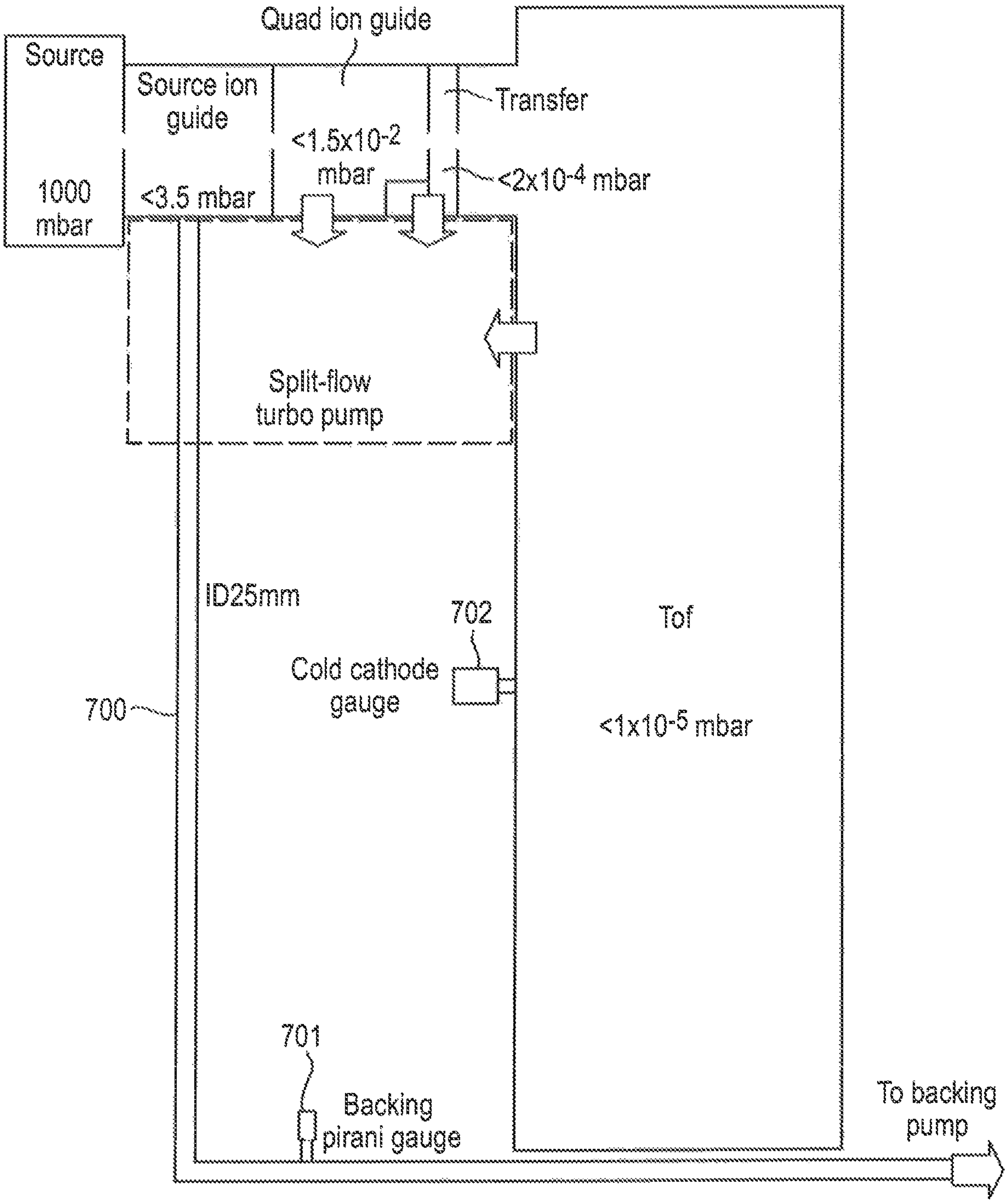
FIG. 7A shows a pumping arrangement according to various embodiments.

FIG. 7A illustrates a vacuum pumping arrangement according to various embodiments.

A split-flow turbo molecular vacuum pump (commonly referred to as a "turbo" pump) may be used to pump the fourth or further vacuum chamber or fourth or further differential pumping region, the third vacuum chamber or third differential pumping region, and the second vacuum chamber or second differential pumping region. According to an embodiment the turbo pump may comprise either a Pfeiffer® Splitflow 310 fitted with a TC110 controller or an Edwards® nEXT300/100/100D turbo pump. The turbo pump may be air cooled by a cooling fan.

The turbo molecular vacuum pump may be backed by a rough, roughing or backing pump such as a rotary vane vacuum pump or a diaphragm vacuum pump. The rough, roughing or backing pump may also be used to pump the first vacuum chamber housing the first ion guide 301. The rough, roughing or backing pump may comprise an Edwards® nRV14i backing pump. The backing pump may be provided external to the instrument and may be connected to the first vacuum chamber which houses the first ion guide 301 via a backing line 700 as shown in FIG. 7A.

A first pressure gauge such as a cold cathode gauge 702 may be arranged and adapted to monitor the pressure of the fourth or further vacuum chamber or fourth or further differential pumping region. According to an embodiment the Time of Flight housing pressure may be monitored by an Inficon® MAG500 cold cathode gauge 702.

A second pressure gauge such as a Pirani gauge 701 may be arranged and adapted to monitor the pressure of the backing pump line 700 and hence the first vacuum chamber which is in fluid communication with the upstream pumping block 600 and ion block 802. According to an embodiment the instrument backing pressure may be monitored by an Inficon® PSG500 Pirani gauge 701.

According to various embodiments the observed leak plus outgassing rate of the Time of Flight chamber may be arranged to be less than $4\times10^{-5}$ mbar L/s. Assuming a 200 L/s effective turbo pumping speed then the allowable leak plus outgassing rate is $5\times10^{-7}$ mbar×200 L/s=$1\times10^{-4}$ mbar L/s.

A turbo pump such as an Edwards® nEXT300/100/100D turbo pump may be used which has a main port pumping speed of 400 L/s. As will be detailed in more detail below, EMC shielding measures may reduce the pumping speed by approx. 20% so that the effective pumping speed is 320 L/s. Accordingly, the ultimate vacuum according to various embodiments may be $4\times10^{-5}$ mbar L/s/320 L/s=$1.25\times10^{-7}$ mbar.

Figure 7B:
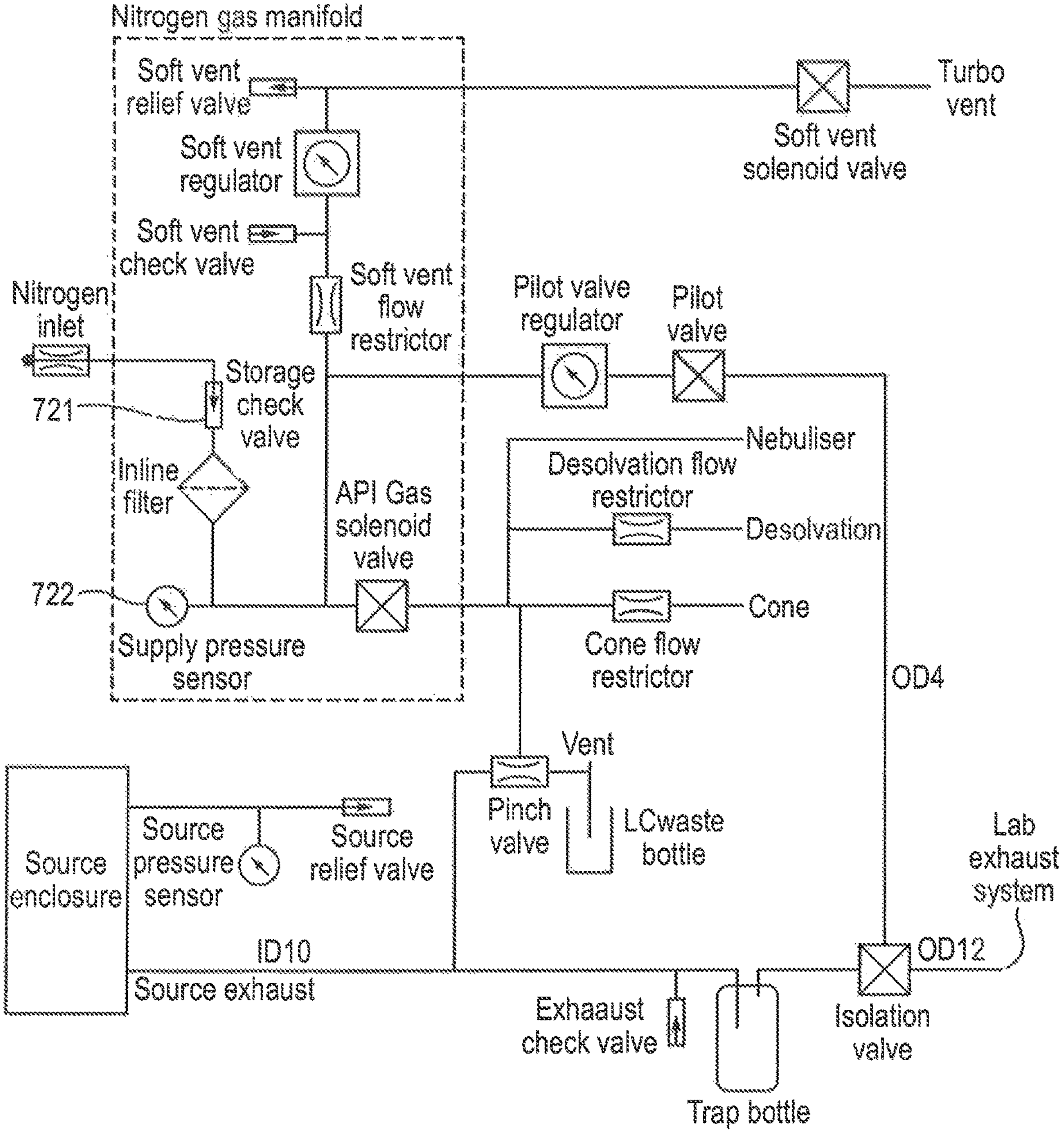
FIG. 7B shows further details of a gas handling system which may be implemented.

According to an embodiment a pump-down sequence may comprise closing a soft vent solenoid as shown in FIG. 7B, starting the backing pump and waiting until the backing pressure drops to 32 mbar. If 32 mbar is not reached within 3 minutes of starting the backing pump then a vent sequence may be performed. Assuming that a pressure of 32 mbar is reached within 3 minutes then the turbo pump is then started. When the turbo speed exceeds 80% of maximum speed then the Time of Flight vacuum gauge 702 may then be switched ON. It will be understood that the vacuum gauge 702 is a sensitive detector and hence is only switched ON when the vacuum pressure is such that the vacuum gauge 702 which not be damaged.

If the turbo speed does not reach 80% of maximum speed within 8 minutes then a vent sequence may be performed.

A pump-down sequence may be deemed completed once the Time of Flight vacuum chamber pressure is determined to be $<1\times10^{-5}$ mbar.

If a vent sequence is to be performed then the instrument may be switched to a Standby mode of operation. The Time of Flight vacuum gauge 702 may be switched OFF and the turbo pump may also be switched OFF. When the turbo pump speed falls to less than 80% of maximum then a soft vent solenoid valve as shown in FIG. 7B may be opened. The system may then wait for 10 seconds before then switching OFF the backing pump.

It will be understood by those skilled in the art that the purpose of the turbo soft vent solenoid valve as shown in FIG. 7B and the soft vent line is to enable the turbo pump to be vented at a controlled rate. It will be understood that if the turbo pump is vented at too fast a rate then the turbo pump may be damaged.

The instrument may switch into a maintenance mode of operation which allows an engineer to perform service work on all instrument sub-systems except for the vacuum system or a subsystem incorporating the vacuum system without having to vent the instrument. The instrument may be pumped down in maintenance mode and conversely the instrument may also be vented in maintenance mode.

A vacuum system protection mechanism may be provided wherein if the turbo speed falls to less than 80% of maximum speed then a vent sequence is initiated. Similarly, if the backing pressure increases to greater than 10 mbar then a vent sequence may also be initiated. According to an embodiment if the turbo power exceeds 120 W for more than 15 minutes then a vent sequence may also be initiated. If on instrument power-up the turbo pump speed is >80% of maximum then the instrument may be set to a pumped state, otherwise the instrument may be set to a venting state.

FIG. 7B shows a schematic of a gas handling system which may be utilised according to various embodiments. A storage check valve 721 may be provided which allows the instrument to be filled with nitrogen for storage and transport. The storage check valve 721 is in fluid communication with an inline filter.

A soft vent flow restrictor may be provided which may limit the maximum gas flow to less than the capacity of a soft vent relief valve in order to prevent the analyser pressure from exceeding 0.5 bar in a single fault condition. The soft vent flow restrictor may comprise an orifice having a diameter in the range 0.70 to 0.75 mm.

A supply pressure sensor 722 may be provided which may indicate if the nitrogen pressure has fallen below 4 bar.

An API gas solenoid valve may be provided which is normally closed and which has an aperture diameter of not less than 1.4 mm.

An API gas inlet is shown which preferably comprises a Nitrogen gas inlet. According to various embodiments the nebuliser gas, desolvation gas and cone gas are all supplied from a common source of nitrogen gas.

A soft vent regulator may be provided which may function to prevent the analyser pressure exceeding 0.5 bar in normal condition.

A soft vent check valve may be provided which may allow the instrument to vent to atmosphere in the event that the nitrogen supply is OFF.

A soft vent relief valve may be provided which may have a cracking pressure of 345 mbar. The soft vent relief valve may function to prevent the pressure in the analyser from exceeding 0.5 bar in a single fault condition. The gas flow rate through the soft vent relief valve may be arranged so as not to be less than 2000 L/h at a differential pressure of 0.5 bar.

The soft vent solenoid valve may normally be in an open position. The soft vent solenoid valve may be arranged to restrict the gas flow rate in order to allow venting of the turbo pump at 100% rotational speed without causing damage to the pump. The maximum orifice diameter may be 1.0 mm.

The maximum nitrogen flow may be restricted such that in the event of a catastrophic failure of the gas handling the maximum leak rate of nitrogen into the lab should be less than 20% of the maximum safe flow rate. According to various embodiments an orifice having a diameter of 1.4 to 1.45 mm may be used.

A source pressure sensor may be provided.

A source relief valve having a cracking pressure of 345 mbar may be provided. The source relief valve may be arranged to prevent the pressure in the source from exceeding 0.5 bar in a single fault condition. The gas flow rate through the source relief valve may be arranged so as not to be less than 2000 L/h at a differential pumping pressure of 0.5 bar. A suitable valve is a Ham-Let® H-480-S-G-1/4-5 psi valve.

A cone restrictor may be provided to restrict the cone flow rate to 36 L/hour for an input pressure of 7 bar. The cone restrictor may comprise a 0.114 mm orifice.

The desolvation flow may be restricted by a desolvation flow restrictor to a flow rate of 940 L/hour for an input pressure of 7 bar. The desolvation flow restrictor may comprise a 0.58 mm orifice.

A pinch valve may be provided which has a pilot operating pressure range of at least 4 to 7 bar gauge. The pinch valve may normally be open and may have a maximum inlet operating pressure of at least 0.5 bar gauge.

When the instrument is requested to turn the API gas OFF, then control software may close the API gas valve, wait 2 seconds and then close the source exhaust valve.

In the event of an API gas failure wherein the pressure switch opens (pressure<4 bar) then software control of the API gas may be disabled and the API gas valve may be closed. The system may then wait 2 seconds before closing the exhaust valve.

In order to turn the API gas ON a source pressure monitor may be turned ON except while a source pressure test is performed. An API gas ON or OFF request from software may be stored as an API Gas Request state which can either be ON or OFF. Further details are presented below:

| API Gas Request state | API Gas Control state | API gas valve |
|---|---|---|
| ON | Enabled | Open |
| ON | Disabled | Closed |
| OFF | Enabled | Closed |
| OFF | Disabled | Closed |

Figure 7C:
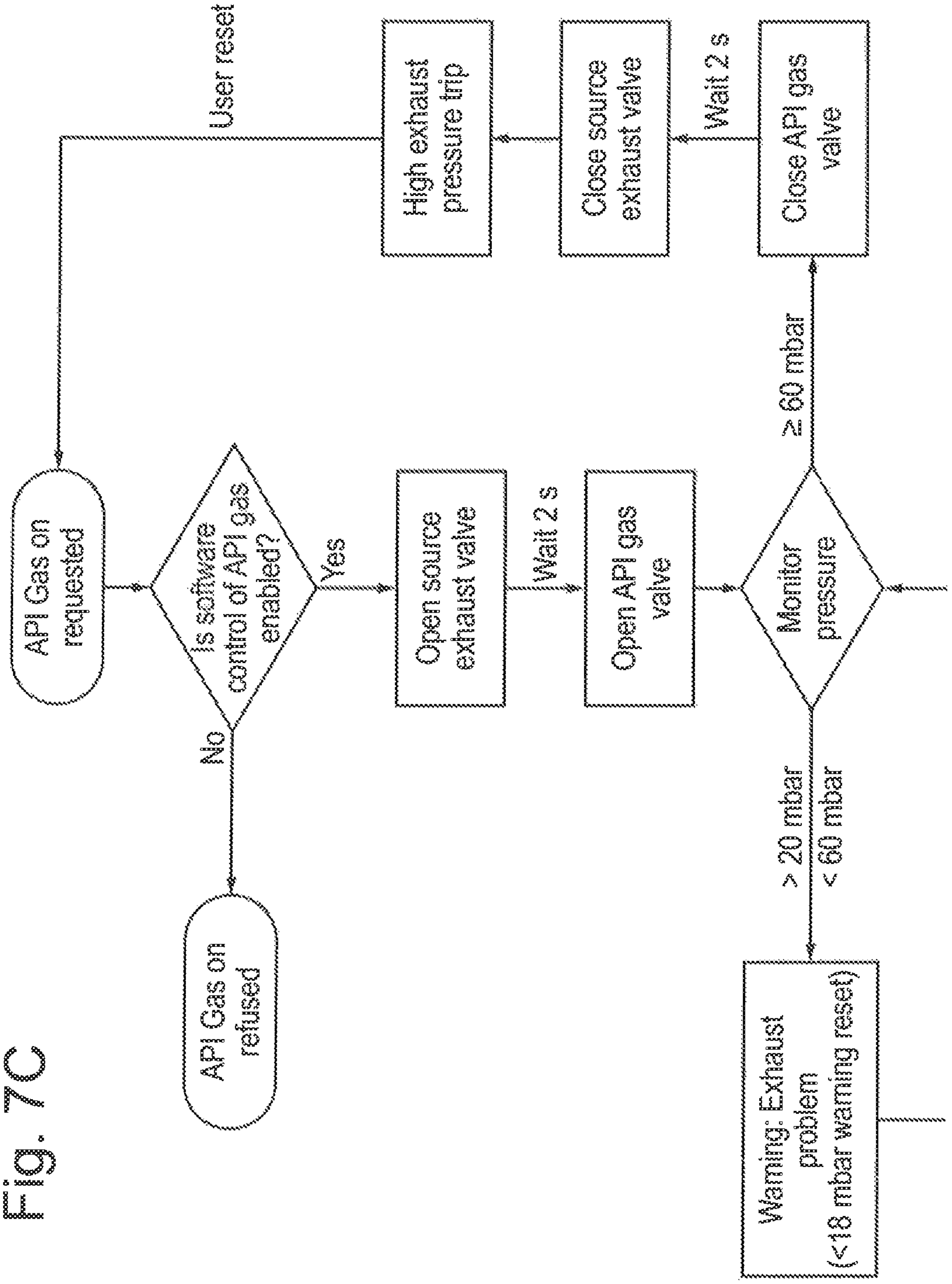
FIG. 7C shows a flow diagram illustrating the steps which may be performed following a user request to the turn the Atmospheric Pressure Ionisation ("API") gas ON and FIG. 7D shows a flow chart illustrating a source pressure test which may be performed according to various embodiments.

FIG. 7C shows a flow diagram showing an instrument response to a user request to turn the API gas ON. A determination may be made as to whether or not software control of API gas is enabled. If software control is not enabled then the request may be refused. If software control of API gas is enabled then the open source exhaust valve may be opened. Then after a delay of 2 seconds the API gas valve may be opened. The pressure is then monitored. If the pressure is determined to be between 20-60 mbar then a warning message may be communicated or issued. If the pressure is greater than 60 mbar then then the API gas valve may be closed. Then after a delay of 2 seconds the source exhaust valve may be closed and a high exhaust pressure trip may occur.

A high exhaust pressure trip may be reset by running a source pressure test.

According to various embodiments the API gas valve may be closed within 100 ms of an excess pressure being sensed by the source pressure sensor.

Figure 7D:
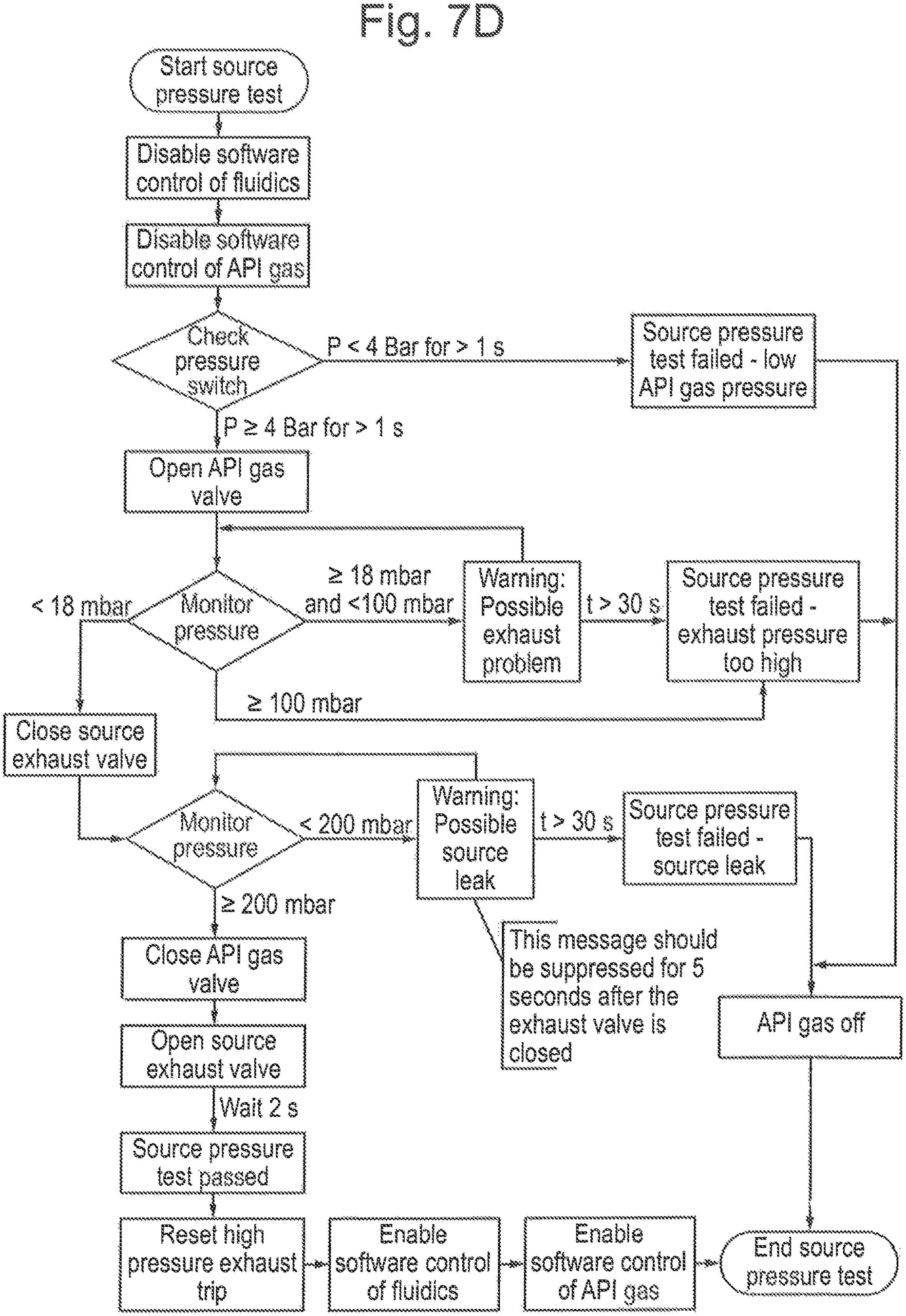

FIG. 7D shows a flow diagram illustrating a source pressure test which may be performed according to various embodiments. The source pressure test may be commenced and software control of fluidics may be disabled so that no fluid flows into the Electrospray probe 401. Software control of the API gas may also be disabled i.e. the API is turned OFF. The pressure switch may then be checked. If the pressure is above 4 bar for more than 1 second then the API gas valve may be opened. However, if the pressure is less than 4 bar for more than 1 second then the source pressure test may move to a failed state due to low API gas pressure.

Assuming that the API gas valve is opened then the pressure may then be monitored. If the pressure is in the range 18-100 mbar then a warning message may be output indicating a possible exhaust problem. If the warning status continues for more than 30 seconds then the system may conclude that the source pressure test has failed due to the exhaust pressure being too high.

If the monitored pressure is determined to be less than 18 mbar then the source exhaust valve is closed.

The pressure may then again be monitored. If the pressure is less than 200 mbar then a warning message indicating a possible source leak may be issued.

If the pressure is determined to be greater than 200 mbar then the API gas valve may be closed and the source exhaust valve may be opened i.e. the system looks to build pressure and to test for leaks. The system may then wait 2 seconds before determining that the source pressure test is passed.

If the source pressure test has been determined to have been passed then the high pressure exhaust trip may be reset and software control of fluidics may be enabled. Software control of the API gas may then be enabled and the source pressure test may then be concluded.

According to various embodiments the API gas valve may be closed within 100 ms of an excess pressure being sensed by the source pressure sensor.

In the event of a source pressure test failure, the divert valve position may be set to divert and the valve may be kept in this position until the source pressure test is either passed or the test is over-ridden.

It is contemplated that the source pressure test may be over-ridden in certain circumstances. Accordingly, a user may be permitted to continue to use an instrument where they have assessed any potential risk as being acceptable. If the user is permitted to continue using the instrument then the source pressure test status message may still be displayed in order to show the original failure. As a result, a user may be reminded of the continuing failed status so that the user may continually re-evaluate any potential risk.

In the event that a user requests a source pressure test over-ride then the system may reset a high pressure exhaust trip and then enable software control of the divert valve. The system may then enable software control of the API gas before determining that the source pressure test over-ride is complete.

The pressure reading used in the source pressure test and source pressure monitoring may include a zero offset correction.

The gas and fluidics control responsibility may be summarised as detailed below:

| Mode of operation | Software | Electronics |
|---|---|---|
| Operate | Gas and fluidics | None |
| Power save | Gas | Fluidics |
| Standby | Gas | Fluidics |
| SPT/Failure | None | Gas and fluidics |
| Vacuum loss | None | Gas and fluidics |
| Gas fail state | None | Gas and fluidics |
| Operate gas OFF | Gas | Fluidics |

A pressure test may be initiated if a user triggers an interlock.

The instrument may operate in various different modes of operation. If the turbo pump speed falls to less than 80% of maximum speed whilst in Operate, Over-pressure or Power save mode then the instrument may enter a Standby state or mode of operation.

If the pressure in the Time of Flight vacuum chamber is greater than $1\times10^{-5}$ mbar and/or the turbo speed is less than 80% of maximum speed then the instrument may be prevented from operating in an Operate mode of operation.

According to various embodiments the instrument may be operated in a Power save mode. In a Power save mode of operation the piston pump may be stopped. If the instrument is switched into a Power save mode while the divert valve is in the LC position, then the divert valve may change to a divert position. A Power save mode of operation may be considered as being a default mode of operation wherein all back voltages are kept ON, front voltages are turned OFF and gas is OFF.

If the instrument switches from a Power save mode of operation to an Operate mode of operation then the piston pump divert valves may be returned to their previous states i.e. their states immediately before a Power save mode of operation was entered.

If the Time of Flight region pressure rises above $1.5\times10^{-5}$ mbar while the instrument is in an Operate mode of operation then the instrument may enter an Over-pressure mode of operation or state.

If the Time of Flight pressure enters the range $1\times10^{-8}$ to $1\times10^{-5}$ mbar while the instrument is in an Over-pressure mode of operation then the instrument may enter an Operate mode of operation.

If the API gas pressure falls below its trip level while the instrument is in an Operate mode of operation then the instrument may enter a Gas Fail state or mode of operation. The instrument may remain in a Gas Fail state until both: (i) the API gas pressure is above its trip level; and (ii) the instrument is operated in either Standby or Power save mode.

According to an embodiment the instrument may transition from an Operate mode of operation to an Operate with Source Interlock Open mode of operation when the source cover is opened. Similarly, the instrument may transition from an Operate with Source Interlock Open mode of operation to an Operate mode of operation when the source cover is closed.

According to an embodiment the instrument may transition from an Over-pressure mode of operation to an Over-pressure with Source Interlock Open mode of operation when the source cover is opened. Similarly, the instrument may transition from an Over-pressure with Source Interlock Open mode of operation to an Over-pressure mode of operation when the source cover is closed.

The instrument may operate in a number of different modes of operation which may be summarised as follows:

| Mode of operation | Analyser voltages | Front end voltages | Desolvation heater | Source heater | API gas control state |
|---|---|---|---|---|---|
| Standby | OFF | OFF | OFF | ON | Enabled |
| Operate | ON | ON | ON | ON | Enabled |
| Power Save | ON | OFF | OFF | ON | Enabled |
| Over-pressure | OFF | ON | ON | ON | Enabled |
| Gas Fail | ON | OFF | OFF | ON | Disabled |
| Operate with Source Interlock | ON | OFF | OFF | OFF | Disabled |
| Over-pressure with Source interlock | OFF | OFF | OFF | OFF | Disabled |
| Not Pumped | OFF | OFF | OFF | OFF | Enabled |

Reference to front end voltages relates to voltages which are applied to the Electrospray capillary electrode 402, the source offset, the source or first ion guide 301, aperture #1 (see FIG. 15A) and the quadrupole ion guide 302.

Reference to analyser voltages relates to all high voltages except the front end voltages.

Reference to API gas refers to desolvation, cone and nebuliser gases.

Reference to Not Pumped refers to all vacuum states except pumped.

If any high voltage power supply loses communication with the overall system or a global circuitry control module then the high voltage power supply may be arranged to switch OFF its high voltages. The global circuitry control module may be arranged to detect the loss of communication of any subsystem such as a power supply unit ("PSU"), a pump or gauge etc.

According to various embodiments the system will not indicate its state or mode of operation as being Standby if the system is unable to verify that all subsystems are in a Standby state.

As is apparent from the above table, when the instrument is operated in an Operate mode of operation then all voltages are switched ON. When the instrument transitions to operate in an Operate mode of operation then the following voltages are ON namely transfer lens voltages, ion guide voltages, voltages applied to the first ion guide 301 and the capillary electrode 402. In addition, the desolvation gas and desolvation heater are all ON.

If a serious fault were to develop then the instrument may switch to a Standby mode of operation wherein all voltages apart from the source heater provided in the ion block 802 are turned OFF and only a service engineer can resolve the fault. It will be understood that the instrument may only be put into a Standby mode of operation wherein voltages apart from the source heater in the ion block 802 are turned OFF only if a serious fault occurs or if a service engineer specifies that the instrument should be put into a Standby mode operation. A user or customer may (or may not) be able to place an instrument into a Standby mode of operation. Accordingly, in a Standby mode of operation all voltages are OFF and the desolvation gas flow and desolvation heater 404 are all OFF. Only the source heater in the ion block 802 may be left ON.

The instrument may be kept in a Power Save mode by default and may be switched so as to operate in an Operate mode of operation wherein all the relevant voltages and gas flows are turned ON. This approach significantly reduces the time taken for the instrument to be put into a useable state. When the instrument transitions to a Power Save mode of operation then the following voltages are ON—pusher electrode 305, reflectron 306, ion detector 307 and more generally the various Time of Flight mass analyser 304 voltages.

The stability of the power supplies for the Time of Flight mass analyser 304, ion detector 307 and reflectron 306 can affect the mass accuracy of the instrument. The settling time when turning ON or switching polarity on a known conventional instrument is around 20 minutes.

It has been established that if the power supplies are cold or have been left OFF for a prolonged period of time then they may require up to 10 hours to warm up and stabilise. For this reason customers may be prevented from going into a Standby mode of operation which would switch OFF the voltages to the Time of Flight analyser 304 including the reflectron 306 and ion detector 307 power supplies.

On start-up the instrument may move to a Power save mode of operation as quickly as possible as this allows the power supplies the time they need to warm up whilst the instrument is pumping down. As a result, by the time the instrument has reached the required pressure to carry out instrument setup the power supplies will have stabilised thus reducing any concerns relating to mass accuracy.

According to various embodiments in the event of a vacuum failure in the vacuum chamber housing the Time of Flight mass analyser 304 then power may be shut down or turned OFF to all the peripherals or sub-modules e.g. the ion source 300, first ion guide 301, the segmented quadrupole rod set ion guide 302, the transfer optics 303, the pusher electrode 305 high voltage supply, the reflectron 306 high voltage supply and the ion detector 307 high voltage supply. The voltages are primarily all turned OFF for reasons of instrument protection and in particular protecting sensitive components of the Time of Flight mass analyser 307 from high voltage discharge damage.

It will be understood that high voltages may be applied to closely spaced electrodes in the Time of Flight mass analyser 304 on the assumption that the operating pressure will be very low and hence there will be no risk of sparking or electrical discharge effects. Accordingly, in the event of a serious vacuum failure in the vacuum chamber housing the Time of Flight mass analyser 304 then the instrument may remove power or switch power OFF to the following modules or sub-modules: (i) the ion source high voltage supply module; (ii) the first ion guide 301 voltage supply module; (iii) the quadrupole ion guide 302 voltage supply module; (iv) the high voltage pusher electrode 305 supply module; (v) the high voltage reflectron 306 voltage supply module; and (vi) the high voltage detector 307 module. The instrument protection mode of operation is different to a Standby mode of operation wherein electrical power is still supplied to various power supplies or modules or sub-modules. In contrast, in an instrument protection mode of operation power is removed to the various power supply modules by the action of a global circuitry control module. Accordingly, if one of the power supply modules were faulty it would still be unable in a fault condition to turn voltages ON because the module would be denied power by the global circuitry control module.

Figure 8:
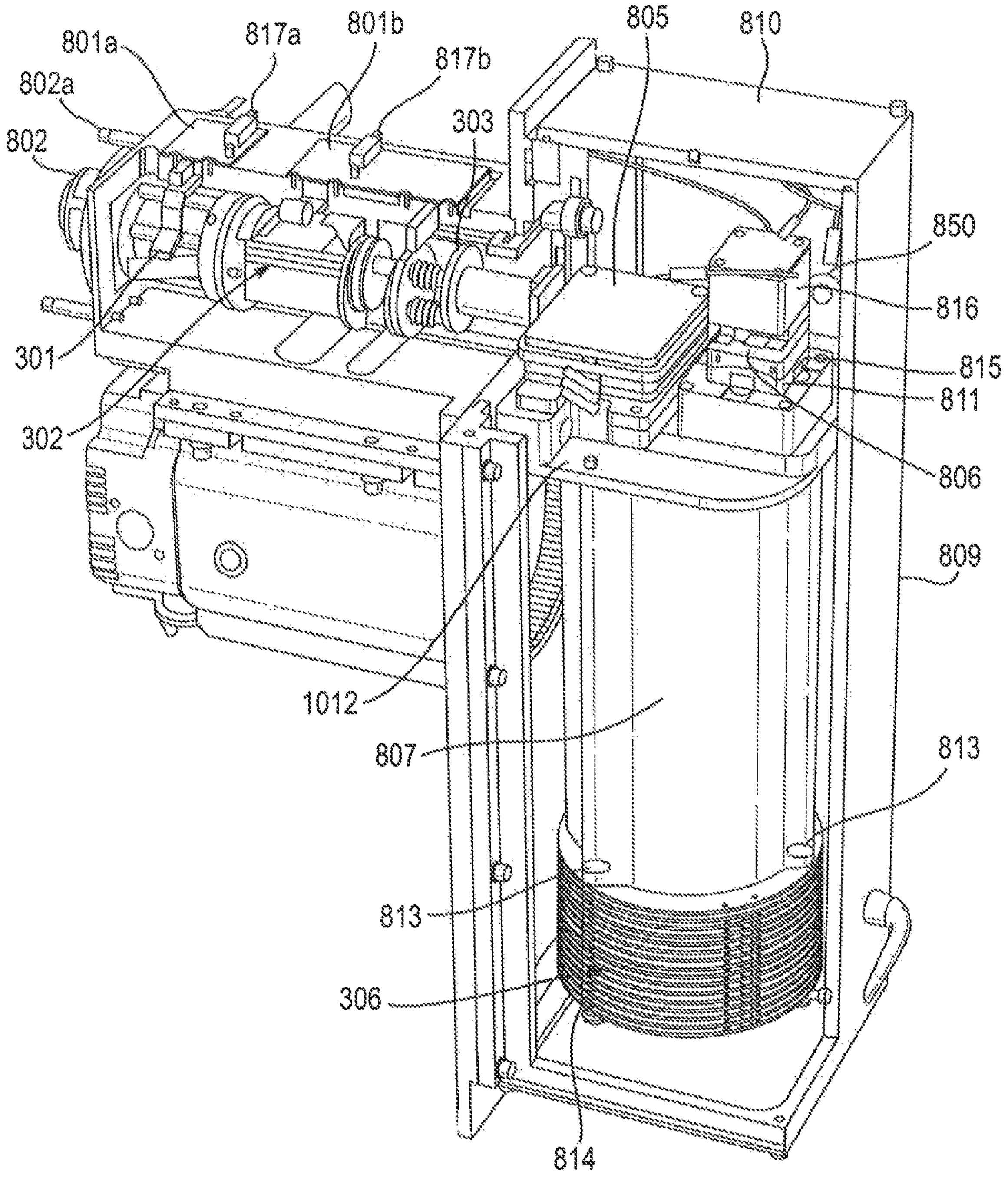
FIG. 8 shows in more detail a mass spectrometer according to various embodiments.

FIG. 8 shows a view of a mass spectrometer 100 according to various embodiments in more detail. The mass spectrometer 100 may comprise a first vacuum PCB interface 801*a* having a first connector 817*a* for directly connecting the first vacuum interface PCB 801*a* to a first local control circuitry module (not shown) and a second vacuum PCB interface 801*b* having a second connector 817*b* for directly connecting the second vacuum interface PCB 801*b* to a second local control circuitry module (not shown).

The mass spectrometer 100 may further comprise a pumping or ion block 802 which is mounted to a pumping block or thermal isolation stage (not viewable in FIG. 8). According to various embodiments one or more dowels or projections 802*a* may be provided which enable a source enclosure (not shown) to connect to and secure over and house the ion block 802. The source enclosure may serve the purpose of preventing a user from inadvertently coming into contact with any high voltages associated with the Electrospray probe 402. A micro-switch or other form of interlock may be used to detect opening of the source enclosure by a user in order to gain source access whereupon high voltages to the ion source 402 may then be turned OFF for user safety reasons.

Ions are transmitted via an initial or first ion guide 301, which may comprise a conjoined ring ion guide, and then via a segmented quadrupole rod set ion guide 302 to a transfer lens or transfer optics arrangement 303. The transfer optics 303 may be designed in order to provide a highly efficient ion guide and interface into the Time of Flight mass analyser 304 whilst also reducing manufacturing costs.

Ions may be transmitted via the transfer optics 303 so that the ions arrive in a pusher electrode assembly 305. The pusher electrode assembly 305 may also be designed so as to provide high performance whilst at the same time reducing manufacturing costs.

According to various embodiments a cantilevered Time of Flight stack 807 may be provided. The cantilevered arrangement may be used to mount a Time of Flight stack or flight tube 807 and has the advantage of both thermally and electrically isolating the Time of Flight stack or flight tube 807. The cantilevered arrangement represents a significant design departure from conventional instruments and results in substantial improvements in instrument performance.

According to an embodiment an alumina ceramic spacer and a plastic (PEEK) dowel may be used.

According to an embodiment when a lock mass is introduced and the instrument is calibrated then the Time of Flight stack or flight tube 807 will not be subjected to thermal expansion. The cantilevered arrangement according to various embodiments is in contrast to known arrangements wherein both the reflectron 306 and the pusher assembly 305 were mounted to both ends of a side flange. As a result conventional arrangements were subjected to thermal impact.

Ions may be arranged to pass into a flight tube 807 and may be reflected by a reflectron 306 towards an ion detector 811. The output from the ion detector 811 is passed to a pre-amplifier (not shown) and then to an Analogue to Digital Converter ("ADC") (also not shown). The reflectron 306 is preferably designed so as to provide high performance whilst also reducing manufacturing cost and improviding reliability.

As shown in FIG. 8 the various electrode rings and spacers which collectively form the reflectron subassembly may be mounted to a plurality of PEEK support rods 814. The reflectron subassembly may then be clamped to the flight tube 807 using one or more cotter pins 813. As a result, the components of the reflectron subassembly are held under compression which enables the individual electrodes forming the reflectron to be maintained parallel to each other with a high level of precision. According to various embodiments the components may be held under spring loaded compression.

The pusher electrode assembly 305 and the detector electronics or a discrete detector module may be mounted to a common pusher plate assembly 1012. This is described in more detail below with reference to FIGS. 10A-10C.

The Time of Flight mass analyser 304 may have a full length cover 809 which may be readily removed enabling extensive service access. The full length cover 809 may be held in place by a plurality of screws e.g. 5 screws. A service engineer may undo the five screws in order to expose the full length of the time of flight tube 807 and the reflectron 306.

The mass analyser 304 may further comprise a removable lid 810 for quick service access. In particular, the removable lid 810 may provide access to a service engineer so that the service engineer can replace an entrance plate 1000 as shown in FIG. 100. In particular, the entrance plate 1000 may become contaminated due to ions impacting upon the surface of the entrance plate 1000 resulting in surface charging effects and potentially reducing the efficiency of ion transfer from the transfer optics 303 into a pusher region adjacent the pusher electrode 305.

A SMA (SubMiniature version A) connector or housing 850 is shown but an AC coupler 851 is obscured from view.

Figure 9:
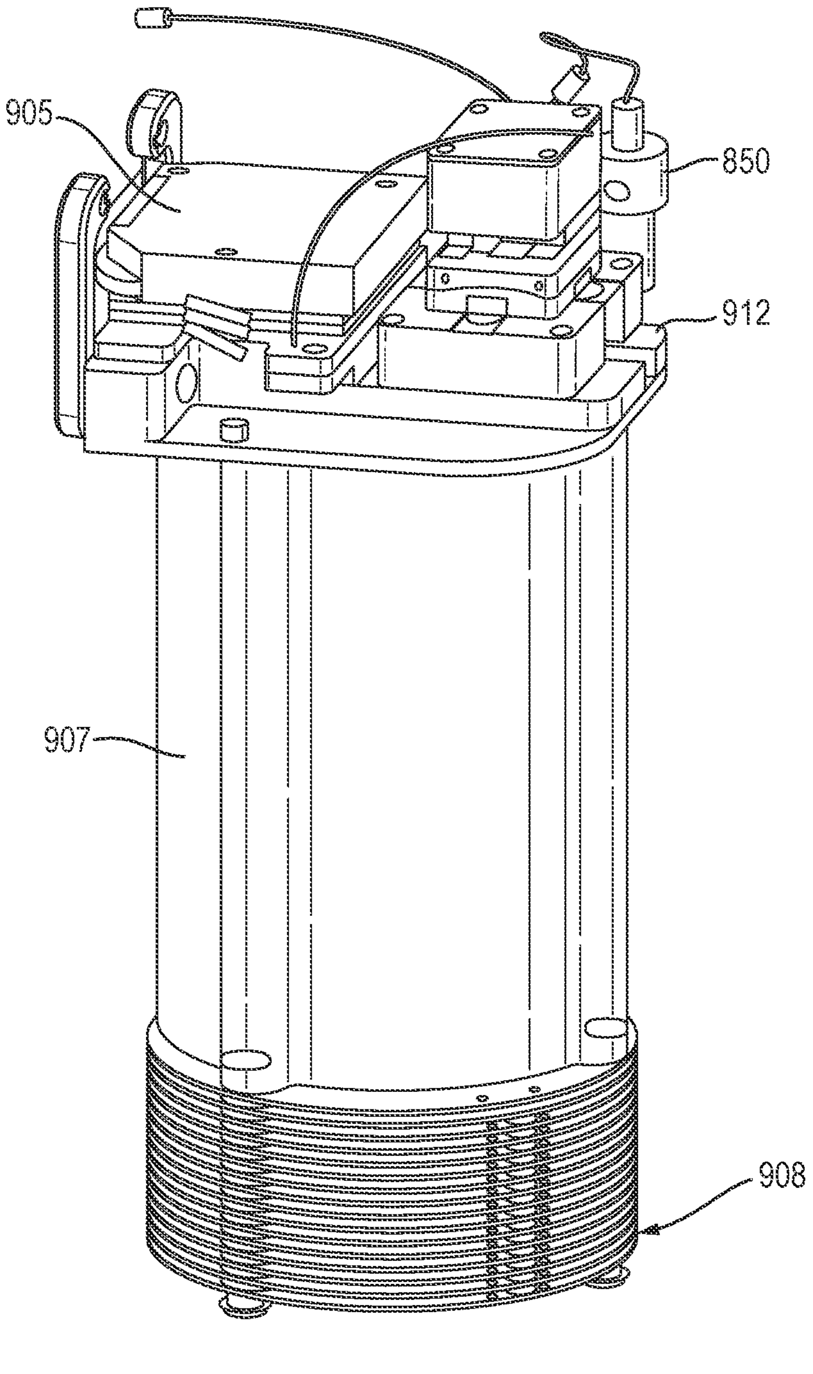
FIG. 9 shows a Time of Flight mass analyser assembly comprising a pusher plate assembly having mounted thereto a pusher electronics module and an ion detector module and wherein a reflectron assembly is suspended from an extruded flight tube which in turn is suspended from the pusher plate assembly.

FIG. 9 shows a pusher plate assembly 912, flight tube 907 and reflectron stack 908. A pusher assembly 905 having a pusher shielding cover is also shown. The flight tube 907 may comprise an extruded or plastic flight tube. The reflectron 306 may utilise fewer ceramic components than conventional reflectron assemblies thereby reducing manufacturing cost. According to various embodiments the reflectron 306 may make greater use of PEEK compared with conventional reflectron arrangements.

A SMA (SubMiniature version A) connector or housing 850 is shown but an AC coupler 851 is obscured from view.

According to other embodiments the reflectron 306 may comprise a bonded reflectron. According to another embodiment the reflectron 306 may comprise a metalised ceramic arrangement. According to another embodiment the reflectron 306 may comprise a jigged then bonded arrangement.

According to alternative embodiments instead of stacking, mounting and fixing multiple electrodes or rings, a single bulk piece of an insulating material such as a ceramic may be provided. Conductive metalised regions on the surface may then be provided with electrical connections to these regions so as to define desired electric fields. For example, the inner surface of a single piece of cylindrical shaped ceramic may have multiple parallel metalised conductive rings deposited as an alternative method of providing potential surfaces as a result of stacking multiple individual rings as is known conventionally. The bulk ceramic material provides insulation between the different potentials applied to different surface regions. The alternative arrangement reduces the number of components thereby simplifying the overall design, improving tolerance build up and reducing manufacturing cost. Furthermore, it is contemplated that multiple devices may be constructed this way and may be combined with or without grids or lenses placed in between. For example, according to one embodiment a first grid electrode may be provided, followed by a first ceramic cylindrical element, followed by a second grid electrode followed by a second ceramic cylindrical element.

Figure 10A:
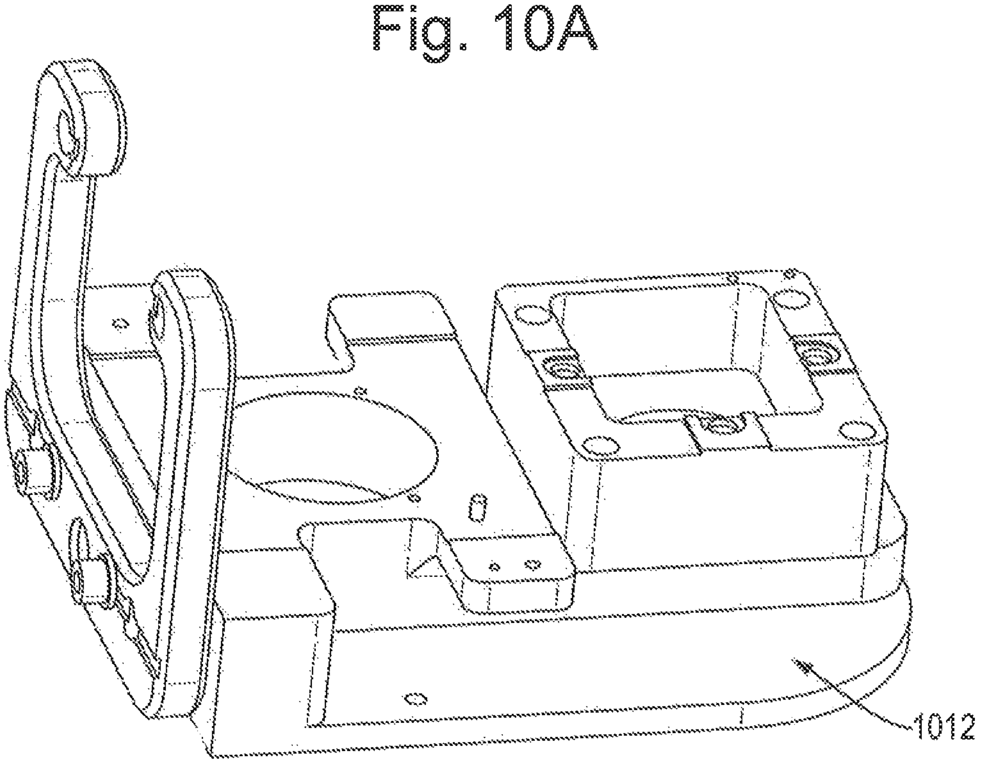
FIG. 10A shows in more detail a pusher plate assembly.
Figure 10B:
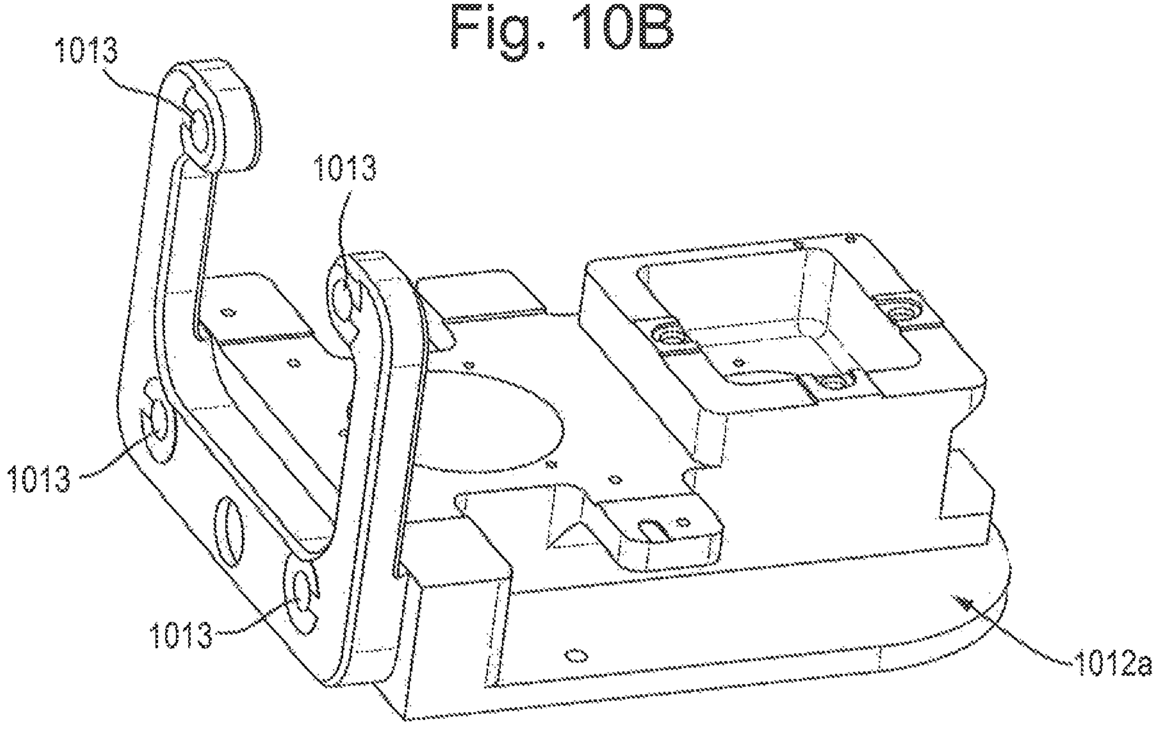
FIG. 10B shows a monolithic pusher plate assembly according to various embodiments and FIG. 10C shows a pusher plate assembly with a pusher electrode assembly or module and an ion detector assembly or module mounted thereto.
Figure 10C:
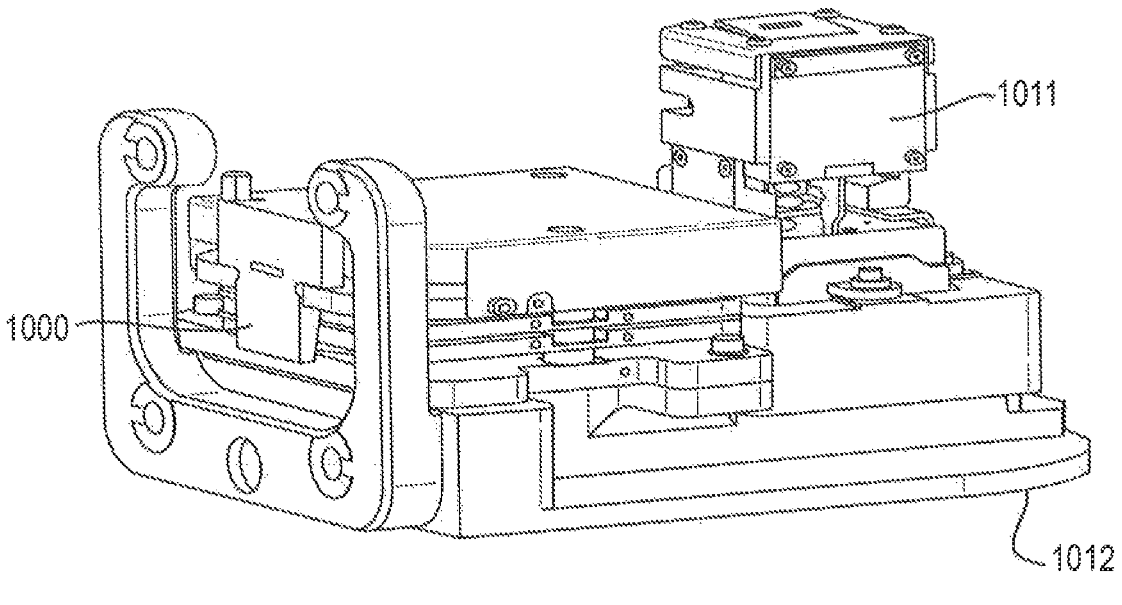

FIG. 10A shows a pusher plate assembly 1012 comprising three parts according to various embodiments. According to an alternative embodiment a monolithic support plate 1012*a* may be provided as shown in FIG. 10B. The monolithic support plate 1012*a* may be made by extrusion. The support plate 1012*a* may comprise a horse shoe shaped bracket having a plurality (e.g. four) fixing points 1013. According to an embodiment four screws may be used to connect the horse shoe shaped bracket to the housing of the mass spectrometer and enable a cantilevered arrangement to be provided. The bracket may be maintained at a voltage which may be the same as the Time of Flight voltage i.e. 4.5 kV. By way of contrast, the mass spectrometer housing may be maintained at ground voltage i.e. 0V.

FIG. 100 shows a pusher plate assembly 1012 having mounted thereon a pusher electrode assembly and an ion detector assembly 1011. An entrance plate 1000 having an ion entrance slit or aperture is shown.

Figure 16A:
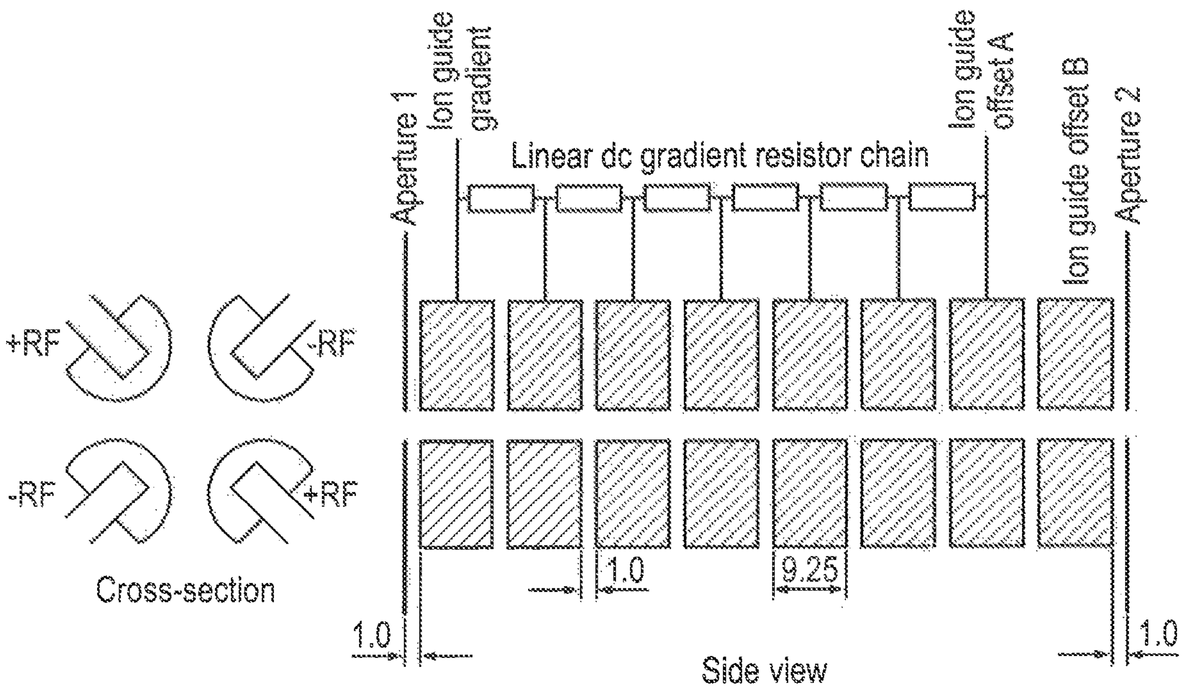
FIG. 16A shows in more detail a segmented quadrupole rod set ion guide according to various embodiments which may be provided downstream of the first ion guide and which comprises a plurality of rod electrodes.
Figure 16B:
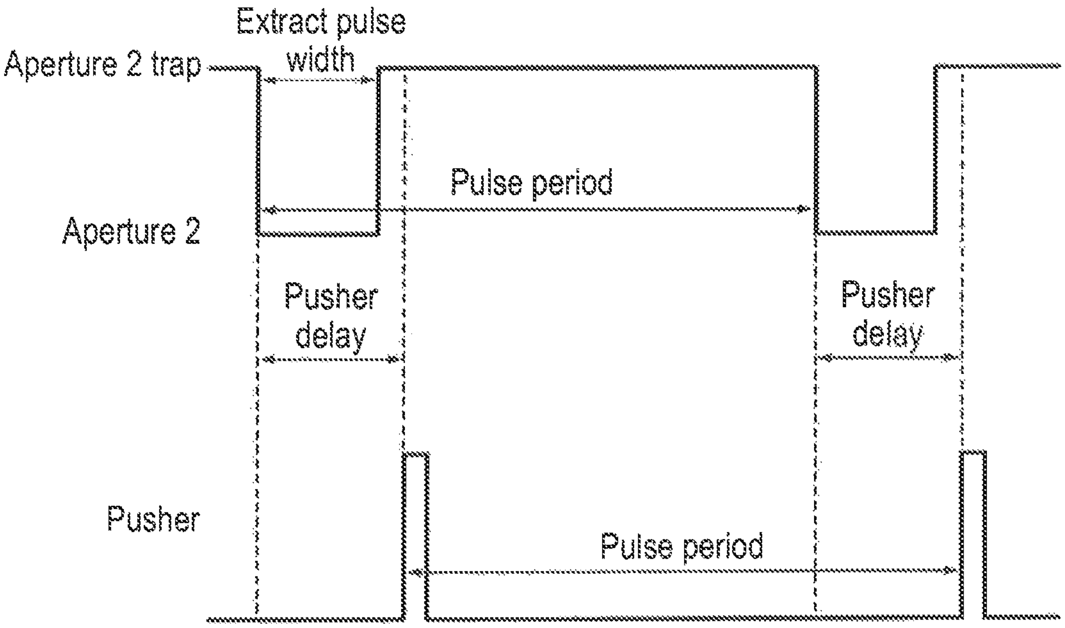
FIG. 16B illustrates how a voltage pulse applied to a pusher electrode of a Time of Flight mass analyser may be synchronised with trapping and releasing ions from the end region of the segmented quadrupole rod set ion guide.
Figure 16C:
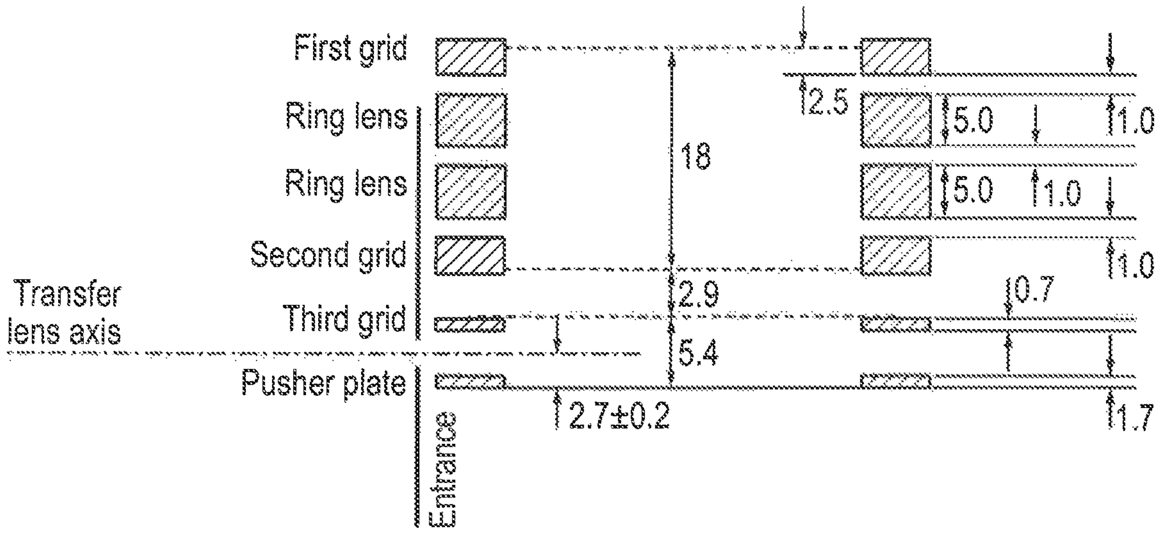
FIG. 16C illustrates in more detail the pusher electrode geometry and shows the arrangement of grid and ring lenses or electrodes and their relative spacing.

The pusher electrode may comprise a double grid electrode arrangement having a 2.9 mm field free region between a second and third grid electrode as shown in more detail in FIG. 16C.

Figure 11:
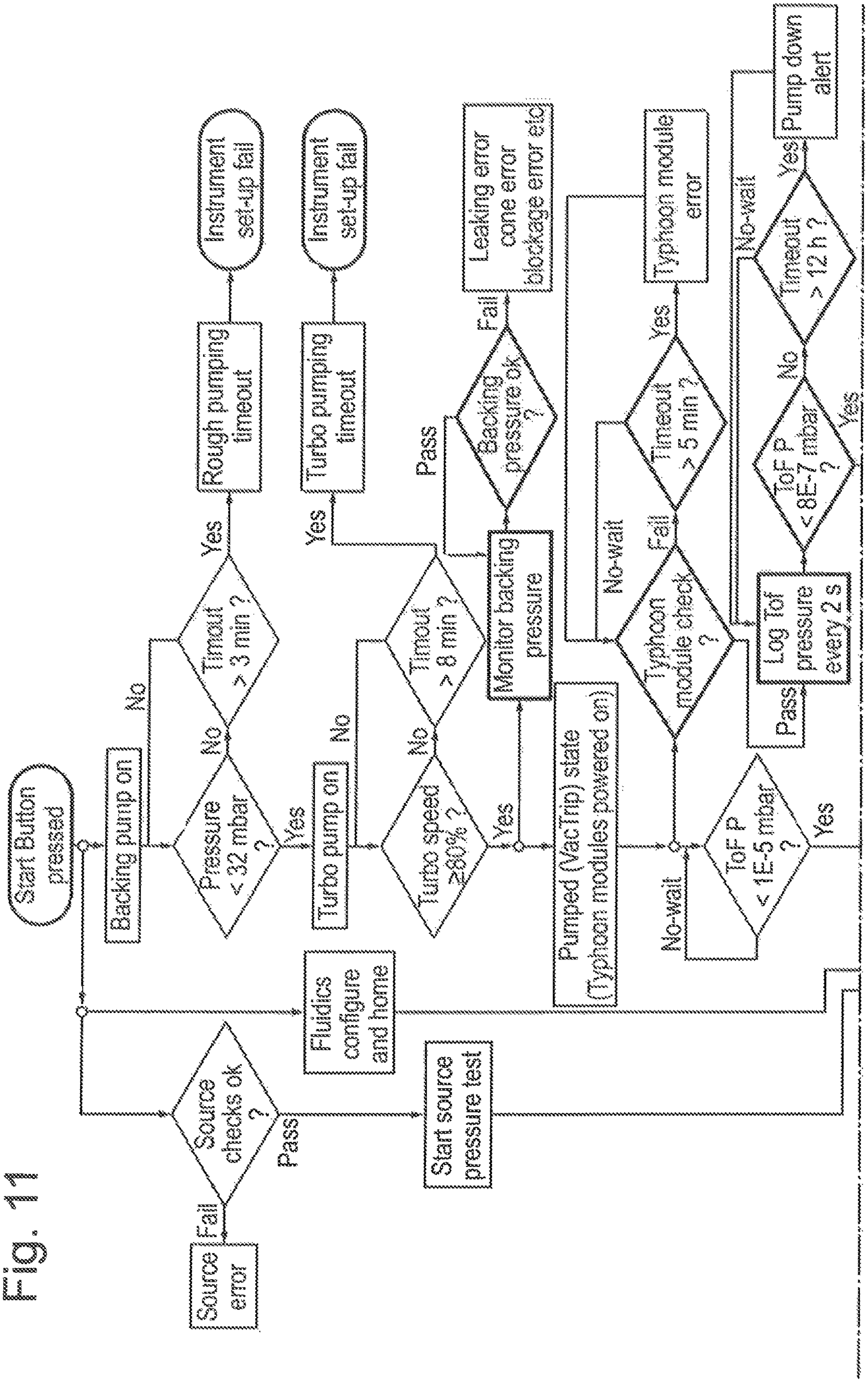
FIG. 11 shows a flow diagram illustrating various processes which occur upon a user pressing a start button on the front panel of the instrument according to various embodiments.
Figure 11:
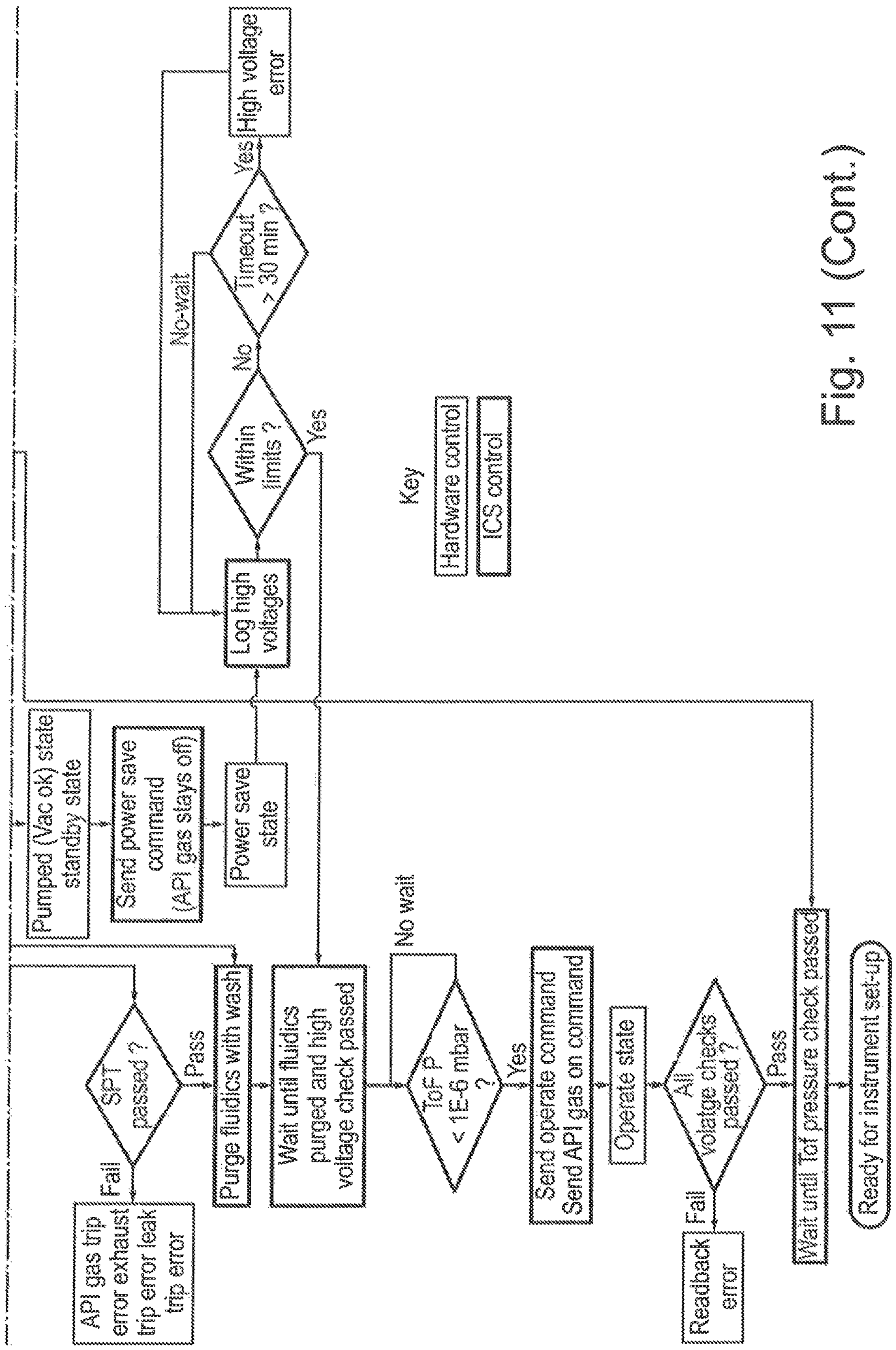

FIG. 11 shows a flow diagram illustrating various processes which may occur once a start button has been pressed.

According to an embodiment when the backing pump is turned ON a check may be made that the pressure is <32 mbar within three minutes of operation. If a pressure of <32 mbar is not achieved or established within three minutes of operation then a rough pumping timeout (amber) warning may be issued.

Figure 12A:
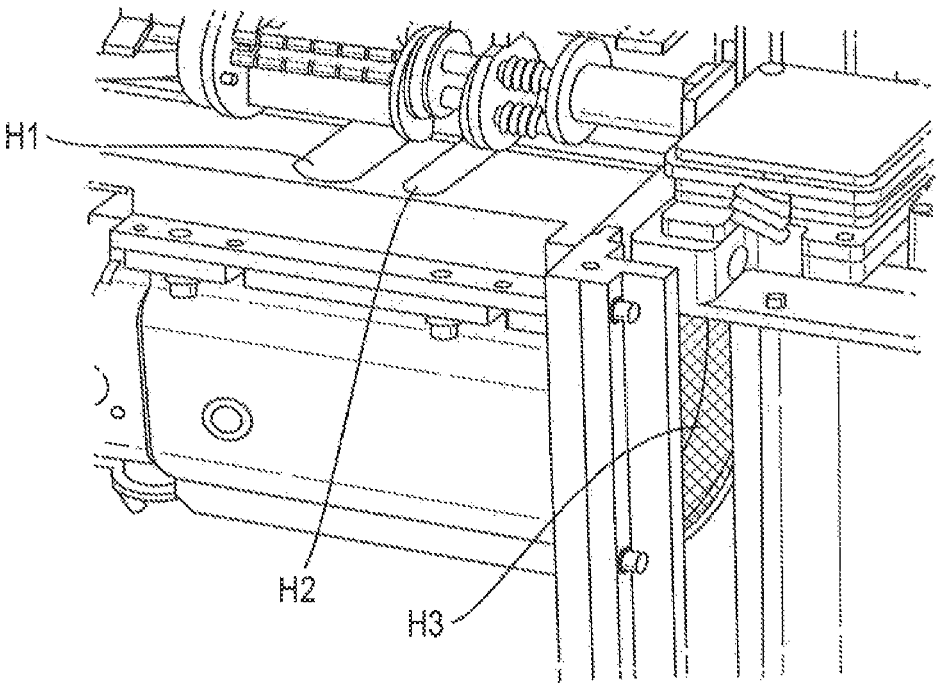
FIG. 12A shows in greater detail three separate pumping ports of a turbo molecular pump according to various embodiments and FIG. 12B shows in greater detail two of the three pumping ports which are arranged to pump separate vacuum chambers.

FIG. 12A shows the three different pumping ports of the turbo molecular pump according to various embodiments. The first pumping port H1 may be arranged adjacent the segmented quadrupole rod set 302. The second pumping port H2 may be arranged adjacent a first lens set of the transfer lens arrangement 303. The third pumping port (which may be referred to either as the H port or the H3 port) may be directly connected to Time of Flight mass analyser 304 vacuum chamber.

Figure 12B:
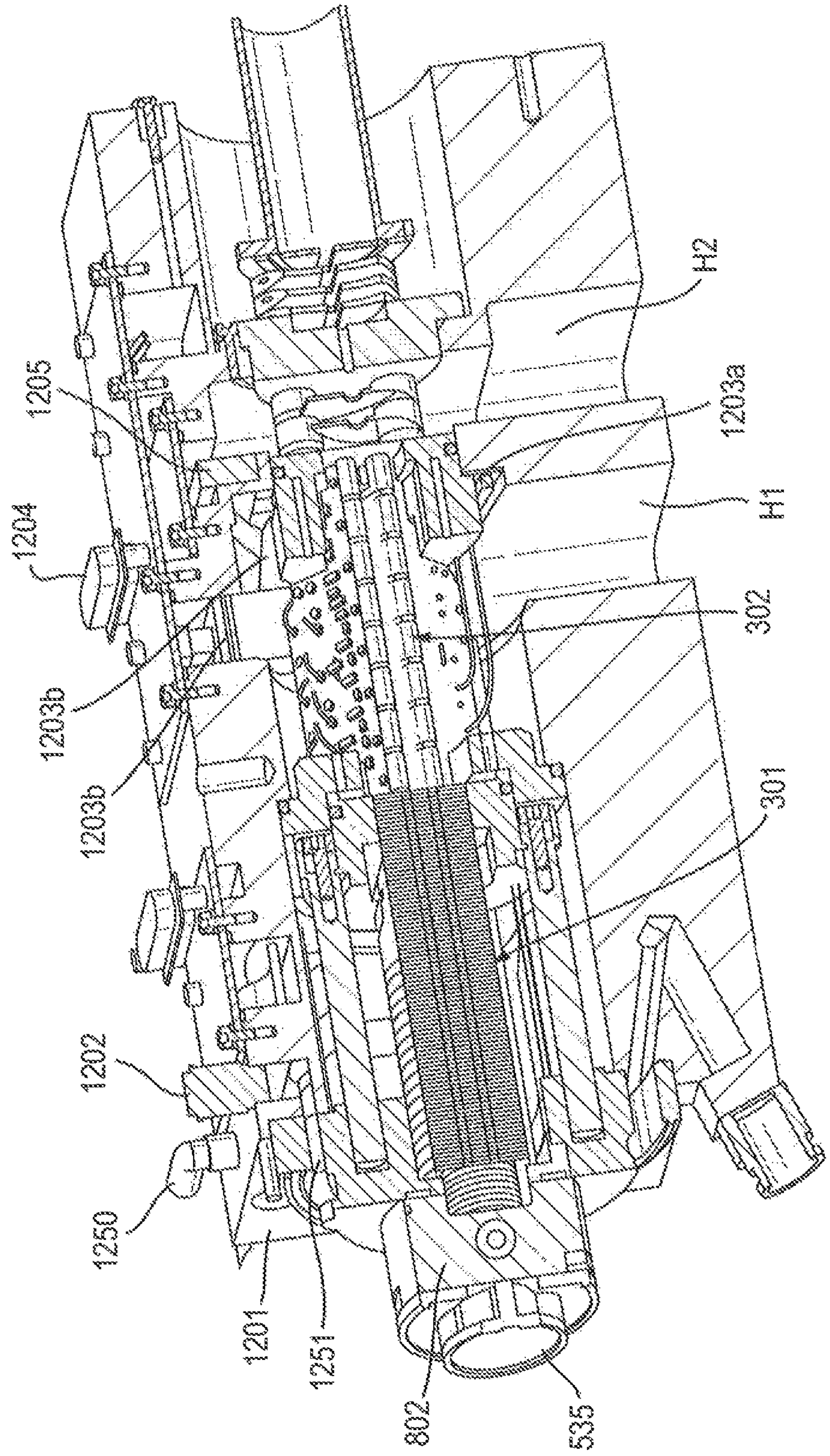

FIG. 12B shows from a different perspective the first pumping port H1 and the second pumping port H2. The user clamp 535 which is mounted in use to the ion block 802 is shown. The first ion guide 301 and the quadrupole rod set ion guide 302 are also indicated. A nebuliser or cone gas input 1201 is also shown. An access port 1251 is provided for measuring pressure in the source. A direct pressure sensor is provided (not fully shown) for measuring the pressure in the vacuum chamber housing the initial ion guide 301 and which is in fluid communication with the internal volume of the ion block 802. An elbow fitting 1250 and an over pressure relief valve 1202 are also shown.

One or more part-rigid and part-flexible printed circuit boards ("PCBs") may be provided. According to an embodiment a printed circuit board may be provided which comprises a rigid portion 1203*a* which is located at the exit of the quadrupole rod set region 302 and which is optionally at least partly arranged perpendicular to the optic axis or direction of ion travel through the quadrupole rod set 302. An upper or other portion of the printed circuit board may comprise a flexible portion 1203*b* so that the flexible portion 1203*b* of the printed circuit board has a stepped shape in side profile as shown in FIG. 12B.

According to various embodiments the H1 and H2 pumping ports may comprise EMC splinter shields.

It is also contemplated that the turbo pump may comprise dynamic EMC sealing of the H or H3 port. In particular, an EMC mesh may be provided on the H or H3 port.

Figure 13:
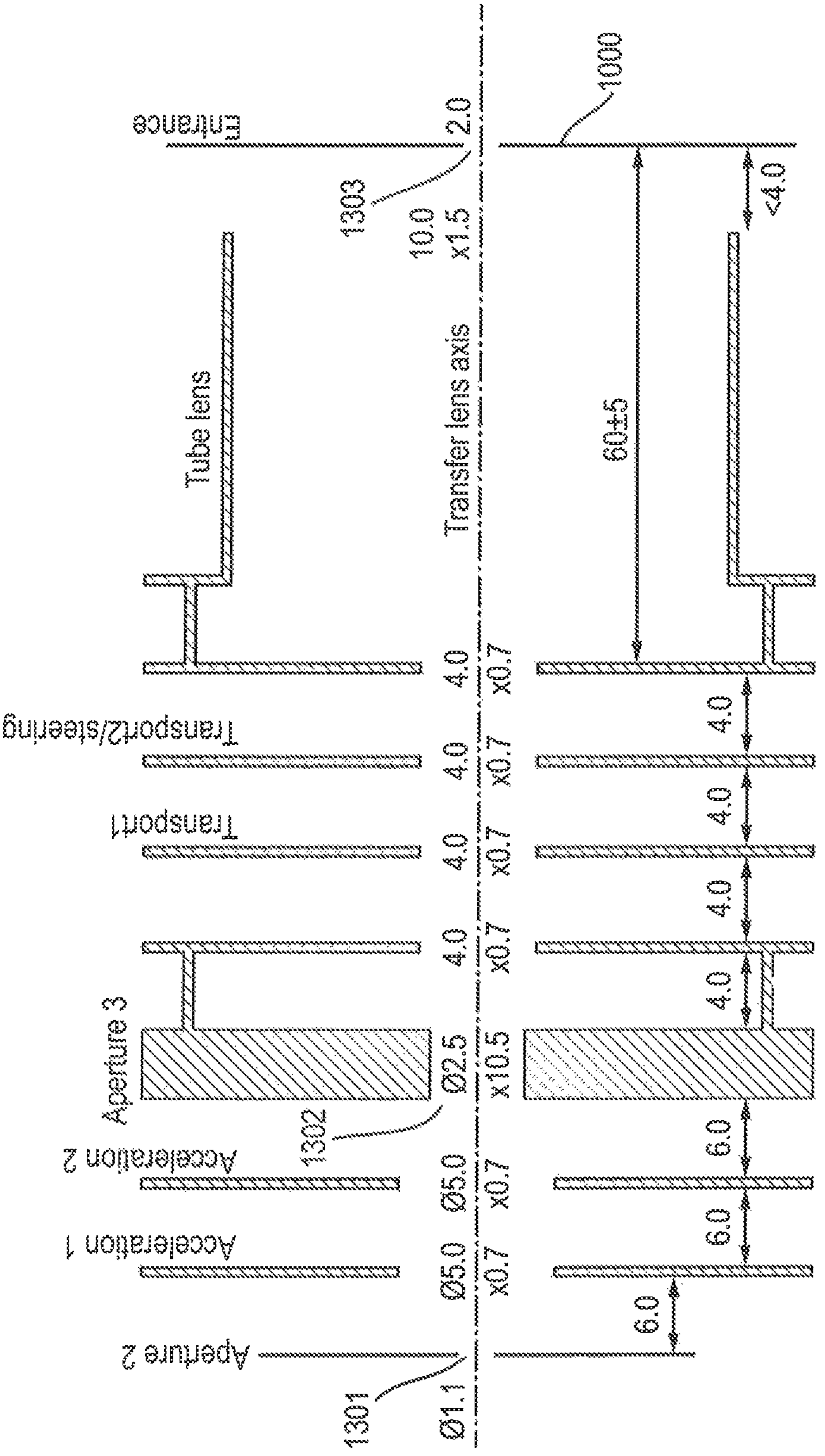
FIG. 13 shows in more detail a transfer lens arrangement.

FIG. 13 shows in more detail the transfer lens arrangement 303 and shows a second differential pumping aperture (Aperture #2) 1301 which separates the vacuum chamber housing the segmented quadrupole rod set 302 from first transfer optics which may comprise two acceleration electrodes. The relative spacing of the lens elements, their internal diameters and thicknesses according to an embodiment are shown. However, it should be understood that the relative spacing, size of apertures and thicknesses of the electrodes or lens elements may be varied from the specific values indicated in FIG. 13.

The region upstream of the second aperture (Aperture #2) 1301 may be in fluid communication with the first pumping port H1 of the turbo pump. A third differential pumping aperture (Aperture #3) 1302 may be provided between the first transfer optics and second transfer optics.

The region between the second aperture (Aperture #2) 1301 and the third aperture (Aperture #3) 1302 may be in fluid communication with the second pumping port H2 of the turbo pump.

The second transfer optics which is arranged downstream of the third aperture 1302 may comprises a lens arrangement comprising a first electrode which is electrical connection with the third aperture (Aperture #3) 1302. The lens arrangement may further comprise a second (transport) lens and a third (transport/steering) lens. Ions passing through the second transfer optics then pass through a tube lens before passing through an entrance aperture 1303. Ions passing through the entrance aperture 1303 pass through a slit or entrance plate 1000 into a pusher electrode assembly module.

The lens apertures after Aperture #3 1302 may comprise horizontal slots or plates. Transport 2/steering lens may comprise a pair of half plates.

The entrance plate 1000 may be arranged to be relatively easily removable by a service engineer for cleaning purposes.

One or more of the lens plates or electrodes which form a part of the overall transfer optics 303 may be manufactured by introducing an overcompensation etch of 5%. An additional post etch may also be performed. Conventional lens plates or electrodes may have a relatively sharp edge as a result of the manufacturing process. The sharp edges can cause electrical breakdown with conventional arrangements. Lens plates or electrodes which may be fabricated according to various embodiments using an overcompensation etching approach and/or additional post etch may have significantly reduced sharp edges which reduces the potential for electrical breakdown as well as reducing manufacturing cost.

Figure 14A:
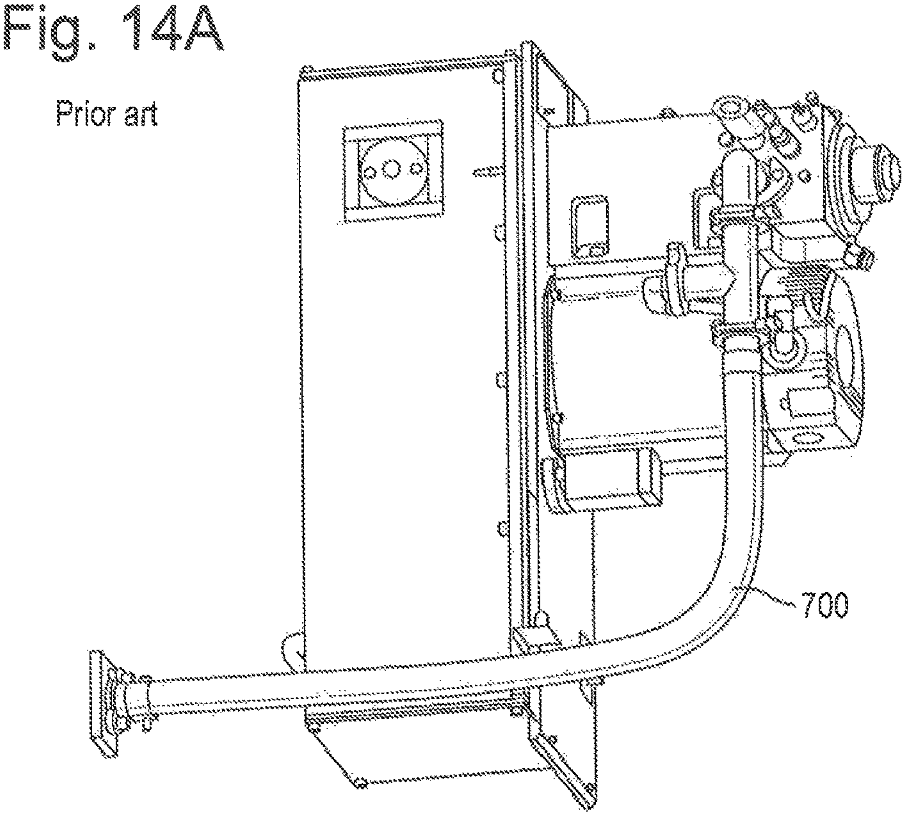
Fig. 14A Prior art
FIG. 14A shows details of a known internal vacuum configuration and FIG. 14B shows details of a new internal vacuum configuration according to various embodiments.
Figure 14B:
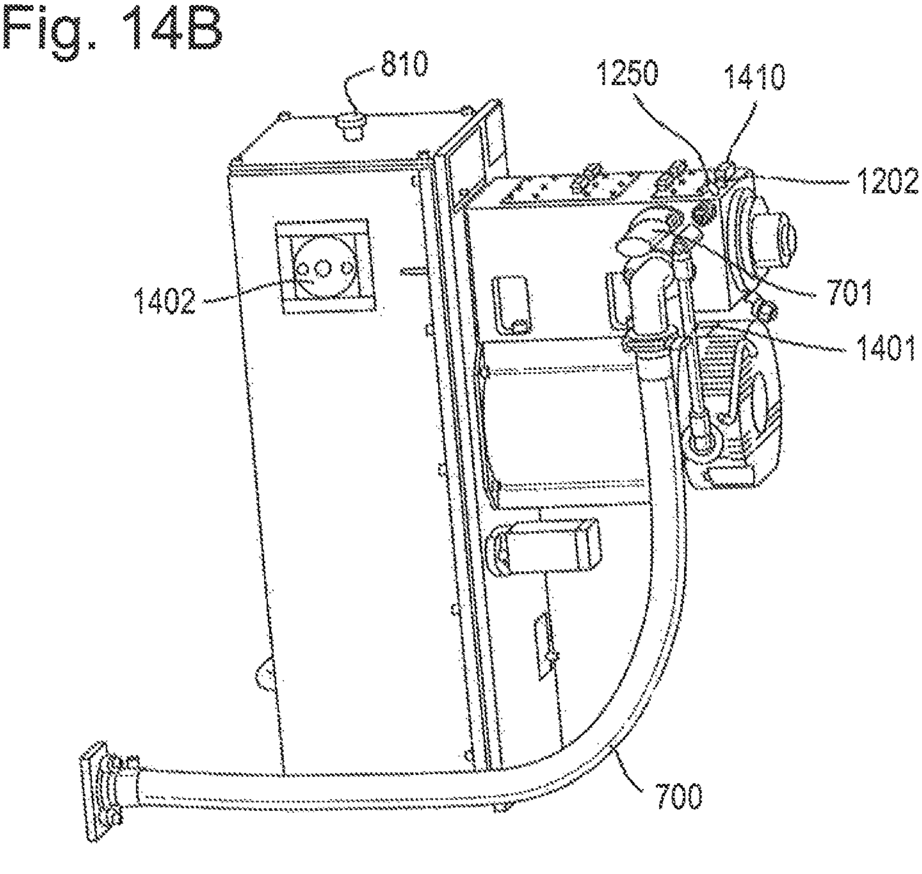

FIG. 14A shows details of a known internal vacuum configuration and FIG. 14B shows details of a new internal vacuum configuration according to various embodiments.

A conventional arrangement is shown in FIG. 14A wherein the connection 700 from the backing pump to the first vacuum chamber of a mass spectrometer makes a T-connection into the turbo pump when backing pressure is reached. However, this requires multiple components so that multiple separate potential leak points are established. Furthermore, the T-connection adds additional manufacturing and maintenance costs.

FIG. 14B shows an embodiment wherein the backing pump 700 is only directly connected to the first vacuum chamber i.e. the T-connection is removed. A separate connection 1401 is provided between the first vacuum chamber and the turbo pump.

A high voltage supply feed through 1402 is shown which provides a high voltage (e.g. 1.1 kV) to the pusher electrode module 305. An upper access panel 810 is also shown. A Pirani pressure gauge 701 is arranged to measure the vacuum pressure in the vacuum chamber housing the first ion guide 301. An elbow gas fitting 1250 is shown through which desolvation/cone gas may be supplied. With reference to FIG. 14B, behind the elbow gas fitting 1250 is shown the over pressure relief valve 1202 and behind the over pressure relief valve 1202 is shown a further elbow fitting which enables gas pressure from the source to be directly measured.

Figure 15A:
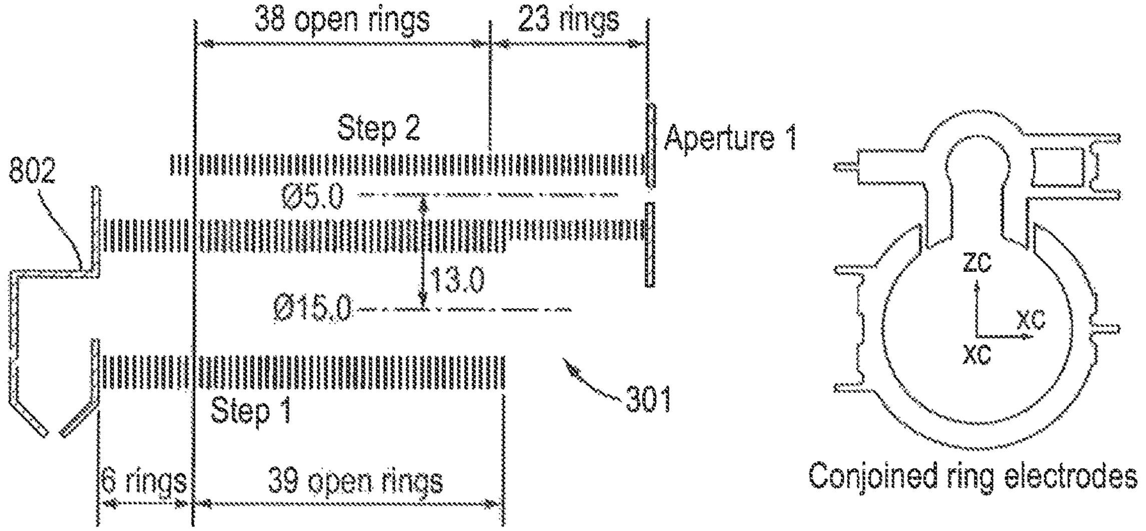
FIG. 15A shows a schematic of an arrangement of ring electrodes and conjoined ring electrodes forming a first ion guide which is arranged to separate charged ions from undesired neutral particles.

FIG. 15A shows a schematic of the ion block 802 and source or first ion guide 301. According to an embodiment the source or first ion guide 301 may comprise six initial ring electrodes followed by 38-39 open ring or conjoined electrodes. The source or first ion guide 301 may conclude with a further 23 rings. It will be appreciated, however, that the particular ion guide arrangement 301 shown in FIG. 15A may be varied in a number of different ways. In particular, the number of initial ring electrodes (e.g. 6) and/or the number of final stage (e.g. 23) ring electrodes may be varied. Similarly, the number of intermediate open ring or conjoined ring electrodes (e.g. 38-39) may also be varied.

It should be understood that the various dimensions illustrated on FIG. 15A are for illustrative purposes only and are not intended to be limiting. In particular, embodiments are contemplated wherein the sizing of ring and/or conjoined ring electrodes may be different from that shown in FIG. 15A.

A single conjoined ring electrode is also shown in FIG. 15A.

According to various embodiment the initial stage may comprise 0-5, 5-10, 10-15, 15-20, 20-25, 25-30, 30-35, 35-40, 40-45, 45-50 or >50 ring or other shaped electrodes. The intermediate stage may comprise 0-5, 5-10, 10-15, 15-20, 20-25, 25-30, 30-35, 35-40, 40-45, 45-50 or >50 open ring, conjoined ring or other shaped electrodes. The final stage may comprise 0-5, 5-10, 10-15, 15-20, 20-25, 25-30, 30-35, 35-40, 40-45, 45-50 or >50 ring or other shaped electrodes.

The ring electrodes and/or conjoined ring electrodes may have a thickness of 0.5 mm and a spacing of 1.0 mm. However, the electrodes may have other thicknesses and/or different spacings.

Aperture #1 plate may comprise a differential pumping aperture and may have a thickness of 0.5 mm and an orifice diameter of 1.50 mm. Again, these dimensions are illustrative and are not intended to be limiting.

A source or first ion guide RF voltage may be applied to all Step 1 and Step 2 electrodes in a manner as shown in FIG. 15A. The source or first ion guide RF voltage may comprise 200 V peak-to-peak at 1.0 MHz.

Embodiments are contemplated wherein a linear voltage ramp may be applied to Step 2 Offset (cone).

The Step 2 Offset (cone) voltage ramp duration may be made equal to the scan time and the ramp may start at the beginning of a scan. Initial and final values for the Step 2 Offset (cone) ramp may be specified over the complete range of Step 2 Offset (cone).

Figure 15B:
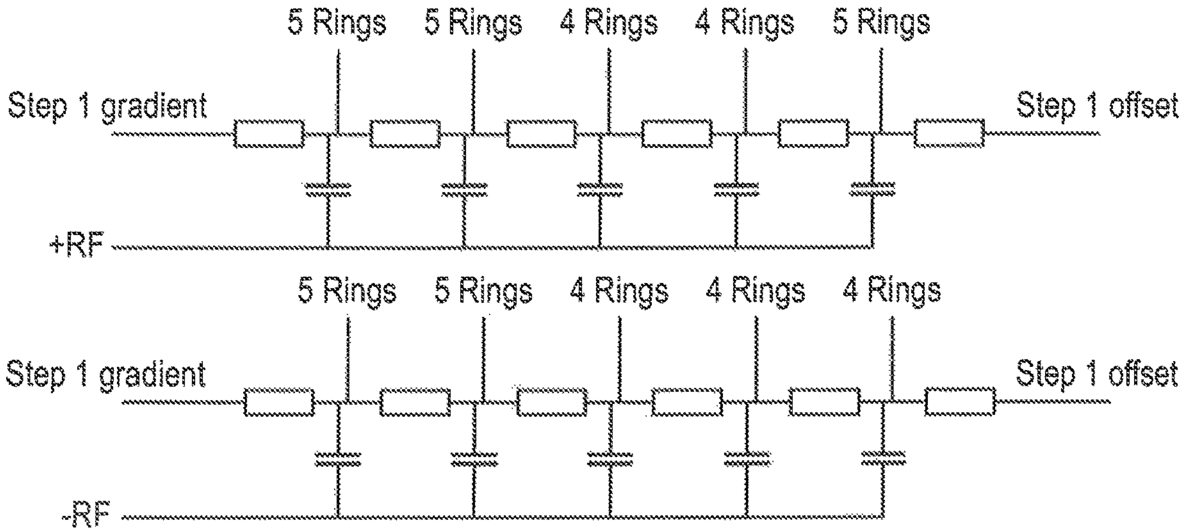
FIG. 15B shows a resistor chain which may be used to produce a linear axial DC electric field along the length of a first portion of the first ion guide and FIG. 15C shows a resistor chain which may be used to produce a linear axial DC electric field along the length of a second portion of the first ion guide.

According to various embodiments a resistor chain as shown in FIG. 15B may be used to produce a linear axial field along the length of Step 1. Adjacent ring electrodes may have opposite phases of RF voltage applied to them.

Figure 15C:
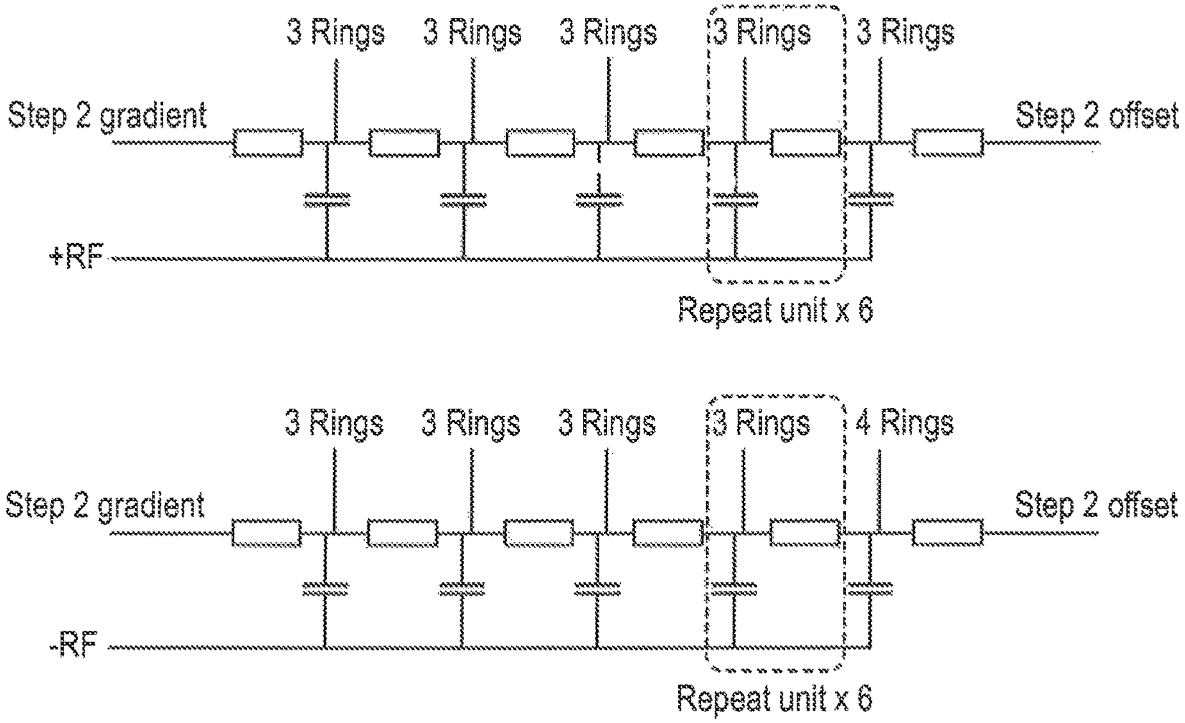

A resistor chain may also be used to produce a linear axial field along the length of Step 2 as shown in FIG. 15C. Adjacent ring electrodes may have opposite phases of RF voltage applied to them.

Embodiments are contemplated wherein the RF voltage applied to some or substantially all the ring and conjoined ring electrodes forming the first ion guide 301 may be reduced or varied in order to perform a non-mass to charge ratio specific attenuation of the ion beam. For example, as will be appreciated, with a Time of Flight mass analyser 304 the ion detector 307 may suffer from saturation effects if an intense ion beam is received at the pusher electrode 305. Accordingly, the intensity of the ion beam arriving adjacent the pusher electrode 305 can be controlled by varying the RF voltage applied to the electrodes forming the first ion guide 301. Other embodiments are also contemplated wherein the RF voltage applied to the electrodes forming the second ion guide 302 may additionally and/or alternatively be reduced or varied in order to attenuate the ion beam or otherwise control the intensity of the ion beam. In particular, it is desired to control the intensity of the ion beam as received in the pusher electrode 305 region.

FIG. 16A shows in more detail the quadrupole ion guide 302 according to various embodiments. The quadrupole rods may have a diameter of 6.0 mm and may be arranged with an inscribed radius of 2.55 mm. Aperture #2 plate which may comprise a differential pumping aperture may have a thickness of 0.5 mm and an orifice diameter of 1.50 mm. The various dimensions shown in FIG. 16A are intended to be illustrative and non-limiting.

The ion guide RF amplitude applied to the rod electrodes may be controllable over a range from 0 to 800 V peak-to-peak.

The ion guide RF voltage may have a frequency of 1.4 MHz. The RF voltage may be ramped linearly from one value to another and then held at the second value until the end of a scan.

As shown in FIG. 16B, the voltage on the Aperture #2 plate may be pulsed in an Enhanced Duty Cycle mode operation from an Aperture 2 voltage to an Aperture 2 Trap voltage. The extract pulse width may be controllable over the range 1-25 μs. The pulse period may be controllable over the range 22-85 μs. The pusher delay may be controllable over the range 0-85 μs.

FIG. 16C shows in more detail the pusher electrode arrangement. The grid electrodes may comprise Ø 60 parallel wire with 92% transmission (Ø 0.018 mm parallel wires at 0.25 mm pitch). The dimensions shown are intended to be illustrative and non-limiting.

Figure 16D:
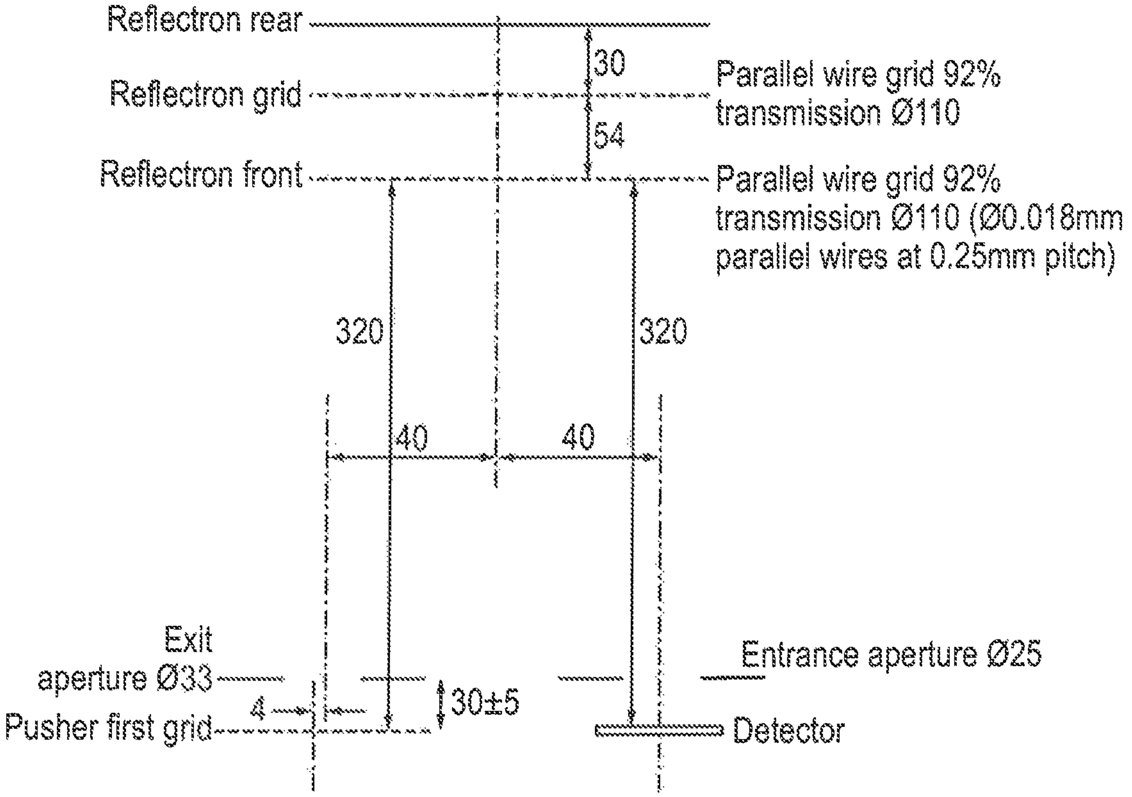
FIG. 16D illustrates in more detail the overall geometry of the Time of Flight mass analyser including the relative spacings of elements of the pusher electrode and associated electrodes, the reflectron grid electrodes and the ion detector.

FIG. 16D shows in more detail the Time of Flight geometry. The region between the pusher first grid, reflectron first grid and the detector grid preferably comprises a field free region. The position of the ion detector 307 may be defined by the ion impact surface in the case of a MagneTOF® ion detector or the surface of the front MCP in the case of a MCP detector.

The reflectron ring lenses may be 5 mm high with 1 mm spaces between them. The various dimensions shown in FIG. 16D are intended to be illustrative and non-limiting.

According to various embodiments the parallel wire grids may be aligned with their wires parallel to the instrument axis. It will be understood that the instrument axis runs through the source or first ion guide 301 through to the pusher electrode assembly 305.

A flight tube power supply may be provided which may have an operating output voltage of either +4.5 kV or −4.5 kV depending on the polarity requested.

A reflectron power supply may be provided which may have an operating output voltage ranging from 1625±100 V or −1625±100 V depending on the polarity requested.

Figure 16E:
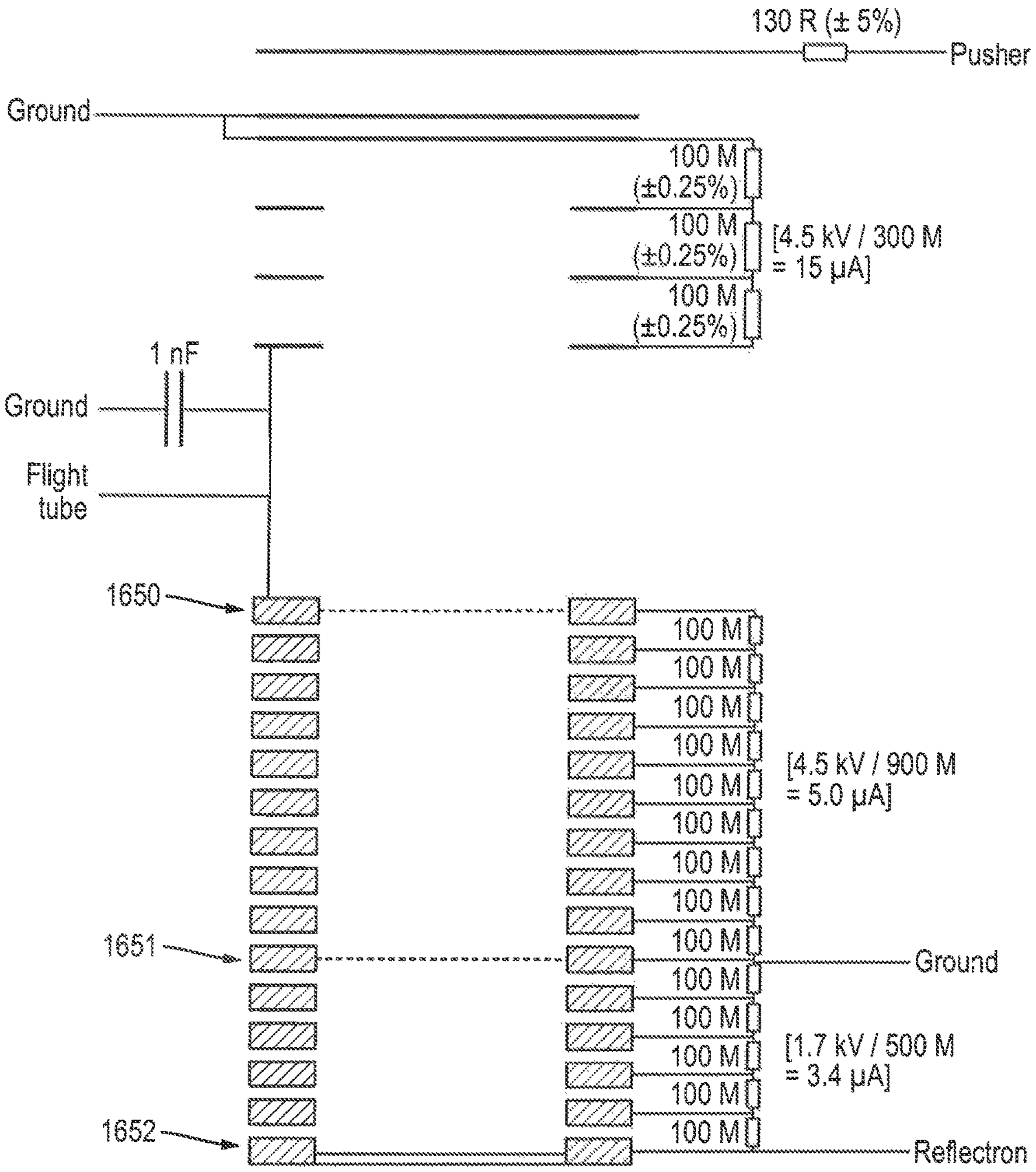
FIG. 16E is a schematic illustrating the wiring arrangement according to various embodiments of the pusher electrode and associated grid and ring electrodes and the grid and ring electrodes forming the reflectron.

FIG. 16E is a schematic of the Time of Flight wiring according to an embodiment. The various resistor values, voltages, currents and capacitances are intended to be illustrative and non-limiting.

According to various embodiments a linear voltage gradient may be maintained along the length of the reflectron 306. In a particular embodiment a reflectron clamp plate may be maintained at the reflectron voltage.

An initial electrode and associated grid 1650 of the reflectron 306 may be maintained at the same voltage or potential as the flight tube 807 and the last electrode of the pusher electrode assembly 305. According to an embodiment the initial electrode and associated grid 1650 of the reflectron 306, the flight tube 807 and the last electrode and associated grid of the pusher electrode assembly 305 may be maintained at a voltage or potential of e.g. 4.5 kV of opposite polarity to the instrument or mode of operation. For example, in positive ion mode the initial electrode and associated grid 1650 of the reflectron 306, the flight tube 807 and the last electrode and associated grid of the pusher electrode assembly 305 may be maintained at a voltage or potential of −4.5 kV.

The second grid electrode 1651 of the reflectron 306 may be maintained at ground or 0V.

The final electrode 1652 of the reflectron 306 may be maintained at a voltage or potential of 1.725 kV of the same polarity as the instrument. For example, in positive ion mode the final electrode 1652 of the reflectron 306 may be maintained at a voltage or potential of +1.725 kV.

It will be understood by those skilled in the art that the reflectron 306 acts to decelerate ions arriving from the time of flight region and to redirect the ions back out of the reflectron 306 in the direction of the ion detector 307.

The voltages and potentials applied to the reflectron 306 according to various embodiments and maintaining the second grid electrode 1651 of the reflectron at ground or 0V is different from the approach adopted in conventional reflectron arrangements.

The ion detector 307 may always be maintained at a positive voltage relative to the flight tube voltage or potential. According to an embodiment the ion detector 307 may be maintained at a +4 kV voltage relative to the flight tube.

Accordingly, in a positive ion mode of operation if the flight tube is maintained at an absolute potential or voltage of −4.5 kV then the detector may be maintained at an absolute potential or voltage of −0.5 kV.

FIG. 16F shows the DC lens supplies according to an embodiment. It will be understood that Same polarity means the same as instrument polarity and that Opposite polarity means opposite to instrument polarity. Positive means becomes more positive as the control value is increased and Negative means becomes more negative as the control value is increased. The particular values shown in FIG. 16F are intended to be illustrative and non-limiting.

Figure 16G:
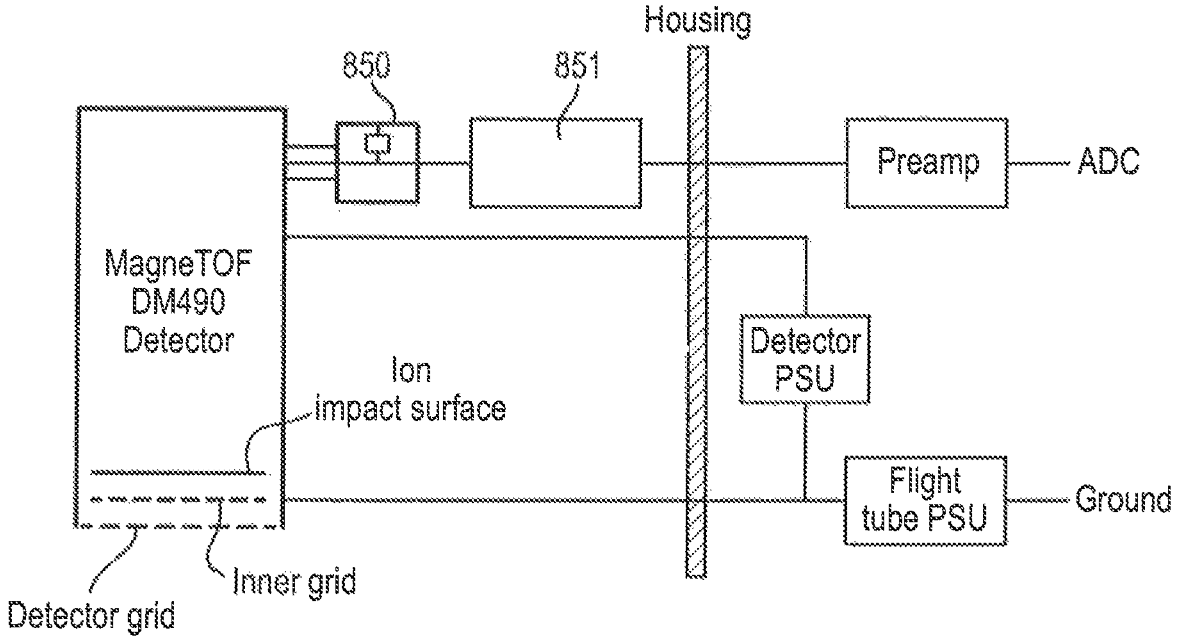
FIG. 16G is a schematic of an ion detector arrangement according to various embodiments and which shows various connections to the ion detector which are located both within and external to the Time of Flight housing and FIG. 16H shows an illustrative potential energy diagram.

FIG. 16G shows a schematic of an ion detector arrangement according to various embodiments. The detector grid may form part of the ion detector 307. The ion detector 307 may, for example, comprise a MagneTOF® DM490 ion detector. The inner grid electrode may be held at a voltage of +1320 V with respect to the detector grid and flight tube via a series of zener diodes and resistors. The ion detector 307 may be connected to a SMA 850 and an AC coupler 851 which may both be provided within or internal to the mass analyser housing or within the mass analyser vacuum chamber. The AC coupler 851 may be connected to an externally located preamp which in turn may be connected to an Analogue to Digital Converter ("ADC") module.

Figure 16H:
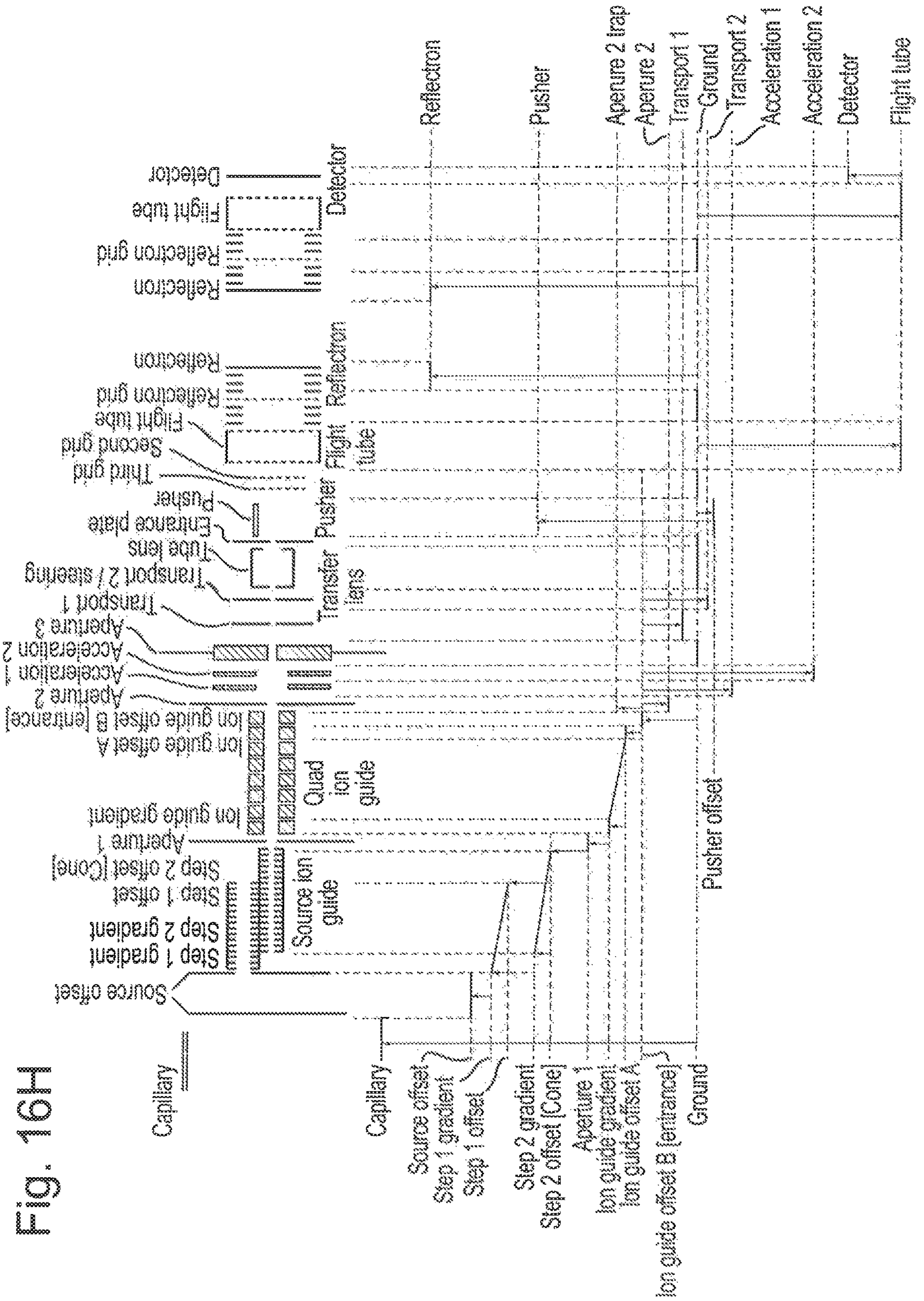

FIG. 16H shows a potential energy diagram for an instrument according to various embodiments. The potential energy diagram represents an instrument in positive ion mode. In negative ion mode all the polarities are reversed except for the detector polarity. The particular voltages/potentials shown in FIG. 16H are intended to be illustrative and non-limiting.

The instrument may include an Analogue to Digital Converter ("ADC") which may be operated in peak detecting ADC mode with fixed peak detecting filter coefficients. The ADC may also be run in a Time to Digital Converter ("TDC") mode of operation wherein all detected ions are assigned unit intensity. The acquisition system may support a scan rate of up to 20 spectra per second. A scan period may range from 40 ms to 1 s. The acquisition system may support a maximum input event rate of $7\times10^6$ events per second.

According to various embodiments the instrument may have a mass accuracy of 2-5 ppm may have a chromatographic dynamic range of $10^4$. The instrument may have a high mass resolution with a resolution in the range 10000-15000 for peptide mapping. The mass spectrometer 100 is preferably able to mass analyse intact proteins, glycoforms and lysine variants. The instrument may have a mass to charge ratio range of approx. 8000.

Instrument testing was performed with the instrument fitted with an ESI source 401. Sample was infused at a flow rate of 400 mL/min. Mass range was set to m/z 1000. The instrument was operated in positive ion mode and high resolution mass spectral data was obtained.

According to various embodiments the instrument may have a single analyser tune mode i.e. no sensitivity and resolution modes.

According to various embodiments the resolution of the instrument may be in the range 10000-15000 for high mass or mass to charge ratio ions such as peptide mapping applications. The resolution may be determined by measuring on any singly charged ion having a mass to charge ratio in the range 550-650.

The resolution of the instrument may be around 5500 for low mass ions. The resolution of instrument for low mass ions may be determined by measuring on any singly charged ion having a mass to charge ratio in the range 120-150.

According to various embodiments the instrument may have a sensitivity in MS positive ion mode of approx. 11,000 counts/second. The mass spectrometer 100 may have a mass accuracy of approx. 2-5 ppm Mass spectral data obtained according to various embodiments was observed as having reduced in-source fragmentation compared with conventional instruments. Adducts are reduced compared with conventional instruments. The mass spectral data also has cleaner valleys (<20%) for mAb glycoforms.

As disclosed in US 2015/0076338 (Micromass), the contents of which are incorporated herein by reference, the instrument according to various embodiment may comprise a plurality of discrete functional modules. The functional modules may comprise, for example, electrical, mechanical, electromechanical or software components. The modules may be individually addressable and may be connected in a network. A scheduler may be arranged to introduce discrete packets of instructions to the network at predetermined times in order to instruct one or more modules to perform various operations. A clock may be associated with the scheduler.

The functional modules may be networked together in a hierarchy such that the highest tier comprises the most time-critical functional modules and the lowest tier comprises functional modules which are the least time time-critical. The scheduler may be connected to the network at the highest tier.

For example, the highest tier may comprise functional modules such as a vacuum control system, a lens control system, a quadrupole control system, an electrospray module, a Time of Flight module and an ion guide module. The lowest tier may comprise functional modules such as power supplies, vacuum pumps and user displays.

The mass spectrometer 100 according to various embodiments may comprise multiple electronics modules for controlling the various elements of the spectrometer. As such, the mass spectrometer may comprise a plurality of discrete functional modules, each operable to perform a predetermined function of the mass spectrometer 100, wherein the functional modules are individually addressable and connected in a network and further comprising a scheduler operable to introduce discrete packets of instructions to the network at predetermined times in order to instruct at least one functional module to perform a predetermined operation.

The mass spectrometer 100 may comprise an electronics module for controlling (and for supplying appropriate voltage to) one or more or each of: (i) the source; (ii) the first ion guide; (iii) the quadrupole ion guide; (iv) the transfer optics; (v) the pusher electrode; (vi) the reflectron; and (vii) the ion detector.

This modular arrangement may allow the mass spectrometer to be reconfigured straightforwardly. For example, one or more different functional elements of the spectrometer may be removed, introduced or changed, and the spectrometer may be configured to automatically recognised which elements are present and to configure itself appropriately.

The instrument may allow for a schedule of packets to be sent onto the network at specific times and intervals during an acquisition. This reduces or alleviates the need for a host computer system with a real time operating system to control aspects of the data acquisition. The use of packets of information sent to individual functional modules also reduces the processing requirements of a host computer.

The modular nature conveniently allows flexibility in the design and/or reconfiguring of a mass spectrometer. According to various embodiments at least some of the functional modules may be common across a range of mass spectrometers and may be integrated into a design with minimal reconfiguration of other modules. Accordingly, when designing a new mass spectrometer, wholesale redesign of all the components and a bespoke control system are not necessary. A mass spectrometer may be assembled by connecting together a plurality of discrete functional modules in a network with a scheduler.

Furthermore, the modular nature of the mass spectrometer 100 according to various embodiments allows for a defective functional module to be replaced easily. A new functional module may simply be connected to the interface. Alternatively, if the control module is physically connected to or integral with the functional module, both can be replaced.

In accordance with the disclosure, the mass spectrometer is arranged to automatically perform a start-up routine when the ON/start button is pressed. The start-up routine involves a sequence of steps which, in the absence of a fault, may result in the mass spectrometer being automatically brought to an operating state, ready for the user to submit a sample batch. No user intervention is required, in the absence of a fault. At various points, tests are automatically initiated, to ensure that no fault is present in relation to various parts of the spectrometer.

By way of example, FIG. 11 is a flow diagram illustrating various processes which may occur once the start button has been pressed. The term "ICS" refers to "Instrument Control System" software. The main steps in the start-up process shown in FIG. 11 will now be described.

When the start button of the mass spectrometer is pressed, the mass spectrometer (i.e. the control system thereof) will turn ON the backing pump. The mass spectrometer will also turn ON the turbo pump when the backing pressure reaches a defined value.

Once the turbo pump reaches 80% of its maximum speed then the mass spectrometer control system will turn ON the Time of Flight mass analyser pressure gauge.

As described above, the mass spectrometer includes a plurality of functional modules (the "Typhoon modules"). At 80% turbo speed the functional modules are turned ON and it is checked which modules are present. Assuming that an acceptable set of modules is present, and found to be in communication with the network, the mass spectrometer proceeds to determine whether appropriate configuration information for the modules is stored locally (i.e. within a controller of the mass spectrometer, or within a PC that is connected to the mass spectrometer, and used to control it); and if present, performs configuration of the mass spectrometer; and if not present, automatically downloads configuration data over the internet from a remote server, and uses the downloaded data to configure the mass spectrometer.

Once the pressure in the Time of Flight mass analyser vacuum chamber is below $1\times10^{-5}$ mbar then the instrument is automatically moved to a power save mode (which is defined in more detail below).

On transition to the power save mode (power save state in FIG. 11), voltage is supplied to the following; the pusher electrode, the reflectron, flight tube and the ion detector of the Time of Flight mass analyser.

As shown in FIG. 11, automatic checks may be performed to ensure that the voltages set are settled within a given time for the ion detector, flight tube and the reflectron.

Checks may also be performed automatically to monitor the current for the reflectron and flight tube when first turned ON for a defined period of time to ensure there is no breakdown within the Time of Flight mass analyser. This is carried out without the intervention of the user.

Once pressure in the Time of Flight mass analyser vacuum chamber is below $1\times10^{-6}$ mbar, the mass spectrometer moves automatically to an operating mode (operate state in FIG. 11). On transition to the operating mode the following voltages are additionally turned ON; transfer lens voltages, ion guide voltages, stepwave ion guide voltages, capillary tube of the source. The desolvation gas supply is turned on, and the desolvation gas heater is turned on.

Checks may be carried out to ensure that the temperature of the desolvation gas settles, the desolvation gas is turned ON and the voltages supplied to the various components upon transition to the operating mode have reached the required values. Once this is all completed, the mass spectrometer is in a ready to use state, being ready to acquire sample data. No user intervention is required other than the submission of a sample batch.

The various modes of the mass spectrometer will now be described in more detail.

It will be seen that when the start-up button is pressed, all gases, heaters and voltages are turned ON, but at different stages.

When transition to power save mode occurs, the following voltages are turned ON; pusher, reflectron, ion detector and flight tube.

When transition to operating mode occurs, the following voltages are additionally turned ON; transfer lens voltages, ion guide voltages, stepwave ion guide voltages, source capillary tube voltage. The desolvation gas heater is turned on, and the desolvation gas supply is turned on.

Thus, power save mode is a mode in which all back voltages are kept ON, front voltages are turned OFF and desolvation gas supply is OFF. In this mode the pusher, reflectron, ion detector and flight tube voltages are ON. The following voltages are OFF; transfer lens voltages, ion guide voltages, stepwave ion guide voltages, source capillary tube voltage. The desolvation gas heater and desolvation gas supply are OFF. The source heater is additionally ON.

In the operating mode, all voltages are ON, and the desolvation gas supply is ON. Thus, the front voltages are ON. In this mode, in addition to the pusher, reflectron, ion detector and Time of Flight mass analyser voltages, the following voltages are also ON; transfer lens voltages, ion guide voltages, stepwave ion guide voltages, and source capillary tube. The desolvation gas heater and desolvation gas supply are ON. In addition, the source heater is ON.

In embodiments of the disclosure, the mass spectrometer automatically transitions from power save mode to operating mode during the start-up routine, in the absence of a fault.

In embodiments of the disclosure, the mass spectrometer is maintained, as a default, in power save mode, and can be switched to operating mode where all the relevant voltages and gas flows are turned ON. By maintaining the spectrometer in power save mode as default, as described below, the time taken for the instrument to be put into a useable state is significantly reduced.

The mass spectrometer has a further state, a "standby mode". The standby mode is a mode in which all voltages are OFF, and the desolvation gas supply and heater are OFF. Only the source heater is ON.

In accordance with embodiments of the disclosure, the standby mode is used if a serious fault occurs, in which case it would be entered automatically, or if an engineer specifies that the instrument should be put into a standby mode operation. In some embodiments the user may cause the mass spectrometer to enter the standby mode by pressing and holding the power button, while in other embodiments the user is prevented from being able to cause the spectrometer to enter standby mode. The standby mode corresponds to a mode previously known on Time of Flight mass analyser products as source standby. If a serious fault develops, which only a service engineer can resolve, then the mass spectrometer will automatically switch to standby.

The stability of the power supplies for the flight tube, detector and reflectron can affect the mass accuracy of the instrument. On previous products the settling time when turning ON or switching polarity was around 20 minutes. Data has found that if the supplies are cold or been left off for a prolonged period of time they will require 10 hours to warm up and stabilise.

For this reason, in embodiments of the disclosure on start-up the instrument moves to power save mode, and may be switched back to this mode by the user once the user has finished operating the mass spectrometer.

During the start-up routine, the mass spectrometer is put into the power save mode as soon as possible. This ensures that the voltages to the flight tube, detector and reflectron are turned on as soon as possible, maximising the time available for them to stabilise, and minimising delay in being able to enter the operating state. Pumping down of the mass spectrometer will continue after the spectrometer has entered the power save mode until a pressure in the vacuum chamber of the Time of Flight mass analyser has reached a level lower than a predetermined threshold. Thus, there will still be some time to wait before the spectrometer can be put into the operating mode. However, by putting the spectrometer into power save mode, stabilisation of the voltages to the mass analyser components may occur during this period of pumping down, minimising any additional delay. By the time the mass spectrometer has reached the required pressure to enter operating mode, and be ready for the user to carry out instrument setup, the voltage supplies will have stabilised, thus reducing the mass accuracy concerns.

Usability is a major contributor to the requirements and operation of the spectrometer. In embodiments, the mass spectrometer is intended to have the capability to self-diagnose all problems, and, depending on the effect that each problem has on the spectrometer, determine what, if any action can be taken to rectify the problem. According to various embodiments health checks are performed and printer style error correction instructions may be provided to a user.

The health check system may be used in bringing the mass spectrometer to readiness from a cold start, bringing the spectrometer to readiness after maintenance, and monitoring the mass spectrometer for issues on a periodic basis to make sure it remains fit to run experiments.

Referring to FIG. 11, in addition to the main steps of the start-up routine described above, it will be seen that checks are made at various points in the routine. For example, the backing pressure may be monitored. The pressure of the vacuum chamber housing the Time of Flight mass analyser may be checked periodically. The stability of various voltages may be checked. Many of these tests involve checking that a given requirement is met within a predetermined time period e.g. that a pressure has reached a given threshold, or that a voltage has stabilised within a given time period. At any time, one of these tests or checks may not be passed. This may result in a determination of a fault.

The mass spectrometer may be arranged to monitor various parameters and other features relating to the operation of the spectrometer, and assign a status to each. Monitoring may be carried out at predetermined intervals e.g. in operating mode, or may be triggered at particular points in a start-up routine, or when bringing the spectrometer back into operation after maintenance. Monitoring may be based on outputs from various sensors and/or the outcome of tests performed.

The status may be a fault or a non-fault status depending upon the outcome of the e.g. test. The fault and non-fault statuses may be selected from respective lists of multiple possible statuses. Monitoring may be carried out such that the status of each parameter or feature is regularly checked.

By way of example, in embodiments as illustrated in FIG. 11, when the backing pump is turned ON, a check may be made that the backing pressure is <32 mbar within three minutes of operation. If a pressure of <32 mbar is not achieved within this period, then a fault may be determined.

Figure 17:
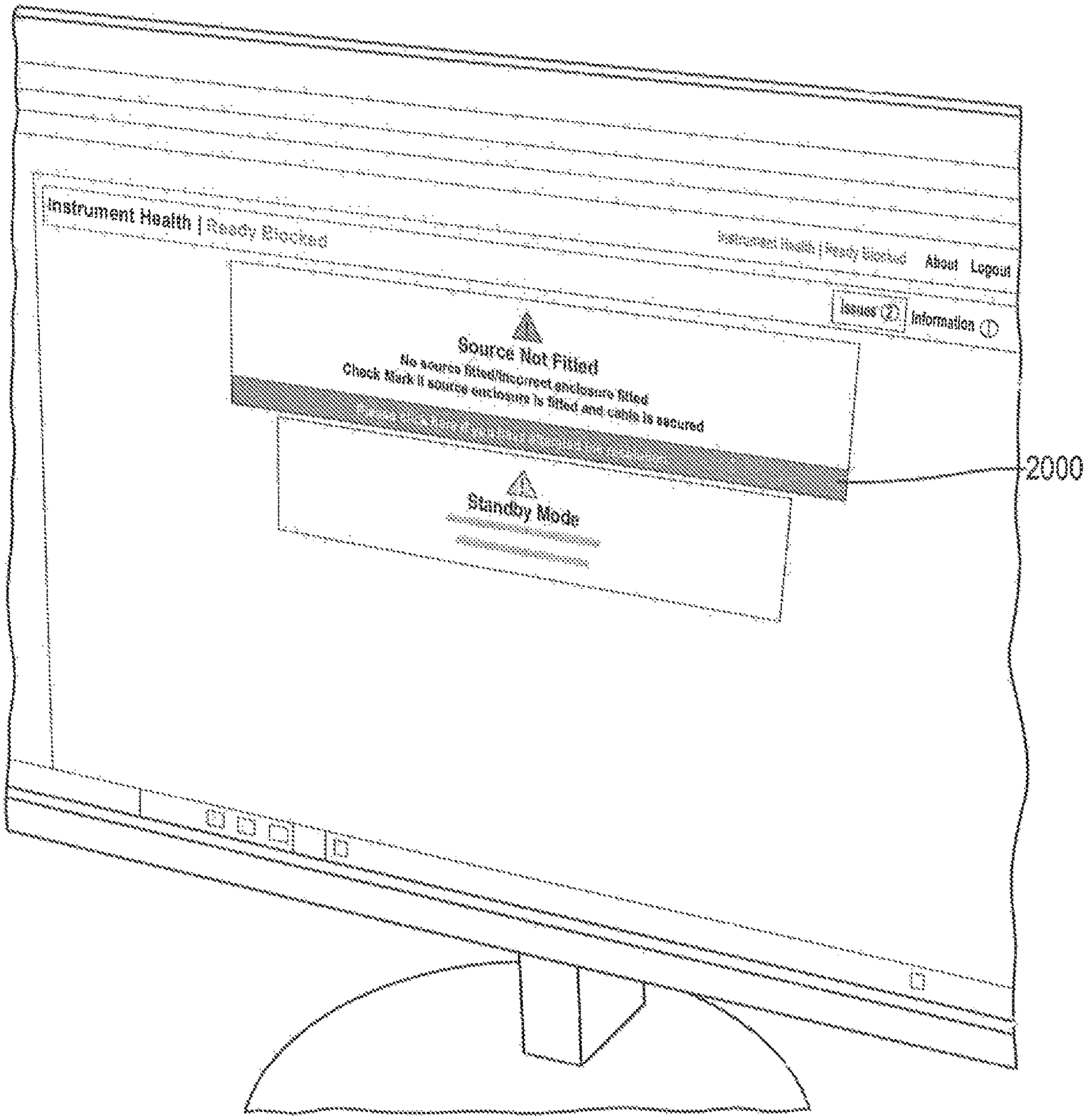
FIG. 17 shows an indication of a fault which may be provided on a computer device connected to the mass spectrometer in some embodiments.

When a fault is determined, the mass spectrometer is arranged to determine what action, if any, may be taken to rectify the problem. In embodiments, a fault is put into one of three categories. In a first category, the fault is one that the mass spectrometer can attempt to rectify itself, and automatically, without intervention by a user. In a second category, the fault is one which the user may attempt to rectify. A third category of more serious faults may only be rectified by a service engineer. A fault may be categorised based on its severity. An initially less severe fault may be recategorised to a higher severity e.g. a higher category, if initial attempts to solve the problem have failed.

Where a fault is detected that the mass spectrometer may attempt to rectify itself, the spectrometer automatically takes the appropriate action. The spectrometer may then check again to determine whether the fault has been corrected, and if so, update the relevant status to a non-fault status.

Where a fault is detected that the user may attempt to rectify, the mass spectrometer causes an indication of the fault, and instructions as to how to attempt to rectify the fault, to be displayed to the user. Typically the information is displayed to the user via a computing device connected to the mass spectrometer. Some information may additionally be displayed on a display forming part of the mass spectrometer unit itself. This is discussed in more detail in relation to FIGS. 2A-C above. FIG. 17 illustrates an example of a fault indication which may be displayed to the user on a PC connected to the mass spectrometer. The fault is associated with an amber colour, indicating that it belongs to a category of fault that the user may attempt to rectify. The fault indication provides an indication of what is wrong "Source not fitted", and instructs the user to "check mark II source enclosure is fitted and cable is secured". In other embodiments, an instructional video or images may be provided to the user. In combination with this information displayed on the PC, as described above, some information may be displayed on the display panel 202 of the mass spectrometer unit e.g. indicating generally the area to which the fault relates.

Once the user has attempted to rectify the fault by following the instructions given, they may press/click on the resolve button 2000. When the mass spectrometer receives this indication that the user has performed the rectification steps, it performs a further check to see whether the fault has indeed been rectified. If the fault has been rectified, the mass spectrometer may pass to a ready status, being ready to acquire sample data once more.

If the fault has not been successfully rectified, the mass spectrometer may display another fault indication to the user, inviting them to try again to rectify the fault, together with the necessary instructions. If the fault remains unresolved after a predetermined number of allowed attempts by the user, the mass spectrometer escalates the fault to a category three fault, which may only be rectified by a service engineer.

Where a fault is detected which may only be rectified by an engineer i.e. a category three fault, whether or not escalated from a lower level fault, an indication similar to that of FIG. 17 may be given, indicating the nature of the fault, and this time instructing the user to call a service engineer. Instructions may be provided as to how to do this. The colour associated with the fault indication will be red, to indicate a more serious category of fault. It is envisaged that the spectrometer may be arranged to provide additional information to an engineer, when the engineer has presented necessary credentials.

Possible faults may be assigned a priority level, at least if they are faults which may be attempted to be rectified by a user. This will enable the spectrometer to determine which fault to indicate to the user first, where multiple faults occur simultaneously, which a user may attempt to rectify i.e. amber or category 2 faults. The faults may be presented simultaneously, in an ordered list, or sequentially, in order of priority. Multiple faults may be given the same priority if they are not expected to occur simultaneously. For example, in annex 1, priority 18 has three different warnings which are all related to the cone; no cone fitted, incorrect cone warning, either the 0.2 or 0.09 cone is fitted, which is not correct.

Only one of these warnings can occur at the same time, but they are all as likely to happen, and therefore have the same priority number.

The table below illustrates different status indications which may be issued according to various embodiments in connection with the backing pump (rough pump as referred to in the table).

In the illustrated examples, the following non-fault statuses may be used;

Ready—the instrument is ready to acquire sample data. No user intervention is required other than submission of a sample batch.

Getting ready—the instrument is currently undertaking operations after which it is expected to transition towards the ready state. No user intervention is required.

The following fault statuses may be used:

Ready Blocked—the instrument has a warning/problem that is stopping it being ready for sample acquisition (not other forms of data acquisition such as tuning), but that can be resolved by the user, and does not require a system level shutdown.

Error—the instrument has a serious issue that is not recoverable by the user or requires a system level shutdown to occur.

Warning—this is generated when there is a problem that can be corrected through user intervention.

Problem—this occurs when there is something wrong with an easily accessible part of the instrument.

Critical—this is the most significant item in a list provided e.g. the most important issue that needs to be resolved out of a list of several.

Other statuses which may be used:

Information—this is text that is provided to inform the user.

Failed—this means that the test has not achieved the required levels as specified.

In the table below, the nature of the status is indicated under the column heading "type". Here, where applicable for faults which may be attempted to be rectified by a user, it is stated which part of the mass spectrometer is affected ("status area"). This may be used in providing an indication as to which part(s) are affected by a fault on a display panel of the spectrometer as shown in FIG. 2C. In FIG. 2C, the left hand area includes general status indications for the spectrometer as a whole. These may indicate initialising, ready or running states of the spectrometer, which would be coloured green. The arrows show which is the current state. The attention state would be coloured amber indicating that the user may need to intervene. An arrow, arrow 3 then points to the right hand area of the display, to prompt the user to look at the icons indicating in more detail which part(s) of the spectrometer have a fault. Returning to the left hand side, the call service status is used when the user must call an engineer to resolve a fault, and is highlighted by a spanner icon. These would be coloured red. At the bottom is an icon which may be illuminated to prompt the user to hold the power button to turn the spectrometer off. This may be coloured green. On the right hand side are a series of icons, which may be illuminated to indicate the general part(s) of the spectrometer affected by a fault which the user may attempt to resolve. These would be coloured amber to attract the user's attention, and indicate a user rectifiable fault. In the embodiment of FIG. 2C, there are icons which may be illuminated to indicate faults with any one or ones of the source, cone, fluidics, electronics, setup, communications, refill, gas, vacuum or exhaust parts of the system.

The column "priority" indicates the priority assigned to a particular fault. The column "reason for generation" is self-explanatory. The column "resolution" indicates what action needs to be taken, by a user or service engineer (FSE), as applicable. The column "wording" indicates the instruction that is displayed to the user for category 2 faults. The column "outcome" indicates what action will be taken after the user has indicated that they have finished taking the requested action i.e. pressed the "resolve button". The outcome for category 3 faults is that the engineer will fix them.

In some cases, for category 2 faults, a resolution 2 and outcome 2 is given. These indicate the action that is to be taken by the user if the first attempt to fix the fault i.e. outcome 1, fails. Outcome 2 indicates the action that will be taken once resolution 2 has been performed.

It will be seen that each outcome involves retesting the relevant e.g. parameter, and determining whether it is now passes the test initially failed. If the test is passed, then the backing pump is returned to a non-fault state. If it is failed again, then another attempt to resolve the fault is initiated, until a predetermined number of attempts has been made, at which point the fault is escalated to category 3, requiring an engineer to be called.

Category 2 faults, which the user may attempt to fix, are shaded pale grey (corresponding to amber faults), and are labelled "cat 2". Category 3 faults, which require a service engineer to be called, are shaded darker grey (corresponding to red faults) and are labelled "cat 3". Other statuses are on a white background and labelled "status".

| Name | Type | Priority | Reason for generation | Resolution | Wording | Outcome |
|---|---|---|---|---|---|---|
| Rough Pumping (status) | Getting Ready | N/A | Instrument (firmware) has switched on the backing pump and the backing pressure is decreasing. (Turbo is off) | N/A | N/A | N/A |
| Rough Pumping Timeout Warning (Status area-vacuum) (Cat. 2) | Ready Blocked | 4 | The backing pressure does not reach the required 32 mbar within 3 minutes and a the firmware generates either Venting_BackingUnderange or Vented_BackingUnderange | Resolution 1: Customer is asked to check that the mains supply cable to the backing pump is fitted and switched on. Customer is also asked to check that the cable is fitted between the | Wording 1: "Check that the following cables are connected and switched on. Main cable is plugged into rough pump Pump cable is attached between | Outcome 1: Instrument will try and turn backing pump on again and see if backing pump gets to 32 mbar in 3 minutes. Passes - Ready |

-continued

| Name | Type | Priority | Reason for generation | Resolution | Wording | Outcome |
|---|---|---|---|---|---|---|
| | | | | instrument and the backing pump. Resolve button available to press once completed. Resolution 2: Customer is asked to check the oil level in the pump. If oil is not within the shown levels for operation or empty then top up with oil. Resolve button available to press once completed | instrument and rough pump." PICTURE TO BE INCLUDED OF CABLES Wording 2: "Check the oil level in pump" | Fails - Ready Blocked and goes to resolution 2 Outcome 2: Instrument will try and turn backing pump on again and see if backing pump gets to 32 mbar in 3 minutes. Either: Passes - Ready Fails (Issue remains) = Error - Rough Pumping Timeout Error |
| Rough Pumping Timeout Error (Cat. 3) | Error | N/A | Rough Pumping Timeout Warning resolutions have not fixed the problem and so an error has been generated. Unresolved Warning | FSE will investigate and once resolved issue will power cycle instrument | Call Service | Fixed |

The next table indicates illustrates different status indications which may be issued according to various embodiments in connection with the functional modules of the mass spectrometer, using the same terminology, shading, categories and headings.

| Name | Type | Priority | Reason for generation | Resolution | Wording | Outcome |
|---|---|---|---|---|---|---|
| Typhoon Module Booting (status) | Getting Ready | N/A | Typhoon modules turned on and time is less than 60 seconds since turned on | N/A | N/A | N/A |
| Module Warning [include which module/ modules failed in name] (Status area- electronics) (cat 2) | Ready Blocked | 7 | Any of the modules fail to communicate within 60 seconds. [Source HT, StepWave Ion Guide, Ion Guide 2, Pusher, Reflectron, Detector, ADC] | Resolution 1: Software will rediscover the network Resolution 2: Customer is asked to reboot the electronics | Wording 1: "Checking electronics units" Wording 2: "Electronics reboot required" PICTURE INCLUDED FOR ELECTRONICS REBOOT BUTTON LOCATION | Outcome 1: Passed - All modules present Fails - Still missing modules - move to resolution 2 Outcome 2: Passed - All modules present Fails - Still missing modules - ERROR |

-continued

| Name | Type | Priority | Reason for generation | Resolution | Wording | Outcome |
|---|---|---|---|---|---|---|
| Module Warning [include which module/ modules failed in name] (Status area-electronics) (cat 2) | Ready Blocked | 7 | Any of the modules disappear from the network at any given time during instrument operation | Resolution 1: Software will rediscover the network Resolution 2: Customer is asked to reboot the electronics | Wording 1: "Checking electronics units" Wording 2: "Electronics reboot required" PICTURE INCLUDED FOR ELECTRONICS REBOOT BUTTON LOCATION | Outcome 1: Passed - All modules present Fails - Still missing modules - move to resolution 2 Outcome 2: Passed - All modules present Fails - Still missing modules - ERROR |
| Typhoon Module Error (cat 3) | Error | N/A | Typhoon Module Warning not been resolved and error is generated | FSE will investigate. Fixes issue and goes to Getting Ready Power cycles instrument | Call Service | Fixed |
| Typhoon Module OK (status) | Passed | N/A | All typhoon modules communicating within the given time period | N/A | N/A | N/A |

Annex 1 illustrates similar status indications, using the same terminology, shading, categories and headings, in relation to other parts of the mass spectrometer. As above, in some cases, a resolution 2 and outcome 2, or even resolution 3 and outcome 3 and higher, is provided, for category 2 faults. These indicate the further steps that may be taken after an initial attempt to fix the fault has failed, for one or more cycles of attempt and retesting, until the fault is escalated to a category 3 fault, requiring input from an engineer.

Figure 18A:
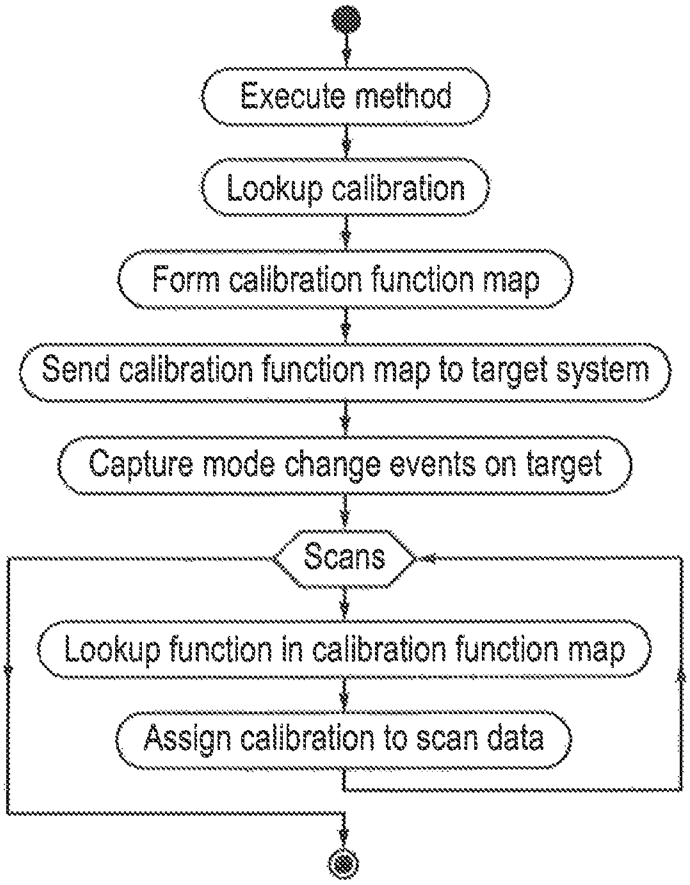
FIG. 18A is a flow chart illustrating how calibration of the mass spectrometer may be performed in accordance with certain embodiments.

FIG. 18A is a flow chart illustrating certain steps which may be carried out in calibrating the mass spectrometer.

As is known in the art, it is necessary to calibrate the mass spectrometer. It has been recognised that different calibration is appropriate to different operating conditions. Thus, in embodiments, different calibration functions are stored for the spectrometer in respect of different sets of operational conditions of the spectrometer. An operational condition is defined by the set of one or more operating parameters under which the spectrometer is operating. For example, different calibration functions may be stored for the spectrometer being in positive polarity running at a frequency mode of 1000, and another one in respect of a frequency mode of 2000. The frequency mode refers to the number of scans per second performed in the mass analyser. This may vary dependent upon the mass to charge ratio of ions, for example. In embodiments of the disclosure, the control system is arranged to automatically select an appropriate calibration function to be applied to the acquired data based on the detected operational condition of the spectrometer e.g. to calibrate the mass position determined for ions. The calibration function is selected from a library of stored calibration functions for different operational conditions.

Referring to FIG. 18A a calibration function map is populated within a metadata member of a schedule request. This is sent to the scheduler which adds it to a schedule. When the schedule is to be applied, a message is sent to hardware controller to apply the schedule data. Whilst applying the schedule data, a system.metaData event is fired, which is captured on the target. The target stores the embedded calibration function map. At the end of each scan, the datahub looks up the appropriate calibration for the given function and attaches it to the scan data.

Figure 18B:
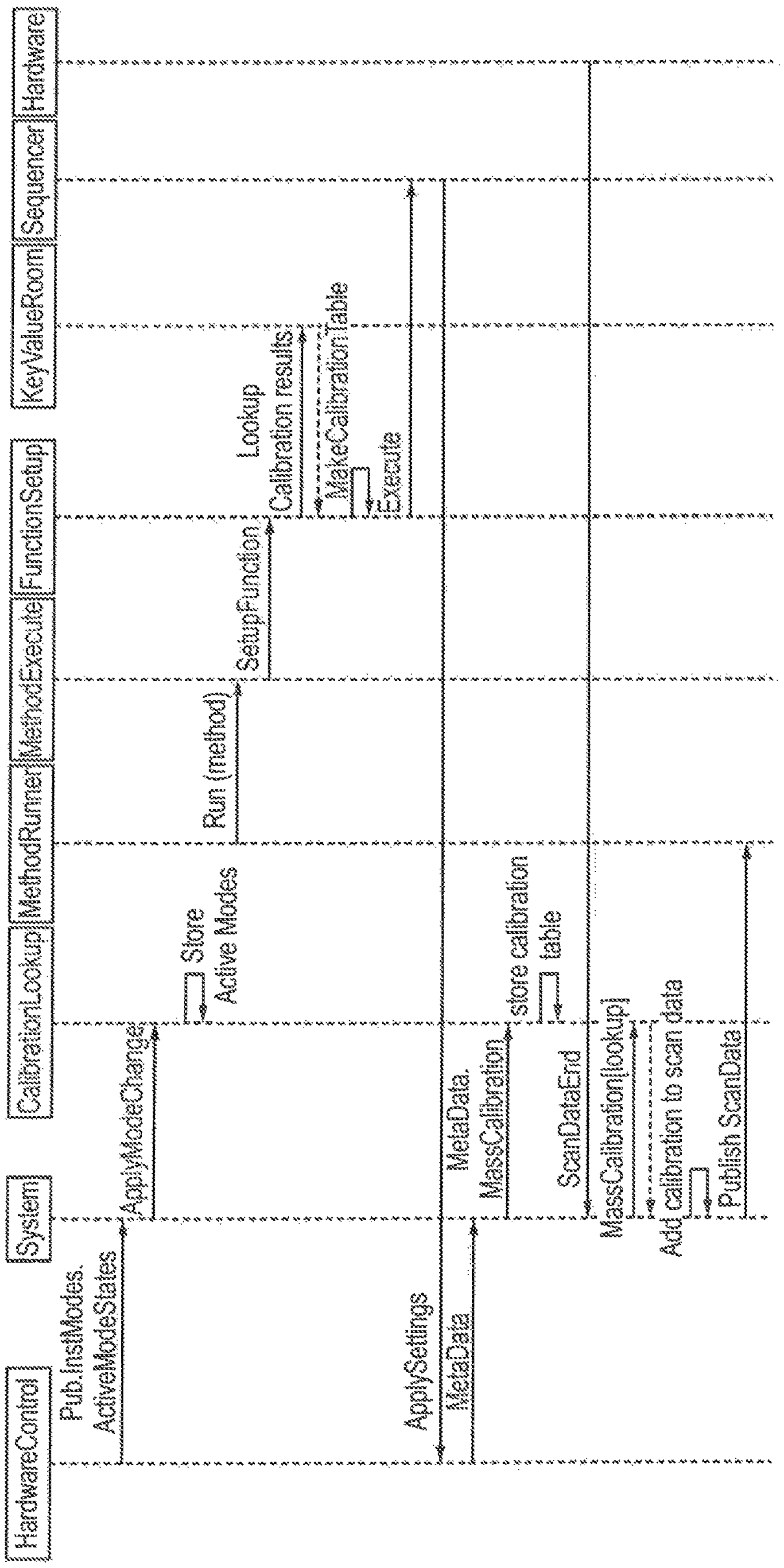
FIG. 18B illustrates the process in more detail.

FIG. 18B illustrates the process in more detail. The maths library mass calibration mapper is used when converting scan data to plot data.

Annex 2 includes tables indicating default operating parameters of the mass spectrometer in one exemplary embodiment. Table 1 is a set of definitions for Table 2, which gives the exemplary operating parameters.

Although the present invention has been described with reference to preferred embodiments, it will be understood by those skilled in the art that various changes in form and detail may be made without departing from the scope of the invention as set forth in the accompanying claims.

Annex 1

| Name | Type | Priority | Reason for generation | Resolution | Wording | Outcome |
|---|---|---|---|---|---|---|
| Rough Pumping (cat 1) | Getting Ready | N/A | Instrument (firmware) has switched on the backing pump and the backing pressure is decreasing. (Turbo is off) | N/A | N/A | N/A |
| Rough Pumping Timeout Warning (Status area = vacuum) (cat 2) | Ready Blocked | 4 | The backing pressure does not reach the required 32 mbar within 3 minutes and a the firmware generates either Venting_BackingUnderange or Vented_BackingUnderange | Resolution 1: Customer is asked to check that the mains supply cable to the backing pump is fitted and switched on. Customer is also asked to check that the cable is fitted between the instrument and the backing pump. Resolve button available to press once completed. Resolution 2: Customer is asked to check the oil level in the pump. If oil is not within the shown levels for operation or empty then top up with oil. Resolve button available to press once completed | Wording 1: "Check that the following cables are connected and switched on. Main cable is plugged into rough pump Pump cable is attached between instrument and rough pump." PICTURE TO BE INCLUDED OF CABLES Wording 2: "Check the oil level in pump" | Outcome 1: Instrument will try and turn backing pump on again and see if backing pump gets to 32 mbar in 3 minutes. Passes - Ready Fails - Ready Blocked and goes to resolution 2 Outcome 2: Instrument will try and turn backing pump on again and see if backing pump gets to 32 mbar in 3 minutes. Either: Passes - Ready Fails (Issue remains) = Error - Rough Pumping Timeout Error |
| Rough Pumping Timeout Error (cat 3) | Error | N/A | Rough Pumping Timeout Warning resolutions have not fixed the problem and so an error has been generated. Unresolved Warning | FSE will investigate and once resolved issue will power cycle instrument | Call Service | Fixed |
| Backing Pump Gauge Error (cat 3) | Error | N/A | Firmware will generate a Venting_BackingGaugeError or Vented_BackingGaugeError or Venting_BackingFilamentError or Vented_BackingFilamentError | FSE will investigate and once resolved issue will power cycle instrument | Call Service | Fixed |
| Backing Pressure Settling (status) | Getting Ready | N/A | Backing pressure checks are started 1 minute after the turbo speed turbo speed is ≥15%. This is when the backing pressure is not stable and still decreasing/increasing. | N/A | N/A | N/A |
| Blockage Warning (cat 2) (Status area = source) | Ready Blocked | 13 | One minute after the turbo speed is turbo speed is ≥15% the backing pressure read-back is lower | Customer requested to check aperture disc aperture disc for blockage | "Possible aperture disc blockage: Clean or replace aperture disc aperture disc by completing | If blocked then customer replaces aperture carrier. Passes - Ready/Getting |

-continued

| Annex 1 | | | | | | |
|---|---|---|---|---|---|---|
| Name | Type | Priority | Reason for generation | Resolution | Wording | Outcome |
| | | | than 1.45 mbar indicating a blockage over the aperture disc. | | aperture disc maintenance." | ready* Ready Blocked - Different vacuum warning generated Fail - Same fault seen after resolution - Error |
| Incorrect aperture disc fitted Warning (cat 2) (Status area = source) | Ready Blocked | 13 | One minute after the turbo speed is turbo speed is ≥15% the backing pressure read-back is between 0.8 and 1.0 mbar (0.09 mm aperture disc). This must take priority over blockage | Check if QDa aperture disc has been fitted or if blockage. | "Aperture disc blockage or incorrect aperture disc fitted: Clean or replace aperture disc by completing aperture disc maintenance" | Customer replaces aperture disc. Passes - Ready/Getting ready* Ready Blocked - Different vacuum warning generated Fail - Same fault seen after resolution - Error |
| Incorrect Aperture disc Error (cat 3) | Error | N/A | Incorrect Aperture Warning has not been resolved and so the error is generated. | FSE will investigate and once resolved issue will power cycle instrument | Call Service | Fixed |
| Aperture disc Missing Warning (cat 2) (Status area = source) | Ready Blocking | 18 | One minute after the turbo speed is turbo speed is ≥15% the backing pressure read-back is between 5.0 and 6.0 mbar which is equivalent to there being no aperture disc on the aperture carrier. | Customer requested to fit aperture disc to instrument | "No aperture disc fitted: Fit aperture disc by completing aperture disc maintenace" | Passes - Ready/Getting ready* Ready Blocking - Different vacuum warning generated Fail - Same fault seen after resolution - Error *Instrument pump down so will continue in getting ready state |
| Aperture Disc Error (cat 3) | Error | N/A | Aperture disc Missing Warning has not been resolved and so the error is generated. | FSE will investigate and once resolved issue will power cycle instrument | Call Service | Fixed |
| Backing Pressure High Warning (cat 2) (Status area = vacuum) | Ready Blocked | 9 | One minute after the turbo speed is turbo speed is ≥15% the backing pressure read-back is between 6 mbar and 10 mbar | Resolution 1: Customer requested to check the becking pump has oil, that there is no oil leak and that the oil return is not full of oil. Resolution 2: Check backing line and exhaust line connections are tight. | Wording 1: "Check oil level" Wording 2: "Check the following lines are secure: - Backing line to instrument - Backing Line to pump - Exhaust line to pump PICTURE INCLUDED SHOWING BACKING | Outcome 1: Oil leak on backing pump - switch off instrument and contact pump serive Oil return full - power off instrument and empty oil return back into pump Backing pump oil is empty - |

-continued

| Annex 1 | | | | | | |
|---|---|---|---|---|---|---|
| Name | Type | Priority | Reason for generation | Resolution | Wording | Outcome |
| | | | | | AND EXHAUST LINES CONNECTED TO INSTRUMENT AND PUMP | switch off instrument and fill backing pump with oil. Rebooted and all OK Ready Blocked - Different vacuum warning generated Fails = Generate Error Outcome 2: Rebooted and all OK Ready Blocked - Different vacuum warning generated Fails = Move to error |
| Backing Pressure High Error (cat 3) | Error | N/A | Backing Pressure High Warning is unresolved and error is generated. | FSE will investigate and once resolved issue will power cycle instrument | Call Service | Fixed |
| Unknown aperture disc Warning (cat 2) (Status area = vacuum) | Ready Blocked | 10 | One minute after the turbo speed is turbo speed is ≥15% the backing pressure read-back between 2 and 5 mbar | Customer requested to check aperture disc ALIGNMENT | "Possible aperture disc misalignment: Secure the aperture disc by completing aperture disc maintenance | Passes - Ready Ready Blocked - Different vacuum warning generated Fails = Generate Error |
| Unknown aperture disc Error (cat 3) | Error | N/A | Unknown aperture disc Warning has not be resolved and error is generated. | FSE will investigate and once resolved issue will power cycle instrument | Call Service | Fixed |
| Leaking Warning (Status area = vacuum) (cat 2) | Ready Blocked | 8 | If backing pressure is above 10 mbar then the firmware will initiate the vent sequence and sent the following Venting_BackingPressureHigh or Vented_BackingPressureHigh | Software initiates pump cycle | "Attempt system pump down" | Passes - Ready Ready Blocked - Different vacuum warning generated Fails = Generate Error |
| Leaking Error (cat 3) | Error | N/A | Leaking Warning has not be resolved and error is generated. | FSE will investigate and once resolved issue will power cycle instrument | Call Service | Fixed |
| Backing OK (status) | Passed | N/A | One minute after the turbo speed is turbo speed is ≥15% the backing pressure read-back is within the normal operating range 1.45-2.0 mbar. | N/A | N/A | N/A |
| Turbo Speeding Up (status) | Getting Ready | N/A | Turbo speed is between 1% and 79% | N/A | N/A | N/A |
| Turbo Pumping Timeout Warning (cat 2) | Ready Blocked | 5 | Turbo has not been able to reach 80% nominal speed within the 8 minutes, firmware | Software initiates pump cycle | "Attempt system pump down" | Passes - Ready Ready Blocked - Different |

-continued

Annex 1

| Name | Type | Priority | Reason for generation | Resolution | Wording | Outcome |
|---|---|---|---|---|---|---|
| (Status area = vacuum) | | | will imitate vent sequence and will generate Venting_TurboSpeedNotAchieved or Vented_TurboSpeedNotAchieved | | | vacuum warning generated Fails = Generate Error |
| Turbo Pumping Timeout Error (cat 3) | Error | N/A | Turbo Pumping Timeout Warning has not been resolved and so error was generated. | FSE will investigate and once resolved issue will power cycle instrument | Call Service | Fixed |
| Turbo Trip Warning (cat 2) (Status area = vacuum) | Ready Blocked | 5 | Turbo was above 80% and has now dropped to 80% or below the firmware will initiate the vent sequence and generate either Venting_TurboSpeedTrip or Vented_TurboSpeedTrip | Software initiates pump cycle | “Attempt system pump down” | Passes - Ready Ready Blocked - Different vacuum warning generated Fails = Generate Error |
| Turbo Trip Error (cat 3) | Error | N/A | Turbo Trip Warning has not been resolved and so error was generated. | FSE will investigate and once resolved issue will power cycle instrument | Call Service | Fixed |
| Turbo OK (status) | Passed | N/A | Turbo has reached 80% within the required 8 minutes | N/A | N/A | N/A |
| Pumping Down (status) | Getting Ready | N/A | Instrument ToF pressure is between $1 \times 10^{-4}$ and $1 \times 10^{-6}$ mbar | N/A | N/A | N/A |
| Pumping Down Error (cat 3) | Error | N/A | ToF pressure does not reach required vacuum pressure within 12 hours (TBD) | FSE will investigate. Fixes issue and goes to Getting Ready Power cycles instrument | Call Service | Fixed |
| ToF Pressure OK (status) | Passed | N/A | ToF pressure is at $1 \times 10^{-6}$ or below (TBD) | N/A | N/A | N/A |
| ToF Gauge Error (cat 3) | Error | N/A | Firmware has received an error from the ToF gauge and so will vent the instrument. Firmware will send Readback/event (ToF Gauge Error) to software and then software can generate this error. | FSE will investigate. Fixes issue and goes to Getting Ready Power cycles instrument | Call Service | Fixed |
| Tof Over Pressure Warning (Status area = vacuum) (cat 2) | Ready Blocked | 16 | Firmware has indicated a ToF over pressure state has occurred. Over-pressure or Over-Pressure with Source Interlock. Please note voltages that are allowed on will be controlled by firmware. | Software checks that the turbo speed is above 98% and that the backing pressure is at optimum value. | “Waiting for system to re-equilibrate” | Turbo and backing values Ok commence four hour wait period (pressure needs to reach ≥7 × 10−7 mbar before can continue using instrument). Ready Blocked - Different backing vacuum warning generated |

-continued

| Annex 1 | | | | | | |
|---|---|---|---|---|---|---|
| Name | Type | Priority | Reason for generation | Resolution | Wording | Outcome |
| | | | | | | Fails - Backing pressure or turbo speed not correct - Tof Pressure Error Fails - over four hours waiting and pressure is still not correct - Error |
| Tof Over Pressure Error (cat 3) | Error | N/A | Tof Over Pressure Warning has not been resolved or conditions not met in resolution 1 (backing pressure and turbo speed) and so error generated | FSE will investigate. Fixes issue and goes to Getting Ready Power cycles instrument | Call Service | Fixed |
| Typhoon Module Booting (status) | Getting Ready | N/A | Typhoon modules turned on and time is less than 60 seconds since turned on | N/A | N/A | N/A |
| Module Warning [include which module/ modules failed in name] (Status area = electronics) (cat 2) | Ready Blocked | 7 | Any of the modules fail to communicate within 60 seconds. [Source HT, StepWave Ion Guide, Ion Guide 2, Pusher, Reflectron, Detector, ADC] | Resolution 1: Software will rediscover the network Resolution 2: Customer is asked to reboot the electronics | Wording 1: "Checking electronics units" Wording 2: "Electronics reboot required" PICTURE INCLUDED FOR ELECTRONICS REBOOT BUTTON LOCATION | Outcome 1: Passed - All modules present Fails - Still missing modules - move to resolution 2 Outcome 2: Passed - All modules present Fails - Still missing modules - ERROR |
| Module Warning [include which module/ modules failed in name] (Status area = electronics) (cat 2) | Ready Blocked | 7 | Any of the modules disappear from the network at any given time during instrument operation | Resolution 1: Software will rediscover the network Resolution 2: Customer is asked to reboot the electronics | Wording 1: "Checking electronics units" Wording 2: "Electronics reboot required" PICTURE INCLUDED FOR ELECTRONICS REBOOT BUTTON LOCATION | Outcome 1: Passed - All modules present Fails - Still missing modules - move to resolution 2 Outcome 2: Passed - All modules present Fails - Still missing modules - ERROR |
| Typhoon Module Error (cat 3) | Error | N/A | Typhoon Module Warning not been resolved and error is generated | FSE will investigate. Fixes issue and goes to Getting Ready Power cycles instrument | Call Service | Fixed |
| Typhoon Module OK (status) | Passed | N/A | All typhoon modules communicating within the given time period | N/A | N/A | N/A |

-continued

Annex 1

| Name | Type | Priority | Reason for generation | Resolution | Wording | Outcome |
|---|---|---|---|---|---|---|
| Readback Warning (cat 2) | Warning | N/A | This is generated when no readbacks are provided to the software. | Customer asked to reboot electronics | "Recover Electronics" | Fixed - Ready Fails (issue remains) = Error - Readback Error |
| Readback Error (cat 3) | Error | N/A | This is generated when the wanring has not been resolved. | FSE will investigate and once resolved issue will power cycle instrument | Call Service | Fixed |
| ToF Voltage Settling (status) | Getting Ready | N/A | ToF voltage is fluctuating but has not reached time limit of 5 minutes. | N/A | N/A | N/A |
| ToF Voltage Settled Timeout Error (cat 3) | Error | N/A | ToF voltage has not stabilised within set tolerance to required voltage within allocated time 5 minutes. | FSE will investigate. Fixes issue and goes to Getting Ready Power cycles instrument | Call Service | Fixed |
| ToF Voltage Settled (status) | Passed | N/A | ToF voltage has stabilised at required voltage within 5 minutes. | N/A | N/A | N/A |
| Reflectron Voltage Settling (status) | Getting Ready | N/A | Reflectron voltage is fluctuating but has not reached time limit of 5 minutes. | N/A | N/A | N/A |
| Reflectron Voltage Error (cat 3) | Error | N/A | Reflectron voltage is fluctuating but has reached time limit of 5 minutes. | FSE will investigate. Fixes issue and goes to Getting ReadyPower cycles instrument | Call Service | Fixed |
| Reflectron Voltage Settled (status) | Passed | N/A | Reflectron voltage has stabilised at required voltage within 5 minutes. | N/A | N/A | N/A |
| Detector Voltage Settling (status) | Getting Ready | N/A | Detector voltage is fluctuating but has not reached time limit of 5 minutes. | N/A | N/A | N/A |
| Detector Voltage Error (cat 3) | Error | N/A | Detector voltage is fluctuating but has reached time limit of 5 minutes. | FSE will investigate. Fixes issue and goes to Getting Ready Power cycles instrument | Call Service | Fixed |
| Detector Voltage Settled (status) | Passed | N/A | Detector voltage has stabilised at required voltage within 5 minutes. | N/A | N/A | N/A |
| Voltage Readback Error (cat 3) | Error | N/A | For all voltages (except ToF, Detector and Reflectron) the readback is not within the tolerance stated for the requested voltage. The error should include the name of the voltage(s) that have failed. | FSE will investigate. Fixes issue and goes to Getting Ready Power cycles instrument | Call Service | Fixed |
| Voltage Readback OK (status) | Passed | N/A | For all voltages (except ToF, Detector and Reflectron) the readback is within the tolerance stated for the requested voltage | N/A | N/A | N/A |

-continued

Annex 1

| Name | Type | Priority | Reason for generation | Resolution | Wording | Outcome |
|---|---|---|---|---|---|---|
| Polarity Voltage Settling (status) | Getting Ready | N/A | All or any of the other voltages (except Tof, Reflectron and Detector) are fluctuating in the correct polarity but has not reached time limit of 5 minutes. | N/A | N/A | N/A |
| Polarity Voltage Error (cat 3) | Error | N/A | All or any of the other voltages (except Tof, Reflectron and Detector) are fluctuating in the correct polarity but has not reached time limit of 5 minutes. | FSE will investigate. Fixes issue and goes to Getting Ready Power cycles instrument | Call Service | Fixed |
| Polarity Voltage Settled (status) | Passed | N/A | All other voltages have stabilised at required voltage and polarity within 5 minutes. | N/A | N/A | N/A |
| ToF Current Checking (status) | Getting Ready | N/A | Monitoring the ToF Current readback during the first thirty minutes when ToF voltage is turned on ToF current fluctuating but has not reached time limit | N/A | N/A | N/A |
| ToF Current Error (cat 3) | Error | N/A | During the first thirty minutes when ToF voltage is turned on, the ToF current fluctuates outside the limits (TBD) on more than TBD occasions | FSE will investigate. Fixes issue and goes to Getting Ready Power cycles instrument | Call Service | Fixed |
| ToF Current OK (status) | Passed | N/A | During the first thirty minutes when ToF voltage is turned on, the ToF current remains within the limits or only fluctuates out of the limits by TBD occasions | N/A | N/A | N/A |
| Reflectron Current Checking (status) | Getting Ready | N/A | Monitoring the Reflectron Current readback during the first thirty minutes when ToF voltage is turned on - ToF current fluctuating but has not reached time limit | N/A | N/A | N/A |
| Reflectron Current Error (cat 3) | Error | N/A | During the first thirty minutes when Reflectron voltage is turned on, the Reflectron current fluctuates outside the limits (TBD) on more than TBD occasions | FSE will investigate. Fixes issue and goes to Getting Ready Power cycles instrument | Call Service | Fixed |
| Reflectron Current OK (status) | Passed | N/A | During the first thirty minutes when Reflectron voltage is turned on, the Reflectron current | N/A | N/A | N/A |

-continued

Annex 1

| Name | Type | Priority | Reason for generation | Resolution | Wording | Outcome |
|---|---|---|---|---|---|---|
| | | | remains within the limits or only fluctuates out of the limits by TBD occasions | | | |
| Source Warning (Status area = source) (cat 2) | Ready Blocked | 11 | No source enclosure fitted | Customer asked to check is source enclosure fitted and cable connected to instrument. | "Check source enclosure is fitted and cable is secured" INCLUDE PICTURE | Fixed - Ready Fails (issue remains) = Error - Source Error |
| Source Error (cat 3) | Error | N/A | Source Warning has not been resolved and error is generated | FSE will investigate. Fixes issue and goes to Getting Ready Power cycles instrument | Call Service | Fixed |
| Source OK (status) | Passed | N/A | Source enclosure fitted | N/A | N/A | N/A |
| Source Door Warning (cat 2) (Status area = source) | Ready Blocked | 19 | Source interlock shows source door is open | Source door closed | "Close source door" | Fixed - Ready Fails (issue remains) = Error - Source Door Error |
| Source Door Error (cat 3) | Error | N/A | Source Door Warning | Source interlock shows source cover is open | Call Service | Fixed |
| Source Door OK (status) | Passed | N/A | Source interlock shows door closed | N/A | N/A | N/A |
| Source Temperature Settling (status) | Getting Ready | N/A | Source Temperature is fluctuating but time has not elapsed yet. Please note that source heater is NOT turned on until reach Vac OK so software should start timer then | N/A | N/A | N/A |
| Source Temperature Timeout (cat 3) | Error | N/A | Source temperature has not stabilised to required value (at least −5° C. on requested value, or up to +40° C. above requested) within the allocated time (ten minutes - TBD) | FSE will investigate. Fixes issue and goes to Getting Ready Power cycles instrument | Call Service | Fixed |
| Source Temperature Settled (status) | Passed | N/A | Source Temperature is stable at the required temperature | N/A | N/A | N/A |
| Source Heater Disconnected Error (cat 3) | Error | N/A | Source heater is not connected and so can not heat | FSE will investigate. Fixes issue and goes to Getting Ready Power cycles instrument | Call Service | Fixed |
| Source Heater Connected (status) | Passed | N/A | Source heater is connected and source is heating | N/A | N/A | N/A |
| Desolvation Temperature Settling (status) | Getting Ready | N/A | Desolvation temperature is fluctuating but time has not yet elapsed. | N/A | N/A | N/A |

-continued

| Annex 1 | | | | | | |
|---|---|---|---|---|---|---|
| Name | Type | Priority | Reason for generation | Resolution | Wording | Outcome |
| | | | Please note that Desolvation heater is not turned on until the instrument gas is tuned on and in operate. | | | |
| Desolvation Temperature Settling Failed (cat 3) | Error | N/A | Desolvation temperature has not stabilised to required value (±5° C. on requested value) within the allocated time (five minutes - TBD) | FSE will investigate. Fixes issue and goes to Getting Ready Power cycles instrument | Call Service | Fixed |
| Desolvation Temperature Settled (status) | Passed | N/A | Desolvation temperature has settled within the allocated time | N/A | N/A | N/A |
| Nitrogen Gas Failure Warning (cat 2) (Status area = gas) | Ready Blocked | 3 | Gas Fail State Initiated by Firmware- Gas Pressure is below 4 Bar | Request customer to check nitrogen pressure inlet is at 7 Bar | "Check Nitrogen pressure is within the range 6.5 and 7 Bar" | Fixed - Ready Fails (issue remains) = Error - Nitrogen Gas Failure |
| Nitrogen Gas Warning (Status area = gas) (cat 2) | Ready Blocked | 3 | Nitrogen gas pressure is within the range 6.5-7.5 Bar. Firmware will send this information. | Request customer to check nitrogen pressure inlet is at 7 Bar | "Check Nitrogen pressure is within the range 6.5 and 7 Bar" | Fixed - Ready Fails (issue remains) = Error - Nitrogen Gas Failure |
| Nitrogen Gas Failed (cat 3) | Error | N/A | Nitrogen Gas Warning | Gas Fail State initiated - Gas pressure is below 4 Bar | Call Service | Fixed |
| Nitrogen Gas OK (status) | Passed | N/A | Gas fail state NOT initiated | N/A | N/A | N/A |
| Source Pressure Test Running (status) | Getting Ready | N/A | Source Pressure test running | N/A | N/A | N/A |
| Source Pressure Test Overridden (status) | Informat ion | N/A | Instrument has failed the source pressure test and the over ride has been selected. [Warning message included] | Customer needs to run Source Pressure Test | N/A | Fixed - Ready |
| Low API Gas Pressure Warning (cat 2) (Status area = gas) | Ready Blocked | 3 | The Check pressure switch has determined the pressure is below 4 Bar for longer than 1 second This is generated when Firmware creates an event for Source Pressure Test Failed - Low API Gas Pressure | Request customer to check nitrogen pressure inlet is at 7 Bar | "Check Nitrogen pressure is within the range 6.5 and 7 Bar" | Fixed - Ready Fails (issue remains) = Error - Nitrogen Gas Failure |
| Low API Gas Pressure Error (cat 3) | Error | N/A | The Low API Gas Pressure Warning has not been resolved and so this error is generated | Request customer to check nitrogen pressure inlet is at 7 Bar | Call Service | Fixed |

-continued

| Annex 1 | | | | | | |
|---|---|---|---|---|---|---|
| Name | Type | Priority | Reason for generation | Resolution | Wording | Outcome |
| Exhaust Pressure Too High Warning (cat 2) (Status area = exhaust) | Ready Blocked | 12 | Exhaust pressure is too high with exhaust valve open LC flow to wate. This is generated when Firmware creates an event for one of the following: Warning: Possible Exhaust Problem Source pressure Test Failed - Exhaust Pressure too high | Resolution 1: Customer asked to check for restrictions in tubing between instrument and waste bottle Resolution 2: Customer then asked to check for restrictions in tubing between waste bottle and exhaust Resolution 3: Cutstomer asked to check exhaust is at atmospheirc pressure or below. | Wording 1: "Ensure no bends or folds in tubing. If bend or fold present replace tubing"PICTURE INCLUDED SHOWING INSTRUMENT AND SOURCE WASTE BOTTLE WITH TUBING INDICATED Wording 2: "Ensure no bends or folds in tubing. If bends or folds present replace tubing"PICTURE INCLUDED SHOWING INSTRUMENT AND SOURCE WASTE BOTTLE AND EXHAUST WITH TUBING INDICATED Wording 3: "Check the lab exhaust system is marinating the exhaust outlet at or below atmospheric pressure." | Outcome 1: Fixed - Ready Fails - Ready Blocked and goes to resolution 2Over-ride Option (must present warning that over-ride is selected at start of each acquisition) Outcome 2: Fixed - Ready Fail - Ready Blocked and goes to resolution 3Over-ride Option (must present warning that over-ride is selected at start of each acquisition) Outcome 3: Fixed - Ready Fails (issue remains) = Error - SPT Failed Exhaust HighOver-ride Option (must present warning that over-ride is selected at start of each acquisition) |
| Exhaust Pressure Too High Failure (cat 3) | Error | N/A | Exhaust Pressure Too High Warning not resolved and error generated | FSE will investigate. Fixes issue and goes to Getting Ready Power cycles instrument | Call Service | Fixed |
| Source Leak Warning (cat 2) (Status area = source) | Ready Blocked | 12 | Leaky source enclosure - not reaching correct pressure in enclosure - LC Flow to waste. This is generated when Firmware creates an event for one of the following: Warning: Possible Source Leak Source pressure Test Failed - Source Leak | Resolution 1: Customer asked to check probe fitted correctly Resolution 2: Remove and reseat source enclosure Resolution 3: Replace source enclosure O-ring | Wording 1: "Ensure probe is fitted correctly" PICTURE INCLUDED SHOWING PROBE FITTED CORRECTLY Wording 2: "Remove and refit the source enclosure" | Outcome 1: Fixed - Ready Fails - Ready Blocked and goes to resolution 2 Over-ride Option (must present warning that over-ride is selected at start of each acquisition) |

-continued

Annex 1

| Name | Type | Priority | Reason for generation | Resolution | Wording | Outcome |
|---|---|---|---|---|---|---|
| | | | | | Wording 3: "Replace source enclosure o-ring" | Outcome2: Fixed- Ready Fails- Ready blocked and goes to resolution 3 Over-ride Option (must present warning that override is selected at start of each acquisition) Outcome 3: Fixed- Ready Fails (issue remains) = Error- SPT Failed Source Leak Over-ride Option (must present warning that over-ride is selected at start of each acquisition) |
| Source Leak Failure (cat 3) | Error | N/A | Source Leak Warning not resolved and error generated | FSE will investigate. Fixes issue and goes to Getting Ready Power cycles instrument | Call Service | Fixed |
| Source Pressure Test OK (status) | Passed | N/A | Source Pressure Test passed | N/A | N/A | |
| Fluidics Communications Warning (cat 2) (Status area = electronics) | Ready Blocked | 14 | Fluidics control board not communicating | Resolution 1: Customer asked to reboot electronics Resolution 2: | Wording 1: "Recover Fluidics" Wording 2: "Electronics reboot required" PICTURE INCLUDED FOR ELECTRONICS REBOOT BUTTON LOCATION | Outcome 1: Fixed - Ready Fails - Ready Blocked and goes to resolution 2 Outcome 2: Fixed- Ready Fails- Go to error state |
| Fluidics Communication Error (cat 3) | Error | N/A | Fluidics control board not communicating | FSE will investigate. Fixes issue and goes to Getting Ready Power cycles instrument | Call Service | Fixed |
| Leak Detector Sensor Warning (cat 2) (Status area = fluidics) | Ready Blocked | 2 | Leak senor has detected a leak. Stop flow LC | Resolution 1: Check for liquid in drip tray - dry sensor if leak present Resolution 2: Replace leak sensor | Wording 1: "Check drip tray for fluid. If fluid present then check for leaks. - Replace tubing and | Outcome 1: Fixed - Ready Fails - Ready Blocked and goes to resolution 2 |

-continued

| Annex 1 | | | | | | |
|---|---|---|---|---|---|---|
| Name | Type | Priority | Reason for generation | Resolution | Wording | Outcome |
| | | | | | connections- Clean up liquid and wait for sensor to dry" Wording 2: "Replace Leak sensor.- Open door- Disconnect leak sensor.- Fit new leak sensor - Close source door"PICTURE INCLUDED TO SHOW LOCATION OF LEAK SENSOR | Outcome 2: Fixed - Ready Fails (issue remains) = Error - Leak Detector Sensor |
| Leak Detector Sensor - Failed (cat 3) | Error | N/A | Leak Detector Sensor Warning unresolved and error generated | FSE will investigate. Fixes issue and goes to Getting Ready Power cycles instrument | Call Service | Fixed |
| Leak Detector Sensor OK (status) | Passed | N/A | No leak detected from sensor | N/A | N/A | N/A |
| Positive Not Set (status) | Information | N/A | Instrument has not been setup for positive ion mode | Once customer tries to run a positive ion mode experiment this will change to a warning | N/A | Ready Blocked |
| Positive Mode Warning (cat 2) (Status area = setup) | Ready Blocked | 25 | Customer has selected to run a positive ion mode method and the instrument is not set up for positive ion mode | Customer selects positive instrument setup to be carried out Please note only a warning IF customer has selected to run a sample in this mode. Otherwise information | "Perform positive ionisation mode instrument set-up" | Failures during set-up will generate own warnings/errors |
| Negative Not Set (status) | Information | N/A | Instrument has not been setup for negative ion mode | Once customer tries to run a negative ion mode experiment this will change to a warning | N/A | Ready Blocked |
| Negative Mode Warning (cat 2) (Status area = setup) | Ready Blocked | 25 | Customer has selected to run a negative ion mode method and the instrument is not set up for negative ion mode | Customer selects negative instrument setup to be carried out Please note only a warning IF customer has selected to run a sample in this mode. Otherwise information | "Perform negative ionisation mode instrument set-up" | Failures during set-up will generate own warnings/errors |
| Fluidics Check Warning (cat 2) (Status area = setup) | Ready Blocked | 14 | The instrument has not detected a beam in the any of the setup procedures | Resolution 1: Customer asked to check that sample is present. Resolution 2: Customer asked to check flow from tubing to source enclosure. Once probe | Wording 1: "Check lock-mass, wash and calibrant solutions are present" Wording 2: "Check flow to probe - Open door | Outcome 1: Software must Purge Fluidics before retrying Fixed - Ready Fails - Ready |

-continued

Annex 1

| Name | Type | Priority | Reason for generation | Resolution | Wording | Outcome |
|---|---|---|---|---|---|---|
| | | | | removed and ready to check customer will press button and software will tell fluidics to flow for 30 seconds. | and remove probe - Check flow to probe by selecting button If no flow present check for leaks" | Blocked and goes to resolution 2 Outcome 2: Fixed - Ready Fails - Generate Error |
| Fluidics Check Error (cat 3) | Error | N/A | Fluidics Check Warning has not resolved and error is generated | FSE will investigate. Fixes issue and goes to Getting Ready Power cycles instrument | Call Service | Fixed |
| Beam Detection Error (cat 3) | Error | N/A | Detector reached maximum output voltage and still no beam present during beam setup | FSE will investigate. Fixes issue and goes to Getting Ready Power cycles instrument | Call Service | Fixed |
| Beam Check Resolution Error (cat 3) | Error | N/A | Third time that the software has attempted to reach the required resolution and peak shape requirements outlined in set up procedure for beam check | FSE will investigate. Fixes issue and goes to Getting Ready Power cycles instrument | Call Service | Fixed |
| Beam Check Passed (status) | Passed | N/A | Beam Check procedure completed and passed | N/A | N/A | N/A |
| Average Ion Area Failure Warning (cat 2) (Status area = setup) | Ready Blocked | 22 | Detector voltage and/or average ion area could not be set | Customer or instrument automatically clears ADC settings and recommence Instrument Set-up | "Attempt instrument setup" | Fixed - Ready Fails (issue remains) = Error - AIA Failure |
| Average Ion Area Failure Error (cat 3) | Error | N/A | AIA Failure Warning has not been resolved and error is generated | FSE will investigate. Fixes issue and goes to Getting Ready Power cycles instrument | Call Service | Fixed |
| Low Intensity Signal Warning (cat 2) (Status area = setup) | Ready Blocked | 21 | Beam unstable/ Insufficient ions/ Beam intesity too few ions | Resolution 1: Customer check sample present if not enough ions is the issue Resolution 2: Customer asked to replace sample if not enough ions is the issue Resolution 3: Customer asked to check for leaks Resolution 4: Customer asked to replace capillary if not enough ions is the issue | Wording 1: "Check lockmass, calibrant and wash solutions are present" Wording 2: "Replace with fresh Waters approved sample" Wording 3: "Check for leaks" Wording 4: "Replace probe- Unscrew the line for the probe from the Divert valve. Unscrew the probe from | Outcome 1: Software must Purge Fluidics before retrying Fixed - Ready Fails - Ready Blocked and goes to resolution 2 Outcome 2: Fixed - Ready Fails - Ready Blocked and goes to resolution 3 Outcome 3: Fixed - Ready Fails - |

-continued

Annex 1

| Name | Type | Priority | Reason for generation | Resolution | Wording | Outcome |
|---|---|---|---|---|---|---|
| | | | | | the source enclosure and dispose of the probe Carefully insert the probe into the inlet atop the source enclosure and tighten probe fitting until it clicks Secure the line of the probe to the divert valve.” INCLUDE PICTURE OF PROBE FITTINGS | Ready Blocked and goes to resolution 4 Outcome 4: Fixed - Ready Fails (issue remains) = Error- Beam Stability - Not enough ions |
| Low Intensity Signal Error (cat 3) | Error | N/A | Beam Stability - Few Ions Warning is not resolved and error is generated | FSE will investigate. Fixes issue and goes to Getting Ready Power cycles instrument | Call Service | Fixed |
| Beam Unstable Warning (cat 2) (Status area = setup) | Ready Blocked | 20 | Beam unstable/ Beam intensity too high | Resolution 1: Customer or instrument repurge fluidics Resolution 2: Customer asked to check peek tubing is fitted correctly Resolution 3: Customer asked to replace probe | Wording 1: “Purge Fluidics” Wording 2: “Check Peek tubing fittings for leaks” INCLUDE PICTURE OF DIVERT VALVE SHOWING ALL CONNECTIONS Wording 3: “Replace probe Unscrew the line for the probe from the Divert valve. Unscrew the probe from the source enclosure and dispose of probe Carefully insert the probe into the inlet atop the source enclosure and tighten probe fitting until it clicks. Secure the line of the probe to the divert valve.” INCLUDE PICTURE OF PROBE FITTING | Outcome 1: Fixed - Ready Fails - Ready Blocked and goes to resolution 2 Outcome 2: Fixed - Ready Fails - Ready Blocked and goes to resolution 3 Outcome 3: Fixed - Ready Fails (issue remains) = Error - Beam Stability - Beam unstable |

-continued

| Annex 1 | | | | | | |
|---|---|---|---|---|---|---|
| Name | Type | Priority | Reason for generation | Resolution | Wording | Outcome |
| Beam Unstable Error (cat 3) | Error | N/A | Beam Stability - Beam Unstable Warning not resolved and error is generated | FSE will investigate. Fixes issue and goes to Getting Ready Power cycles instrument | Call Service | Fixed |
| High Intensity Signal Warning (cat 2) (Status area = setup) | Ready Blocked | 21 | Beam unstable/ Beam intensity too high | Resolution 1: Customer requested change to purge fluidics. Resolution 2: Customer requested change to preferred Waters sample | Wording 1: “Purge Fluidics” Wording 2: “Replace with Waters approved sample” | Outcome 1: Fixed - Ready Fails - Ready Blocked and goes to resolution 2 Outcome 2: Software must Purge Fluidics before retrying Fixed - Ready Fails (issue remains) = Error - Beam Stability - Intensity High |
| High Intensity Signal Error (cat 3) | Error | N/A | Beam Stability - Intensity High Warning not resolved and error is generated | FSE will investigate. Fixes issue and goes to Getting Ready Power cycles instrument | Call Service | Fixed |
| Detector Setup Positive Passed (status) | Passed | N/A | Detector setup completed and passed in positive ion mode | N/A | N/A | N/A |
| Detector Setup Negative Passed (status) | Passed | N/A | Detector setup completed and passed in negative ion mode | N/A | N/A | N/A |
| Beam Check Auto-tune Resolution Error (cat 3) | Error | N/A | Third time that the software has attempted to reach the required resolution and peak shape requirements outlined in set up procedure for auto-tune | FSE will investigate. Fixes issue and goes to Getting Ready Power cycles instrument | Call Service | Fixed |
| Beam Check Auto-tune Sensitivity Error (cat 3) | Error | N/A | Third time that the software has attempted to reach the required sensitivity requirements outlined in set up procedure for auto-tune | FSE will investigate. Fixes issue and goes to Getting Ready Power cycles instrument | Call Service | Fixed |
| Auto tune Setup Passed (status) | Passed | N/A | Auto tune procedure completed and passed | N/A | N/A | N/A |
| Calibration Failure Warning (Status area = setup) (cat 2) | Ready Blocked | 23 | Calibration Failed to reach required ppm | Resolution 1: Customer asked to check correct sample present Resolution 2: Customer asked to check for leaks | Wording 1: “Check calibration sample present” Wording 2: “Check for | Outcome 1: Software must Purge Fluidics before retrying Fixed - Ready |

-continued

| Annex 1 | | | | | | |
|---|---|---|---|---|---|---|
| Name | Type | Priority | Reason for generation | Resolution | Wording | Outcome |
| | | | | Resolution 3: Software will immediately return to the Auto-tune section and re-run this test. | leaks" Wording 3: "Attempt instrument setup" | Fails - Ready Blocked and goes to resolution 2 Outcome 2: Fixed - Ready Fails - Ready Blocked and goes to resolution 3 Outcome 3: Fixed - Ready Fails (issue remains) = Error - Calibration Failure |
| Calibration Failure Warning Error (cat 3) | Error | N/A | Calibration Failure Warning not resolved and error is generated | FSE will investigate. Fixes issue and goes to Getting Ready Power cycles instrument | Call Service | Fixed |
| Calibration Passed (status) | Passed | N/A | Calibration procedure completed and passed | N/A | N/A | N/A |
| Low Mass Positive Calibration Absent (status) | Informat ion | N/A | Instrument has not been setup for low mass positive mode | Once customer tries to run a low mass mode experiment this will change to a warning | N/A | Ready Blocked |
| Low Mass Positive Calibration Warning (Status area = setup) (cat 2) | Ready Blocked | 25 | Customer has selected to run a positive ion low mass experiment and the positive ion low mass calibration has not been carried out. | Customer must carryout this low mass calibration. | "Perform positive ionisation low mass calibration" | Customer caries out low mass calibration manually and instrument moves to Getting Ready. Same errors generated for high or low mass calibration. |
| Low Mass Positive Calibration (status) | Passed | N/A | Calibration procedure completed and passed | N/A | N/A | N/A |
| High Mass Positive Calibration Absent (status) | Informat ion | N/A | Instrument has not been setup for high mass positive mode | Once customer tries to run a high mass mode experiment this will change to a warning | N/A | Ready Blocked |
| High Mass Positive Calibration Warning (cat 2) (Status area = setup) | Ready Blocked | 25 | Customer has selected to run a positive ion high mass experiment and the positive ion high mass calibration has not been carried out. | Customer must carryout this high mass calibration. | "Perform positive ionisation high mass calibration" | Customer caries out high mass calibration manually and instrument moves to Getting Ready. Same errors generated for high or high mass calibration. |

-continued

| Annex 1 | | | | | | |
|---|---|---|---|---|---|---|
| Name | Type | Priority | Reason for generation | Resolution | Wording | Outcome |
| high Mass Positive Calibration (status) | Passed | N/A | Calibration procedure completed and passed | N/A | N/A | N/A |
| Low Mass Negative Calibration Absent (status) | Informat ion | N/A | Instrument has not been setup for low mass negative mode | Once customer tries to run a low mass mode experiment this will change to a warning | N/A | Ready Blocked |
| Low Mass Negative Calibration Warning (cat 2) (Status area = setup) | Ready Blocked | 25 | Customer has selected to run a negative ion low mass experiment and the negative ion low mass calibration has not been carried out. | Customer must carryout this low mass calibration. | "Perform negative ionisation low mass calibration" | Customer caries out low mass calibration manually and instrument moves to Getting Ready. Same errors generated for high or low mass calibration. |
| Low Mass negative Calibration (status) | Passed | N/A | Calibration procedure completed and passed | N/A | N/A | N/A |
| High Mass Negative Calibration Absent (status) | Informat ion | N/A | Instrument has not been setup for negative high mass mode | Once customer tries to run a high mass mode experiment this will change to a warning | N/A | Ready Blocked |
| High Mass Negative Calibration Warning (cat 2) (Status area = setup) | Ready Blocked | 25 | Customer has selected to run a negative ion high mass experiment and the negative ion high mass calibration has not been carried out. | Customer must carryout this high mass calibration - customer will be requested to change the calibration solution to TBD for high mass calibration. | "Perform negative ionisation high mass calibration" | Customer caries out high mass calibration manually and instrument moves to Getting Ready. Same errors generated for high mass positive calibration as standard calibration |
| High Mass Negative Calibration (status) | Passed | N/A | Calibration procedure completed and passed | N/A | N/A | N/A |
| Purging Fluidics (status) | Getting Ready | N/A | Fluidics are carrying out a purge cycle - on completion will fill with lockmass purged sample and move to ready state | N/A | N/A | N/A |
| Fluidics Washing (status) | Getting Ready | N/A | Fluidics are carrying out a wash cycle - on completion will fill with wash solution and move to ready state | N/A | N/A | N/A |
| Fluidics Aborted State Warning (cat 2) (Status area = Fluidics) | Ready Blocked | 15 | Fluidics command has been cancelled before request was completed | Customer initiates restart OR Instrument immediately initiates a restart | "Restart Fluidics" | Fixed - Ready Fails (issue remains) = Error - Fluidics Aborted State |

-continued

Annex 1

| Name | Type | Priority | Reason for generation | Resolution | Wording | Outcome |
|---|---|---|---|---|---|---|
| Fluidics Aborted State Error (cat 3) | Error | N/A | Fluidics Aborted State Warning has not been resolved and this error is generated | FSE will investigate. Fixes issue and goes to Getting Ready Power cycles instrument | Call Service | Fixed |
| Power Save Mode (status) | Informat ion | N/A | Instrument in power save mode - Voltages on except aperture disc, gasses off and desolvation heater off | Customer needs to select Operate | N/A | Fixed - Ready |
| Maintenance Mode (cat 3) | Error | N/A | Maintenance mode is on and needs to be tuned off | FSE will investigate. Fixes issue and goes to Getting Ready Power cycles instrument | Call Service | Fixed |
| Detector PSU Fault (cat 3) | Error | N/A | Generated when the following event comes form DEVICE__4__6.xmlP SU__PC1__Output__Status | Information for engineer diagnostics - Gives the status of the detector power convertor and so indicates detector output status | Call Service | Fixed |
| Detector PSU Fault (cat 3) | Error | N/A | Generated when the following event comes form DEVICE__4__6.xml PSU__PC2__Output__Status | Information for engineer diagnostics - Gives the status of the ToF power convertor and so indicates ToF output status | Call Service | N/A |
| Reflectron PSU Fault (cat 3) | Error | N/A | Generated when the following event comes form DEVICE__4__5.xml PSU__PC1__Output__Status | Information for engineer diagnostics - Gives the status of the reflectron power convertor and so indicates reflectron output status | Call Service | Fixed |
| Pusher Unit Fault (cat 3) | Error | N/A | Generated when the following event comes form DEVICE__7__0.xml Fan__Fault | Information for engineer diagnostics - indicates a fan fault with the pusher | Call Service | Fixed |
| Pusher Unit Fault (cat 3) | Error | N/A | Generated when the following event comes form DEVICE__7__0.xml Temperature__Fault | Information for engineer diagnostics - indicates a temperature pusher fault | Call Service | Fixed |
| Pusher Unit Fault (cat 3) | Error | N/A | Generated when the following event comes form DEVICE__7__0.xml Switch__Leak__Fail | Information for engineer diagnostics - indicates a Switch Leakage Test Fail Pusher | Call Service | Fixed |
| Pusher Unit Fault (cat 3) | Error | N/A | Generated when the following event comes form DEVICE__7__0.xml Trip__Fault | Information for engineer diagnostics - indicates a current trip | Call Service | Fixed |
| Pusher Unit Fault (cat 3) | Error | N/A | Generated when the following event comes form DEVICE__7__0.xml Voltage__Error | Information for engineer diagnostics - indicates a Voltage Error | Call Service | Fixed |

-continued

| Name | Type | Priority | Reason for generation | Resolution | Wording | Outcome |
|---|---|---|---|---|---|---|
| Annex 1 | | | | | | |
| Pusher Unit Fault (cat 3) | Error | N/A | Generated when the following event comes form DEVICE_7_0.xml Pulse_Amplitude_Error | Information for engineer diagnostics - Pulse Amplitude Error | Call Service | Fixed |
| Pusher Unit Fault (cat 3) | Error | N/A | Generated when the following event comes form DEVICE_7_0.xml Rise_Fall_Error | Information for engineer diagnostics - indicates Rise/fall Time Error | Call Service | Fixed |
| Pusher Unit Fault (cat 3) | Error | N/A | Generated when the following event comes form DEVICE_7_0.xml Pulse_Parameter_Error | Information for engineer diagnostics - indicates Pulse Parameter Error | Call Service | Fixed |
| Pusher Unit Fault (cat 3) | Error | N/A | Generated when the following event comes form DEVICE_7_0.xml Converter_Parameter_Error | Information for engineer diagnostics - indicates HV Step-Up Converter Parameter Error | Call Service | Fixed |
| Pusher Unit Fault (cat 3) | Error | N/A | Generated when the following event comes form DEVICE_7_0.xml Trigger_Parameter_Error | Information for engineer diagnostics - indicates a trigger parameter error | Call Service | Fixed |
| Pusher Unit Fault (cat 3) | Error | N/A | Generated when the following event comes form DEVICE_7_0.xml ADC_Trigger_Fault | Information for engineer diagnostics - indicates ADC trigger fault | Call Service | Fixed |
| Pusher Unit Fault (cat 3) | Error | N/A | Generated when the following event comes form DEVICE_7_0.xml EDC_Error | Information for engineer diagnostics - indicates EDC error | Call Service | Fixed |
| Pusher Unit Fault (cat 3) | Error | N/A | Generated when the following event comes form DEVICE_7_0.xml HV_Error | Information for engineer diagnostics - indicates a HV error | Call Service | Fixed |
| DCC Fault (cat 3) | Error | N/A | Generated when the following event comes form DEVICE_11_0.xml Peripheral_WDT_Timeout | Information for engineer diagnostics - indicates a watchdog fault | Call Service | Fixed |
| DCC Fault (cat 3) | Error | N/A | Generated when the following event comes form DEVICE_11_0.xml Heater_Control_Status_LSB | Information for engineer diagnostics - indicates heater fault | Call Service | Fixed |
| DCC Fault (cat 3) | Error | N/A | Generated when the following event comes form DEVICE_11_0.xml Heater_Control_Status_MSB | Information for engineer diagnostics - indicates heater fault | Call Service | Fixed |
| DCC Fault (cat 3) | Error | N/A | Generated when the following event comes form DEVICE_11_0.xml Leak_Detector_Status | Information for engineer diagnostics - indicates leak detector status | Call Service | Fixed |
| DCC Fault (cat 3) | Error | N/A | Generated when the following event comes form DEVICE_11_0.xml SPT_Status | Information for engineer diagnostics - indicates status of source pressure test | Call Service | Fixed |
| Source HT Fault (cat 3) | Error | N/A | Generated when the following event comes form DEVICE_13_0.xml Vol_24V_Cutoff_Event | Information for engineer diagnostics - 24 V cut-off occurred | Call Service | Fixed |

-continued

Annex 1

| Name | Type | Priority | Reason for generation | Resolution | Wording | Outcome |
|---|---|---|---|---|---|---|
| Source HT Fault (cat 3) | Error | N/A | Generated when the following event comes form DEVICE_13_0.xml Vol_12V_Cutoff_Event | Information for engineer diagnostics - 12 V cut-off occurred | Call Service | Fixed |
| Source HT Fault (cat 3) | Error | N/A | Generated when the following event comes form DEVICE_13_0.xml Vol_5V_Cutoff_Event | Information for engineer diagnostics - 5 V cut-off occurred | Call Service | Fixed |
| Source HT Fault (cat 3) | Error | N/A | Generated when the following event comes form DEVICE_13_0.xml Vol_3V3_Cutoff_Event | Information for engineer diagnostics - 3.3 V cut-off occurred | Call Service | Fixed |
| Source HT Fault (cat 3) | Error | N/A | Generated when the following event comes form DEVICE_13_0.xml Vol_1V2_Cutoff_Event | Information for engineer diagnostics - 1.2 V cut-off occurred | Call Service | Fixed |
| Source HT Fault (cat 3) | Error | N/A | Generated when the following event comes form DEVICE_13_0.xml Vol_Esi_Cutoff_Event | Information for engineer diagnostics - ESI cut-off has occurred | Call Service | Fixed |
| Source HT Fault (cat 3) | Error | N/A | Generated when the following event comes form DEVICE_13_0.xml Vol_Etd_Cutoff_Event | Information for engineer diagnostics - ETD cut-off has occurred | Call Service | Fixed |
| Source HT Fault (cat 3) | Error | N/A | Generated when the following event comes form DEVICE_13_0.xml Polarity_Mismatch | Information for engineer diagnostics - wrong polarity output | Call Service | Fixed |

Annex 2

TABLE 1

| Term/Abbreviation | Definition |
|---|---|
| General | Parameters that are visible to all users |
| Advanced | Parameters that are visible to advanced users (end users with an advanced level of instrument knowledge), service users, specialist users, and development users |
| Service | Parameters that are visible to service users (Waters field service engineers), specialist users (factory test engineers) and development users |
| Specialist | Parameters that are visible to specialist users (factory test engineers) and development users |
| Development (Dev) | Parameters that are available to development users only (i.e. members of the MS Research and MS Development departments) |
| None | Parameters that are not visible in the user interface |
| F | Factory - Parameters that can be saved as factory defaults by Specialist and Development users |
| S | System - Parameters that can be saved as a tune set by Specialist and Development users |
| Calculated | Parameters that are calculated by software, and are not editable |
| PSU | Power supply unit |
| ESI | Electrospray ionisation |
| TIC | Total ion current |
| LM | Low mass |
| HM | High mass |
| RF | Radio frequency |
| EDC | Extended duty cycle |
| CE | Collision energy |

TABLE 1-continued

| Term/Abbreviation | Definition |
|---|---|
| DC | Direct current |
| Polarity relationship = Same | A positive parameter value should give an output polarity the same as the ion polarity |
| Polarity relationship = Opposite | A positive parameter value should give an output polarity opposite to the ion polarity |
| Polarity relationship = None | Output polarity does not change with ion polarity |

The invention claimed is:

1. A method of performing a start-up routine for a mass spectrometer, the start-up routine being performed automatically upon switching ON the mass spectrometer, wherein the mass spectrometer comprises a plurality of functional modules connected thereto, each module operable to perform a predetermined function of the mass spectrometer in use, and wherein the start-up routine comprises detecting which functional modules are present in the set of a plurality of functional modules connected to the mass spectrometer, and performing one or more steps of the start-up routine based upon the results of the detections, wherein the method comprises determining whether the detected functional modules correspond to an allowed combination of modules, and, where the detected functional modules do correspond to an allowed combination, continuing with the start-up routine, and, where the detected functional modules do not correspond to an allowed combination of modules, determining a fault state of the spectrometer.

2. The method of claim 1, wherein the method comprises configuring the mass spectrometer based on the detected functional modules.

3. The method of claim 2, wherein the method comprises the mass spectrometer automatically determining whether configuration information is stored locally in respect of each one of the detected functional modules, and, for each one of the detected functional modules for which such information is found to be stored locally, automatically using the information in configuring the mass spectrometer, and, for any one or ones of the detected functional modules for which such information is not found to be stored locally, automatically obtaining configuration information for the one or ones of the detected functional modules from a remote server, and using the information in configuring the mass spectrometer.

4. The method of claim 1, wherein each of the functional modules is individually addressable and connected in a network in use, and the mass spectrometer comprises a scheduler operable to introduce discrete packets of instructions to the network at predetermined times to instruct at least one functional module to perform a predetermined operation.

5. A mass spectrometer comprising a control system which is arranged to automatically perform a start-up routine for the mass spectrometer upon switching ON the mass spectrometer, wherein the mass spectrometer comprises a plurality of functional modules connected thereto, each module operable to perform a predetermined function of the mass spectrometer in use, and wherein the start-up routine comprises detecting which functional modules are present in the set of a plurality of functional modules connected to the mass spectrometer, and performing one or more steps of the start-up routine based upon the results of the detection;

wherein the control system is arranged to determine whether the detected functional modules correspond to an allowed combination of modules, and, where the detected functional modules do correspond to an allowed combination, continue with the start-up routine, and, where the detected functional modules do not correspond to an allowed combination of modules, determine a fault state of the spectrometer.

* * * * *